(12) United States Patent
Kraehmueller et al.

(10) Patent No.: US 8,078,485 B1
(45) Date of Patent: Dec. 13, 2011

(54) POSTAL, FREIGHT, AND LOGISTICS INDUSTRY HIGH PERFORMANCE CAPABILITY ASSESSMENT

(75) Inventors: Lars Kraehmueller, Bad Bramstedt (DE); Wai Seng Cheah, Selangor (MY); William A. Morris, Falls Church, VA (US); Carolyn Hay, Ottawa (CA); Ivano Veltri, Nepean (CA); Ilan Geller, New York, NY (US); Michael T. Chiaramonte, Washington, DC (US); Xiaojan Jin, Shanghai (CN)

(73) Assignee: Accenture Global Services Limited, Dublin (IE)

( * ) Notice: Subject to any disclaimer, the term of this patent is extended or adjusted under 35 U.S.C. 154(b) by 836 days.

(21) Appl. No.: 12/129,080

(22) Filed: May 29, 2008

(51) Int. Cl.
G06Q 99/00 (2006.01)
(52) U.S. Cl. ............ 705/7.11; 705/7.29; 705/7.31
(58) Field of Classification Search ......... 705/10, 705/7.11, 7.29, 7.31
See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2002/0035495 A1* | 3/2002 | Spira et al. | 705/7 |
| 2003/0083912 A1* | 5/2003 | Covington et al. | 705/7 |
| 2003/0110067 A1 | 6/2003 | Miller et al. | |
| 2003/0115094 A1* | 6/2003 | Ammerman et al. | 705/11 |
| 2004/0098299 A1* | 5/2004 | Ligon et al. | 705/10 |
| 2005/0203804 A1* | 9/2005 | Suzuki et al. | 705/26 |
| 2005/0278453 A1* | 12/2005 | Cherkasova | 709/231 |
| 2007/0005374 A1* | 1/2007 | Harkin | 705/1 |
| 2007/0214000 A1* | 9/2007 | Shahrabi et al. | 705/1 |
| 2009/0265229 A1* | 10/2009 | Sidhu | 705/14 |

FOREIGN PATENT DOCUMENTS

DE 102008004655 A1 * 6/2009

OTHER PUBLICATIONS

U.S. Appl. No. 11/823,112, filed Jun. 12, 2007.
U.S. Appl. No. 12/124,010, filed May 20, 2008.
U.S. Appl. No. 61/086,927, filed Aug. 20, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.

(Continued)

*Primary Examiner* — Akiba Robinson Boyce
(74) *Attorney, Agent, or Firm* — Brinks Hofer Gilson & Lione

(57) ABSTRACT

A high performance capability assessment model helps a postal industry business meet the challenges of the global marketplace. As a result, the postal industry business can achieve the clarity, consistency, and well-defined execution of core processes that reduce inefficiencies and waste that result from unnecessary process complexity and exceptions. In addition, the high performance capability assessment model helps the postal industry business to identify specific areas in which improvements may be made and understand how to make the improvements, and establishes levels of capability along the way to reaching an ultimate capability goal.

15 Claims, 16 Drawing Sheets

OTHER PUBLICATIONS

U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.
Brochure, "High Performance Acceleration: Global Retail Process Model," Accenture, High Performance Delivered, 2007.
Handbook, Software Engineering Institute, "A Description of the Systems Engineering Capability Maturity Model Appraisal Method Version 1.1," Mar. 1996.
Keith A. Heston, "Achieving Delivery Excellence Using the Capability Maturity Model Integration," *Accenture, High Performance Delivered*, 2006.
Report, Software Engineering Institute, "A Systems Engineering Capability Maturity Model, Version 1.1.," Nov. 1995.
Walker Royce, "CMM vs. CMMI: From Conventional to Modern Software Management," *The Rational Edge*, 2002.

\* cited by examiner

POSTAL, FREIGHT, AND LOGISTICS INDUSTRY HIGH PERFORMANCE CAPABILITY ASSESSMENT

BACKGROUND OF THE INVENTION

1. Technical Field

This disclosure concerns a system and method to identify the performance capability of an organization on a scale of representative capabilities. In particular, this disclosure relates to an efficient and cost effective way to assess the performance capability level of key assessment areas within the processes of a postal, freight and logistics-related organization.

2. Background Information

Modern businesses operate in an increasingly competitive environment. To survive, postal, freight, and logistics-related businesses must adapt to this environment and execute in a clear, consistent, and efficient manner. Furthermore, the global nature of postal, freight, and logistics-related businesses greatly increases the complexity and difficulty of surviving on a day-to-day basis.

Despite the need for a business in the postal, freight, and logistics industry to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the postal, freight, and logistics-related business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As a result, postal, freight, and logistics-related businesses struggle to meet the demands of the modern marketplace and fail to identify opportunities for margin improvement, category expansion, portfolio optimization, multi-channel execution, selling performance, and to reach other important goals.

Therefore, a need exists for an efficient and effective system and method to assess the performance capability level of key assessment areas within the processes of an organization.

SUMMARY

A high performance capability assessment (HPCA) model helps businesses, particularly a postal, freight, and logistics business, meet the challenges of the global marketplace by defining a scale of performance capability along which the current practices of the business may be located. The HPCA model accelerates the discovery of process and capability gaps within business operations. In addition, the HPCA model also helps the business to identify specific areas in which improvements may be made, how to make the improvements, and how to establish levels of capability during the course of attempting to achieve an ultimate capability goal. As a result, the business can achieve the clarity, consistency, and well-defined execution of core processes that reduce inefficiencies and waste. For purposes of clarity and brevity, the term "postal, freight, and logistics" may be used interchangeably with the term "postal." Thus, a postal, freight, and logistics business or industry is the same as a postal business or industry.

The HPCA model includes a key factor dimension and a performance capability scale dimension. The performance capability scale dimension defines multiple capability levels. The performance capability levels may form a scale of increasing organizational performance capability. One example of such a scale includes a 'Basic' capability level, a 'Competitive' capability level, and a 'Market Leading' capability level. Each performance capability level includes criteria specific to a corresponding key assessment area. Each key assessment area identifies some aspect of a capability of a business.

Capabilities of a business may be grouped into platforms. For example, the HPCA model may group the capabilities of the postal industry into ten high-level platforms, including a customer interaction platform, enablement platform, asset management platform, information and data management platform, contract management platform, mail operations platform, transportation platform, supplemental services platform, retail operations platform, and enterprise platform. Examples of capabilities within the customer interaction platform, for example, include channel management, product management, pricing, marketing, sales, booking and order management, solutions management, customer service, and invoicing. Platforms may include sub-platforms, as well as capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the customer interaction platform includes performance capability criteria for channel management, product management, pricing, marketing, sales, booking and order management, solutions management, customer service, and invoicing key assessment areas at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The postal industry performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
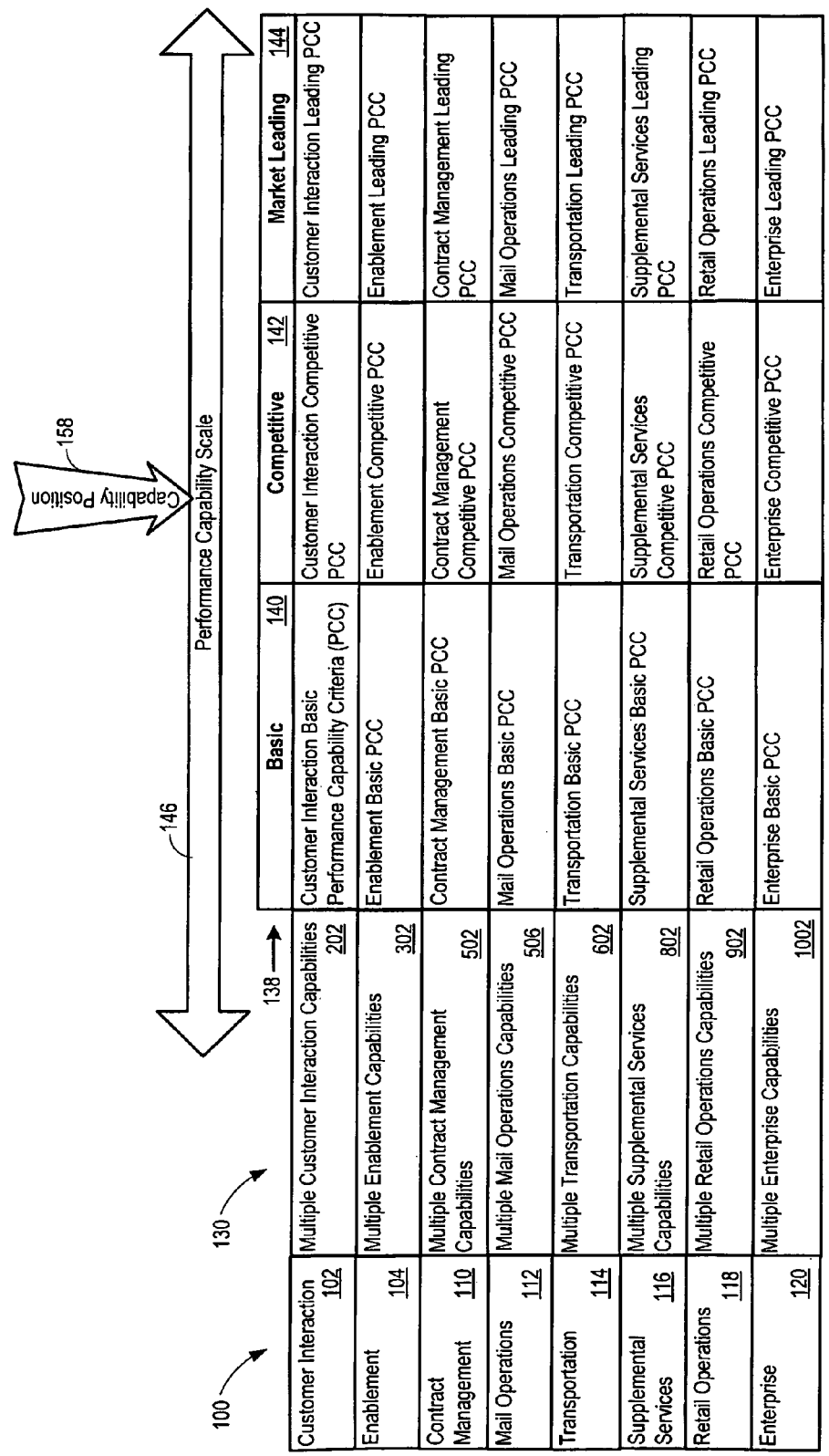
FIG. 1 shows a high performance capability assessment model with a performance capability scale and performance capability criteria shown for different platforms.

FIG. 1 shows a high performance capability assessment (HPCA) model 100. The HPCA model 100 specifies ten high-level platforms, including a customer interaction platform 102, enablement platform 104, asset management platform 106, information and data management platform 108, contract management platform 110, mail operations platform 112, transportation platform 114, supplemental services platform 116, retail operations platform 118, and enterprise platform 120. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple <platform name> capabilities 130.

The HPCA model 100 establishes a multidimensional postal industry performance reference set that includes multiple key assessment performance levels 138, further described below in reference Tables 1-3. The performance levels 138 establish a scale of increasing organizational performance capability. The key assessment performance reference tables include a 'Basic' 140 performance capability level, a 'Competitive' 142 performance capability level and a 'Market Leading' 144 performance capability level. The performance capability levels establish a performance capability scale 146 along which current business practices may be located and identified with respect to any platform and capability within a platform according to an analysis of performance capability criteria (PCC). The capability under evaluation may be assigned the performance level 138 based on a capability position 158 along the performance capability scale 146.

The 'Basic' performance capability level 140 specifies 'Basic' performance assessment criteria, the 'Competitive' performance capability level 142 specifies 'Competitive' performance assessment criteria, and the 'Market Leading' performance capability level 144 specifies 'Market Leading' performance assessment criteria. The HPCA model 100 receives input data that specifies a postal industry platform (e.g., a postal industry area) and a postal industry key assessment area for analysis. The HPCA model 100 searches the multidimensional postal industry performance reference set for a matching key assessment performance reference table that matches the postal industry platform and corresponding industry capability within the platform and the postal industry key assessment area, and retrieves the matching key assessment performance reference table. The HPCA model 100 initiates analysis of the matching key assessment performance reference table to obtain a resultant performance capability level for the postal industry key assessment area.

Tables 1-3 below provide an explanation of each of the capability levels 140, 142, and 144.

TABLE 1

'Basic' Capability Level

| | |
|---|---|
| Description: | Capability mastery at a basic level is indicative of a low level, unclear, undisciplined, or unsophisticated ability to execute the capability or process in a consistent, traceable, and repeatable manner. For non-core, low priority, new, or early adoption of certain process capabilities, a basic level may be acceptable to the organization or the organization may not have the resources to expand beyond the basic capability level. A basic level of mastery often indicates that an organization is lagging behind its competitors in its ability to execute the capability. |

TABLE 2

'Competitive' Capability Level

| | |
|---|---|
| Description: | Capability mastery at a competitive level is indicative of a conservative ability to execute the capability in a fairly consistent, traceable, and repeatable manner with proven techniques, tools and commonly accepted practices that are readily available and maintained. This capability mastery may be a strategic decision by the organization to be a follower or "good enough" operator in many respects or may be an interim step that organizations aspire to move beyond to achieve a leading mastery of the given capability. A competitive level of mastery often indicates that an organization is performing consistently with its competitors in its ability to execute a capability. |

TABLE 3

'Market Leading' Capability Level

| | |
|---|---|
| Description: | Capability mastery at a market leading level is indicative of a highly detailed, clear, and often iterative and sophisticated ability to execute the capability. The market leading capability is the recognized and referenced benchmark |

TABLE 3-continued

'Market Leading' Capability Level of continuous improvement and high performance for a given process capability. The market leading process capability has been optimized for efficiency and effectiveness, is well understood, traceable, and consistently executed to the point of being competitively differentiated or at the top level of peer to peer comparison.

For FIGS. 2-11, the capability under evaluation may be assigned a capability level 138 based on a capability position along the performance capability scale 146 (e.g., the 'basic,' 'competitive,' or 'market leading' capability level). Performance capability criteria corresponding to the basic 140, competitive 142 and market leading 144 performance levels populate the HPCA model 100. The performance capability criteria capture criteria, characteristics, and/or other features of a capability at a particular capability or performance level 138 for a selected key assessment area. Examples below illustrate performance capability criteria that provide unexpectedly good analysis and benchmarking for postal organizations. The HPCA model 100 performance capability criteria provide a tool for determining where a platform and capability under examination falls along the performance capability scale 146.

For example, business consultants and industrial engineers may interview a business or receive data about the business to determine, measure, or otherwise ascertain the characteristics, criteria, and other features of a particular capability implemented within the business. The consultants and engineers may compare the characteristics of the business to the performance capability criteria in the HPCA model 100 and arrive at a capability level 138 for the capability under examination. In doing so, for example, the consultants and engineers may identify where the capability under examination falls in terms of the capability level for each key assessment area of a capability and determine an overall position on the performance capability scale 146 for the capability under examination. Performance capability criteria may populate the HPCA model 100 in whole or in part. Multiple high performance capability assessment models may be collected and stored with the performance capability criteria for future retrieval and possible modification in a capability detail pool, discussed below.

Figure 2:
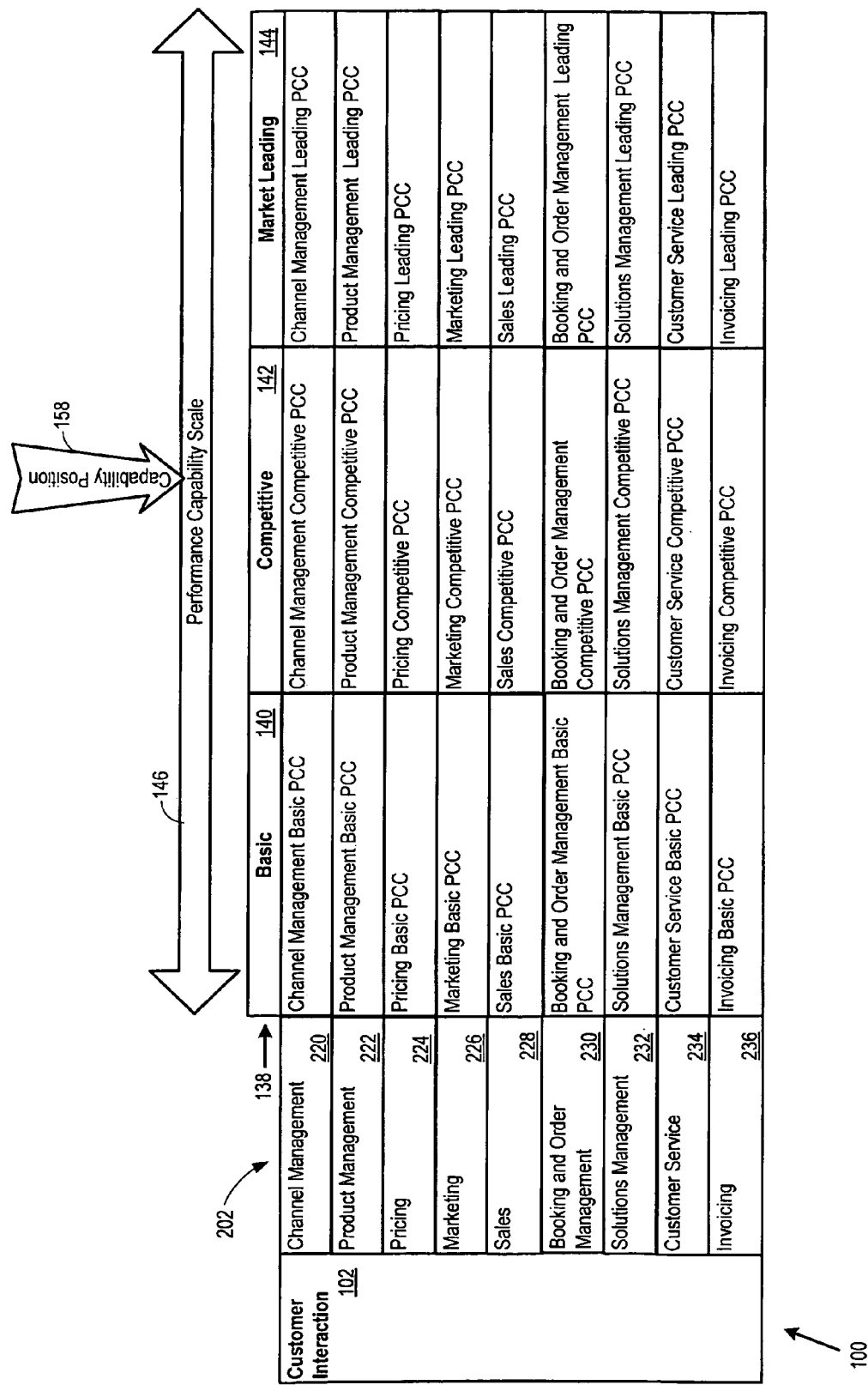
FIG. 2 shows a high performance capability assessment model with customer interaction capabilities shown.

FIG. 2 shows the customer interaction platform 102 divided into respective capability areas 202. The customer interaction platform 102 includes a channel management capability 220, product management capability 222, pricing capability 224, marketing capability 226, sales capability 228, booking and order management capability 230, solutions management capability 232, customer service capability 234, and invoicing capability 236.

Figure 3:
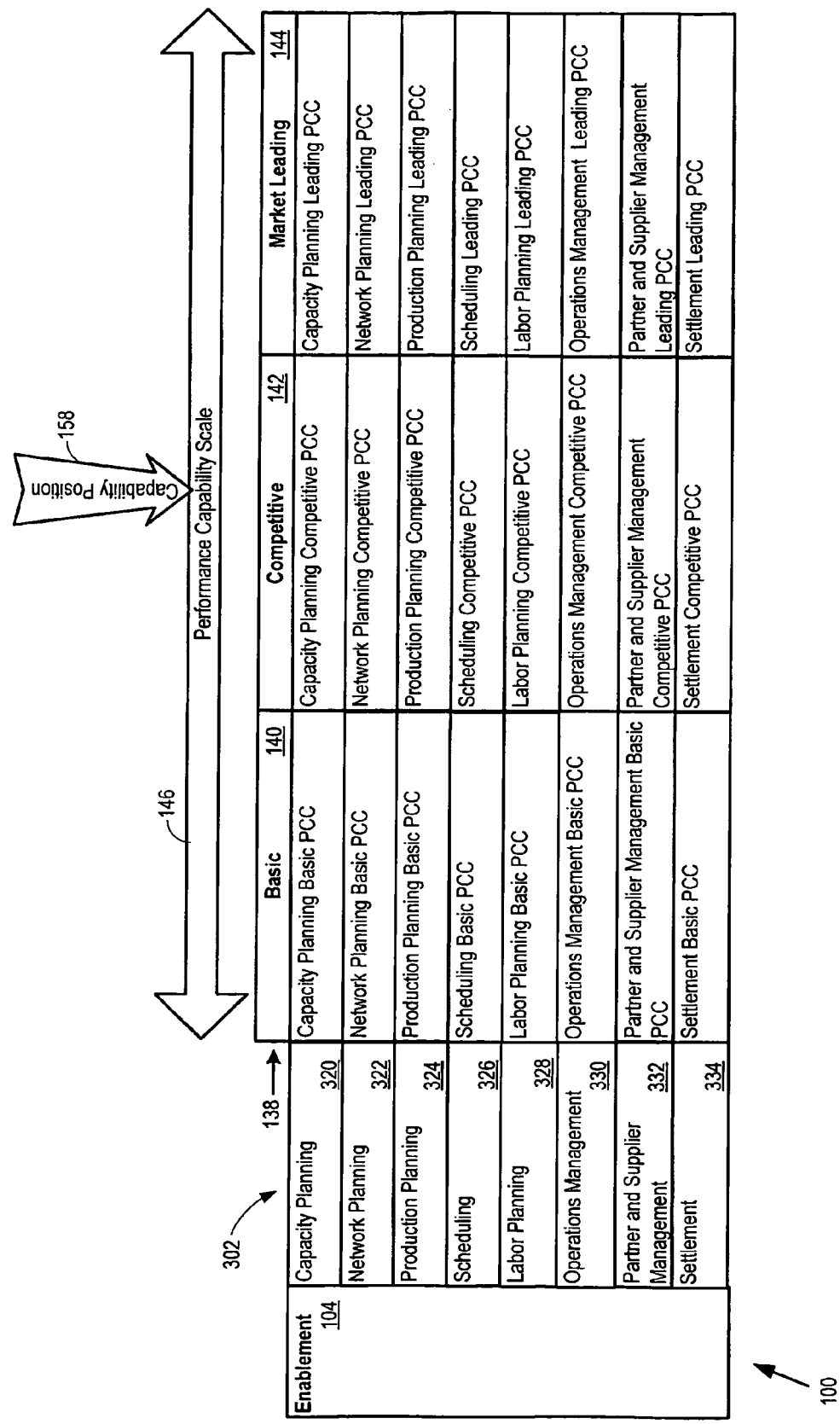
FIG. 3 shows a high performance capability assessment model with enablement capabilities shown.
Figure 4:
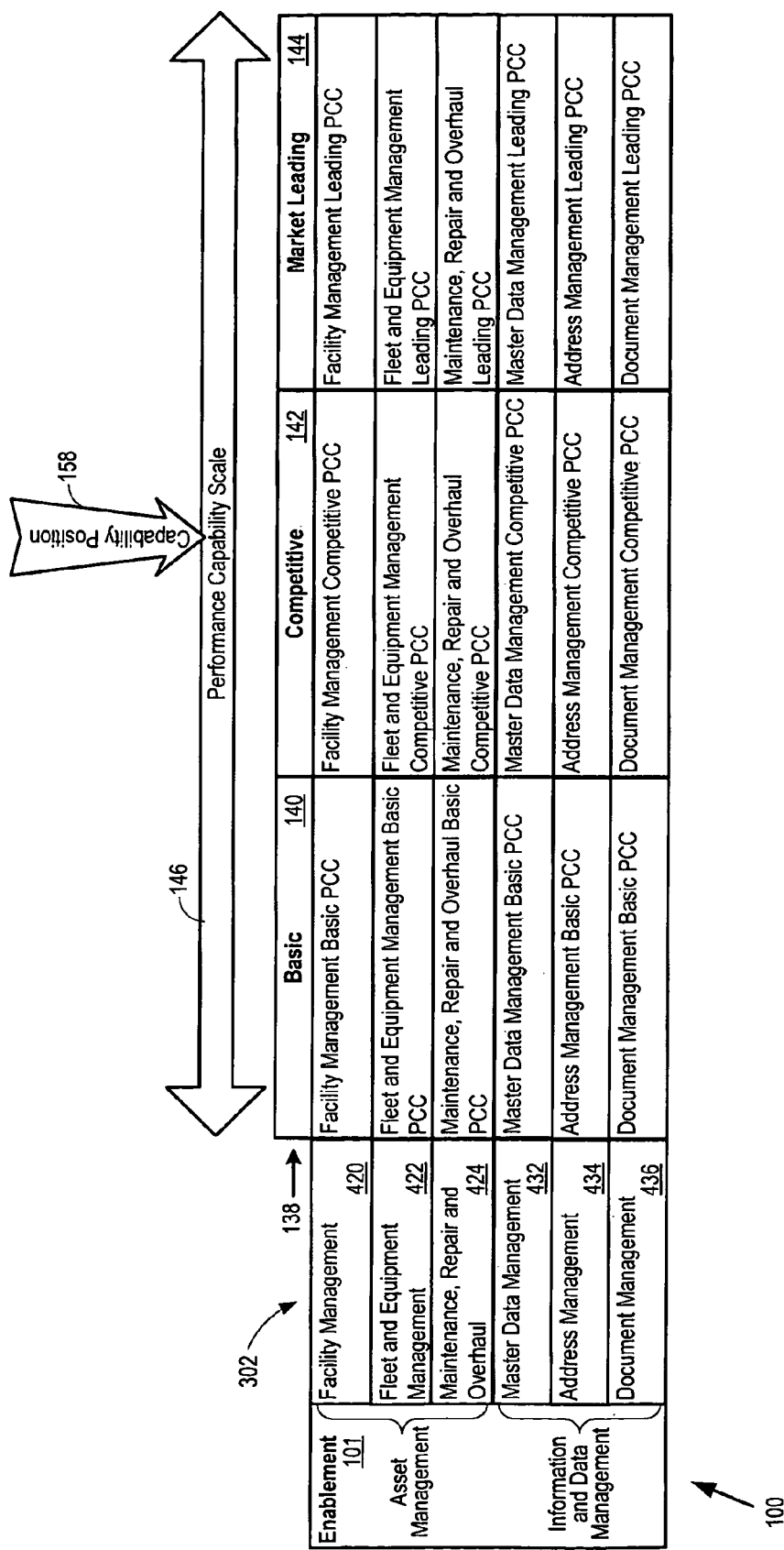
FIG. 4 is a continuation sheet of FIG. 3 for the high performance capability assessment model with asset management and information/data management capabilities shown.

FIGS. 3 and 4 show the enablement platform 104 divided into respective capability areas 302. The enablement platform 104 includes a capacity planning capability 320, network planning capability 322, production planning capability 324, scheduling capability 326, labor planning capability 328, operations management capability 330, partner and supplier management capability 332, settlement capability 334, facility management capability 420, fleet and equipment management capability 422, and maintenance, repair and overhaul capability 424, master data management capability 432, address management capability 434, and document management capability 436. In some embodiments, the capability areas of facility management capability 420, fleet and equipment management capability 422, and maintenance, repair and overhaul capability 424 may be under a sub-platform referred to as asset management, while the capability areas of master data management capability 432, address management capability 434, and document management capability 436 may be under a sub-platform referred to as information and data management.

Figure 5:
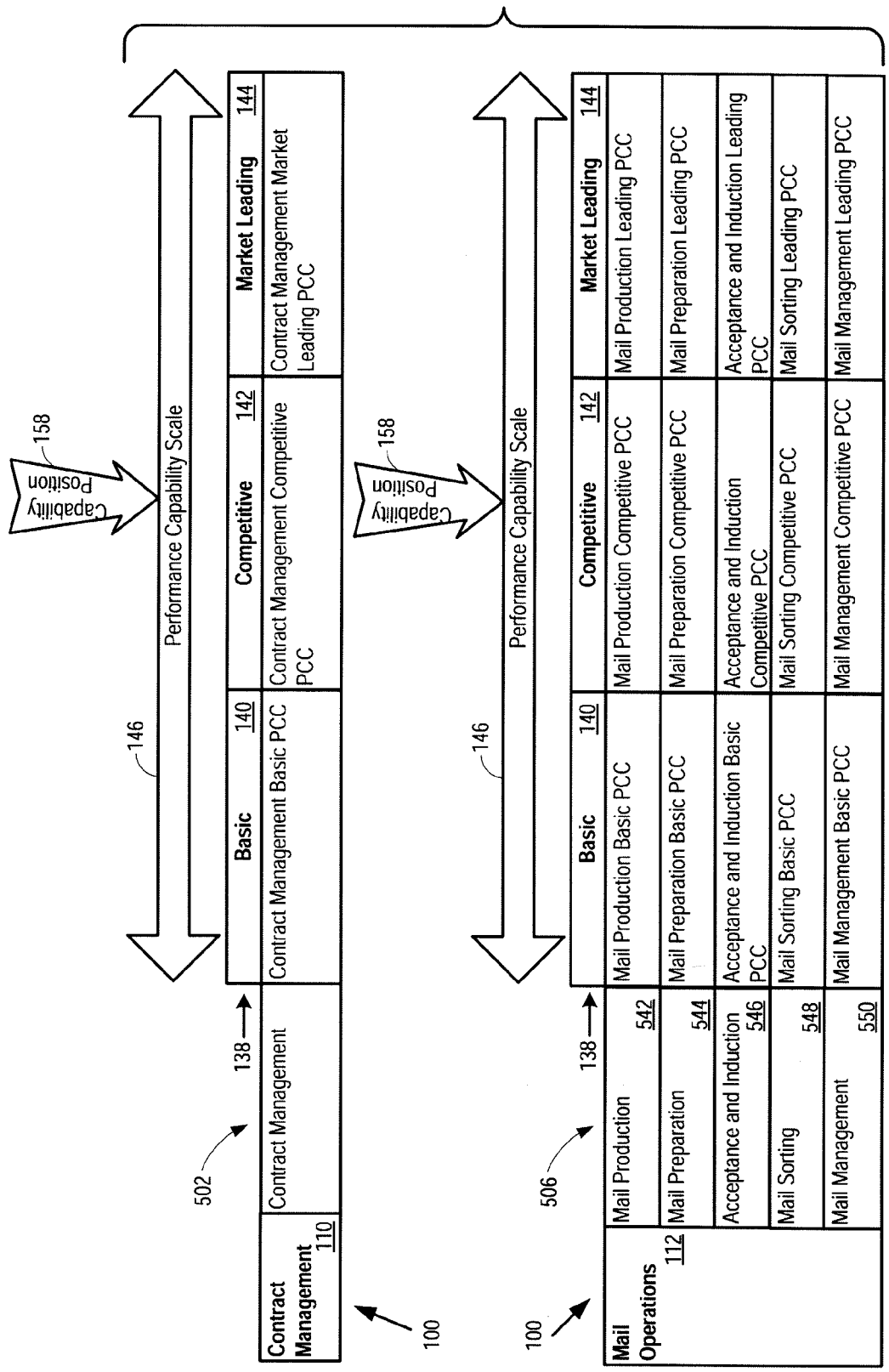
FIG. 5 shows a high performance capability assessment model with contract management capabilities and mail operations capabilities shown.

FIG. 5 shows the contract management platform 110 and respective capability area 502. The contract management platform 110 may also be arranged as a sub-platform of a different platform. FIG. 5 also shows the mail operations platform 112 divided into respective capability areas 506. The mail operations platform 112 includes a mail production capability 542, mail preparation 544, acceptance and induction capability 546, mail sorting capability 548, and mail management 550.

Figure 6:
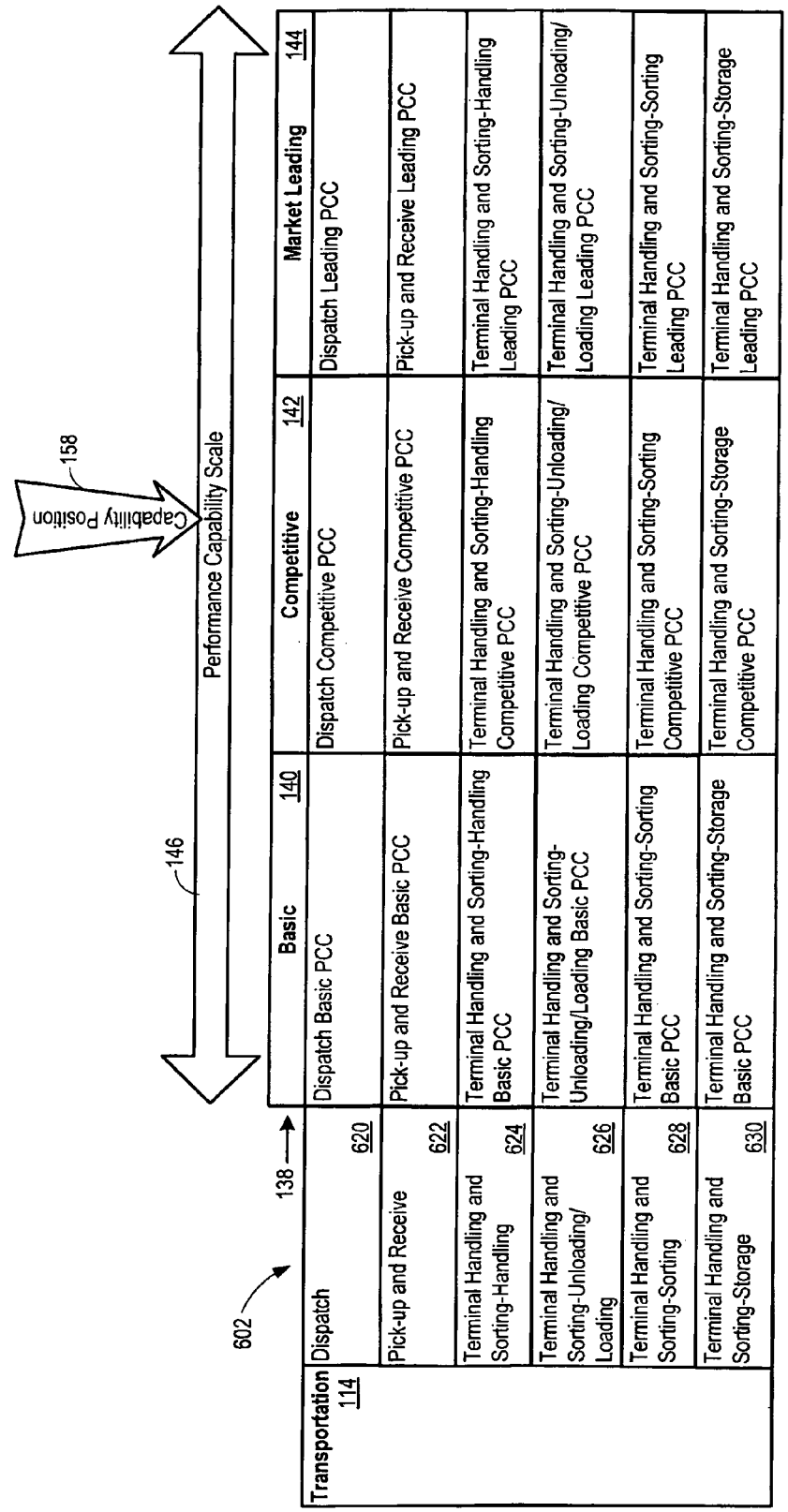
FIG. 6 shows a high performance capability assessment model with transportation capabilities shown.
Figure 7:
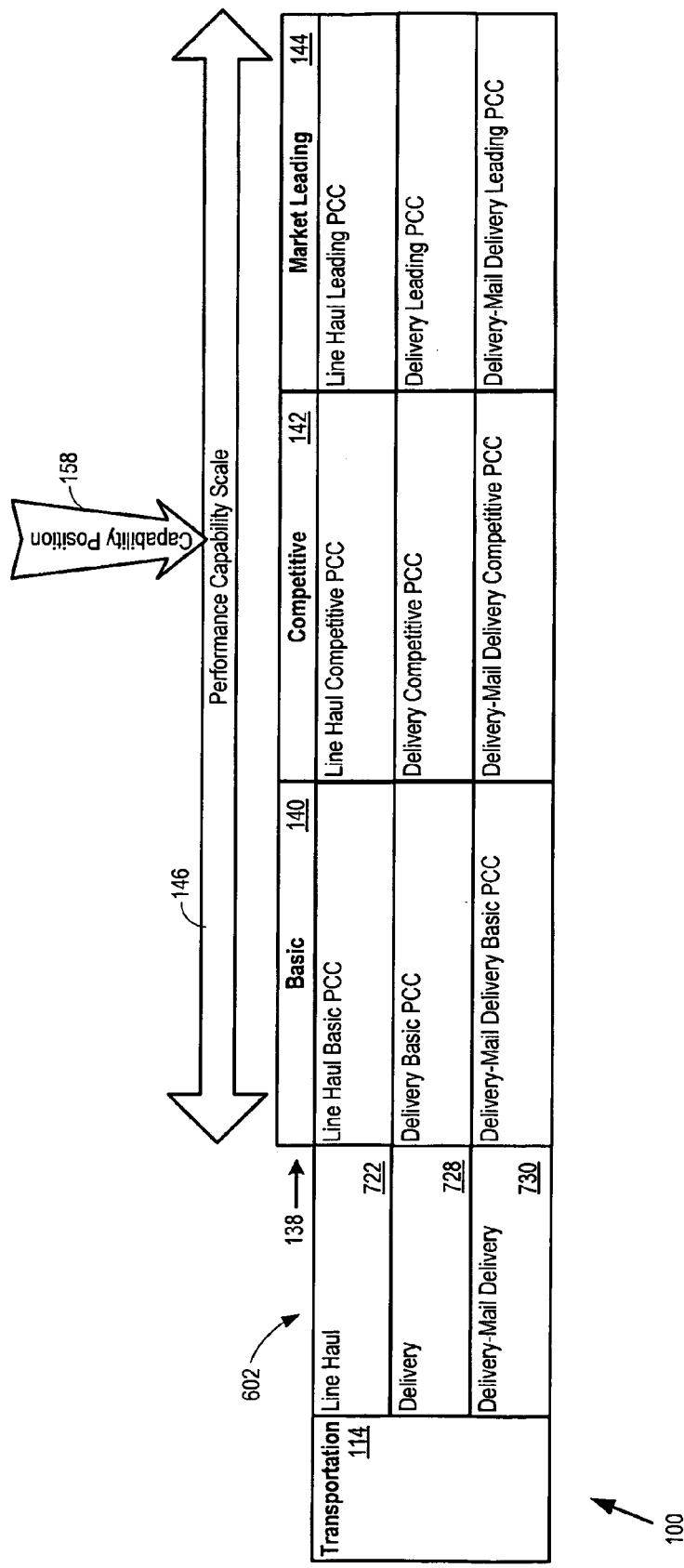
FIG. 7 is a continuation sheet of FIG. 6 for the capability assessment model with transportation capabilities shown.

FIGS. 6 and 7 show the transportation platform 114 divided into respective capability areas 602. The transportation platform 114 includes a dispatch capability 620, pick-up and receive capability 622, terminal handling and sorting-handling capability 624, terminal handling and sorting-unloading/loading capability 626, terminal handling and sorting-sorting capability 628, terminal handling and sorting-storage capability 630, sea operations capability 720, line-haul capability 722, rail operations capability 724, air operations capability 726, delivery capability 728, and delivery-mail delivery capability 730.

Figure 8:
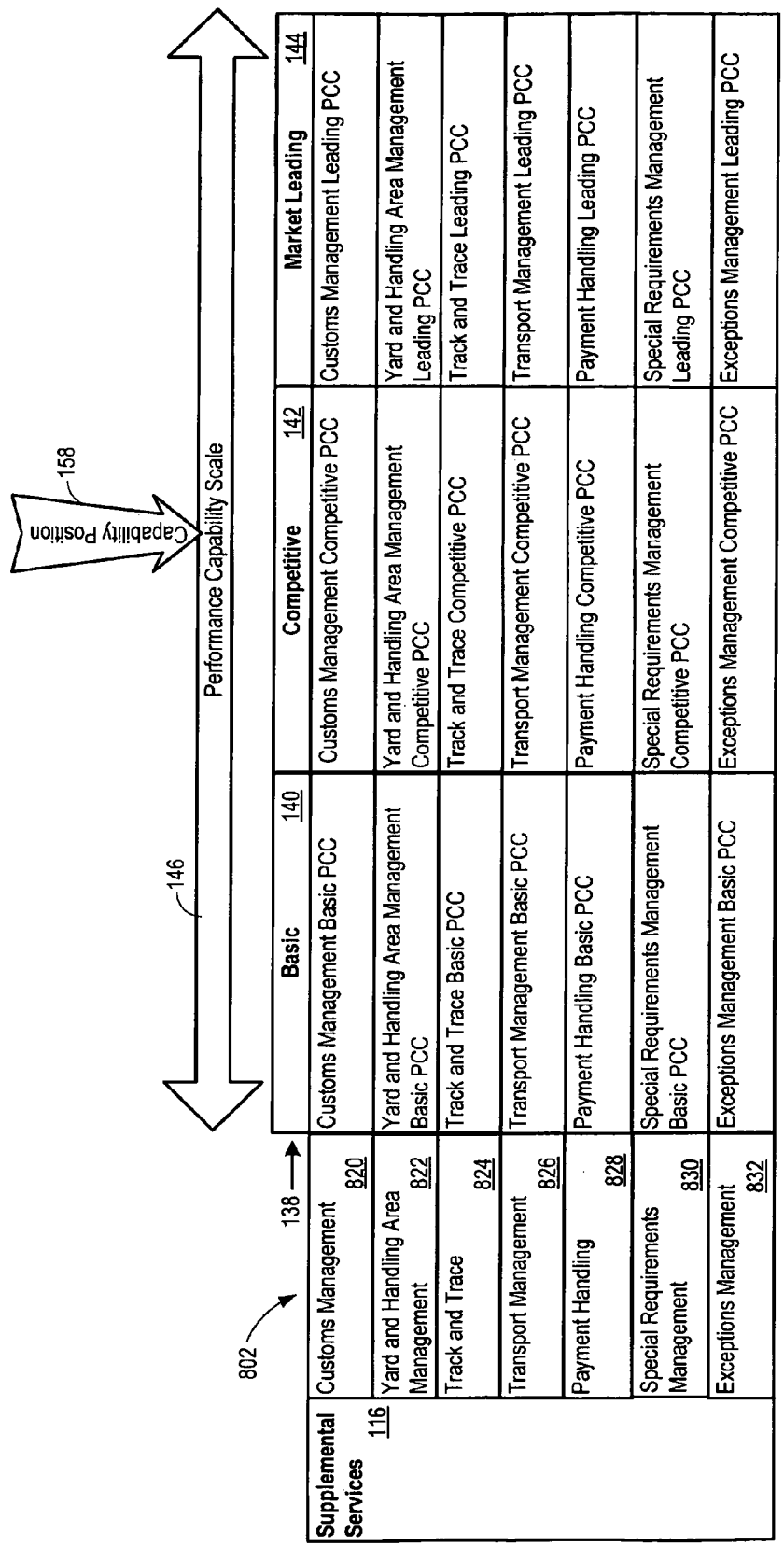
FIG. 8 shows a high performance capability assessment model with supplemental services capabilities shown.

FIG. 8 shows the supplemental services platform 116 divided into respective capability areas 802. The supplemental services platform 116 includes a customs management capability 820, yard and handling area capability 822, track and trace capability 824, transport management capability 826, payment handling capability 828, special requirements management capability 830, and exceptions management capability 832.

Figure 9:
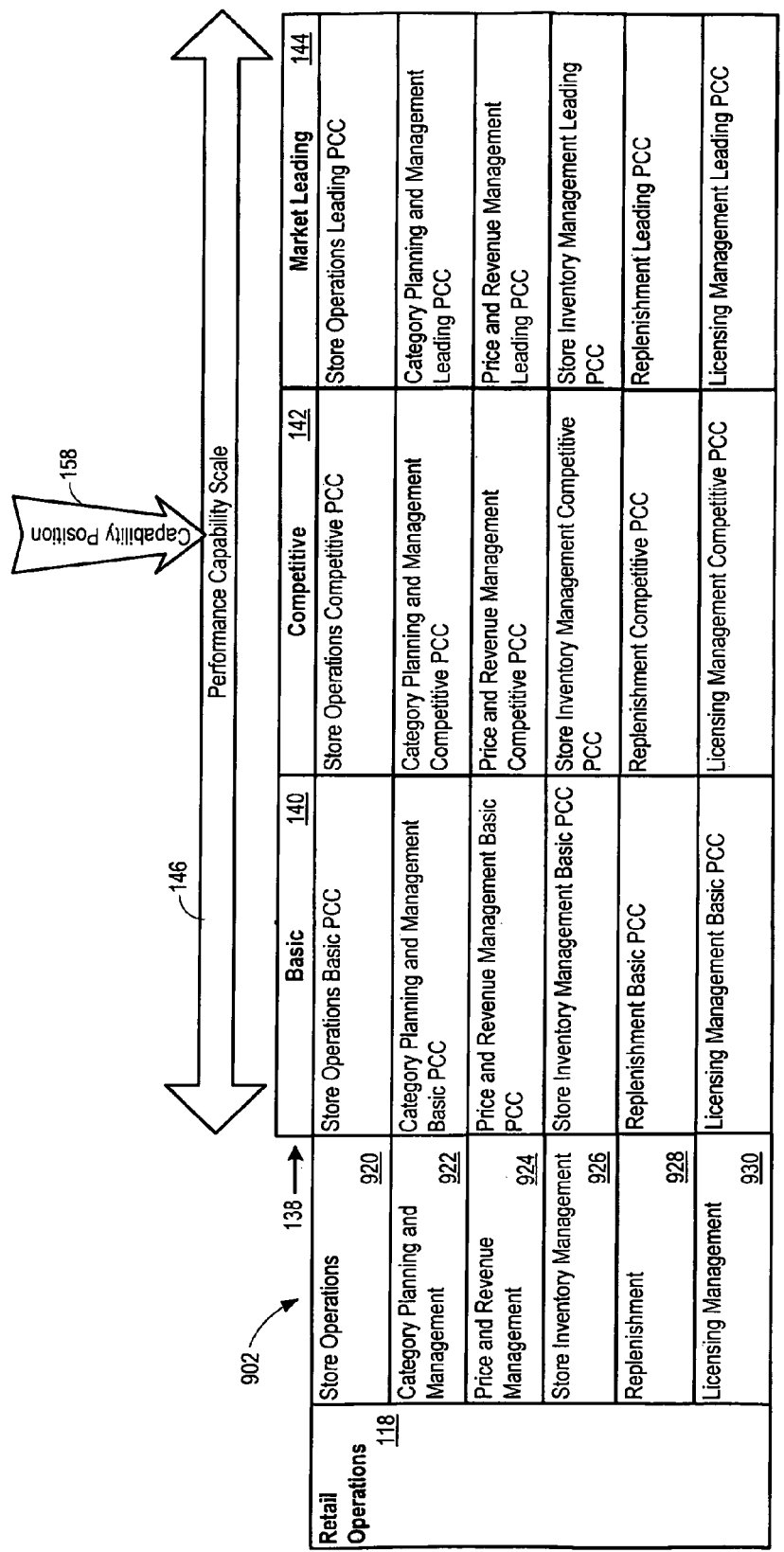
FIG. 9 shows a high performance capability assessment model with retail operations capabilities shown.

FIG. 9 shows the retail operations platform 118 divided into respective capability areas 902. The retail operations platform 118 includes store operations capability 920, category planning and management capability 922, price and revenue management capability 924, store inventory management capability 926, replenishment capability 928, and licensing management capability 930.

Figure 10:
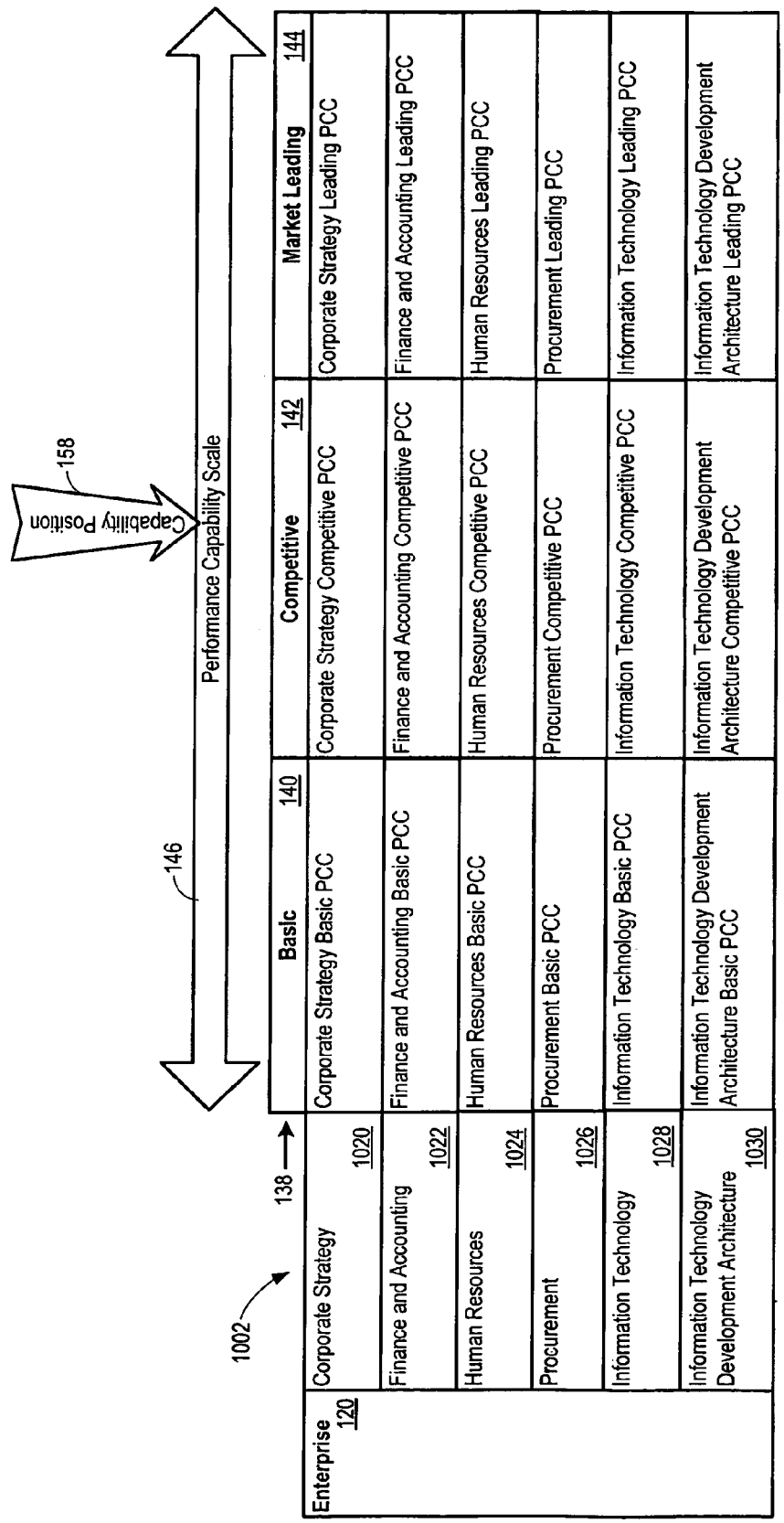
FIG. 10 shows a high performance capability assessment model with enterprise capabilities shown.
Figure 11:
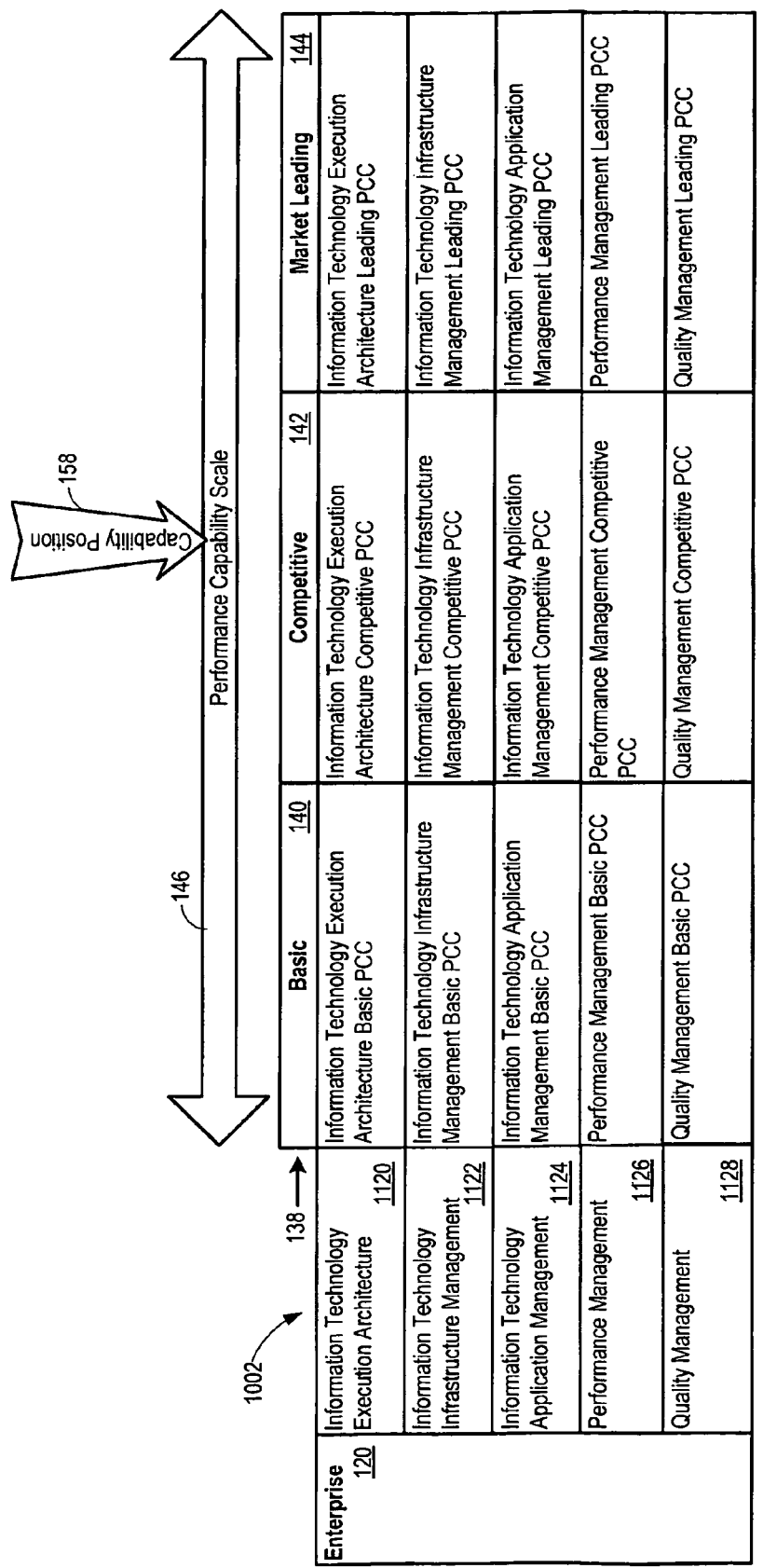
FIG. 11 is a continuation sheet of FIG. 10 for the capability assessment model with enterprise capabilities shown.

FIGS. 10 and 11 show the enterprise platform 120 divided into respective capability areas 1002. The enterprise platform 120 includes a corporate strategy capability 1020, finance and accounting capability 1022, human resources capability 1024, procurement capability 1026, information technology capability 1028, information technology development architecture capability 1030, information technology execution architecture capability 1120, information technology infrastructure management capability 1122, information technology application management capability 1124, performance management capability 1126, and quality management capability 1128.

The following Tables 4-68 provide an explanation of the capabilities and corresponding key assessment areas and performance capability criteria for each capability within the respective platform. Each capability may include one or more key assessment areas. Each key assessment area may include one or more additional key assessment areas. In other words, a business capability may include sub-capabilities, and therefore, key assessment areas corresponding to the multiple sub-capabilities. The tables below show specific criteria used to analyze each capability.

The following Tables 4-12 provide an explanation of the capabilities and corresponding key assessment areas and performance capability criteria for each capability within the customer interaction platform 102.

TABLE 4

Channel Management

| | |
|---|---|
| Description: | The platform contains all customer-interaction-driven capabilities between an organization and its customers, from order management to invoicing, as well as all marketing disciplines. |
| Basic Criteria: | Communication Flexibility:<br>Small number of distribution channels mainly to provide information to customer.<br>No integration with IT backbone, just static content.<br>Channel Economics:<br>Channels coexist but are not consequently managed.<br>Costs assigned with certain channels are not known.<br>Customer Support:<br>Customer interact with local representation.<br>Alternative contacts, e.g., central help desk not promoted.<br>Electronic Communication:<br>Limited availability of electronic communication channels with customers and partners, e.g., one common eMail address provided.<br>Self Service:<br>Category-based web self service for informational/ collateral inquiries via PCs, set top boxes, and kiosk. |
| Competitive Criteria: | Communication Flexibility:<br>Variety of distribution channels available for customers and partners.<br>Channels are mainly single level, meaning that there is only one level of service regardless of the customer type or priority.<br>Some integration with IT backbone architecture.<br>Channels utilized consist primarily of traditional channels for that industry.<br>Channel Economics:<br>Basic understanding of volumes costs and margins of the different channels.<br>Managed on intuitive basis for better efficiency of provided service.<br>Customer Support:<br>Customers interact through multiple contact points, sometimes leading to confusion and loss of information or double and inconsistent communication.<br>Status of customer is patchy and not homogeneous between countries or business units.<br>Electronic Communication:<br>Limited interaction (e.g., capture of orders). Basic integration with IT backbone system. Milestone completion (status) is published.<br>Self Service:<br>Web self service for customer account specific inquiries via PCs, set top boxes, and kiosk. |
| Market Leading Criteria: | Communication Flexibility:<br>Variety of channels tailored to customers and partners specific needs.<br>Customers guided/given incentives to use most appropriate channel.<br>Full IT backbone integration.<br>Channel Economics:<br>Clear understanding and management of channel economics.<br>Customer Support:<br>Contact point processes are highly standardized and tool supported.<br>Certain contact points are tailored to specific customer groups according to their requirements.<br>Customers can maintain of their own profile information on preferred modes of communication, delivery, etc.<br>Electronic Communication:<br>All communication can be performed electronically remote from customer's IT systems as, e.g., ERP or procurement platform.<br>Self Service:<br>Web self service for customer specific transactional inquiries via PCs, set top boxes, and kiosk. |

TABLE 5

Product Management

| | |
|---|---|
| Description: | Manage products and services as they are offered to customers. This is an area of innovation and opportunity management. Initiatives have to be aligned with Marketing, Sales and Operations. Product portfolio has to be monitored and kept consistent. This area also contains the necessary activities to generate insight into the market and customers. |
| Basic Criteria: | Organization and Methods:<br>No dedicated organization for product management. No product management methodology.<br>Some individuals have been designated to manage the products.<br>Innovation Management:<br>Innovation is mostly restricted to match key competitors ("me-too") or capture offerings that are already provided in operations.<br>Product Portfolio:<br>Inflation of similar products which cannot be properly distinguished by customers and lead to inefficient production processes.<br>Product value proposition not ensured along the supply chain.<br>Product development is driven by internal company needs. |
| Competitive Criteria: | Organization and Methods:<br>Product Management organization has been defined.<br>Innovation Management:<br>Opportunities for new products are gathered sporadically from different sources like operations, general market trends or customer feedback and stored in scattered databases.<br>Product Portfolio:<br>New advanced services are designed, developed and launched jointly with key customers. |
| Market Leading Criteria: | Organization and Methods:<br>Product Management methodology is available and trained consistently.<br>Product Management is well integrated with the other capabilities.<br>Process across capabilities for product introduction/ improvement.<br>Innovation Management:<br>Clearly defined innovation process and assigned responsibilities.<br>Available data within the organization (customer surveys, feedback management, etc.) is systematically used to leverage the process.<br>Applications support the collection, vetting and development of new ideas through virtual collaboration.<br>Offerings are driven by buyer values or predicted needs.<br>Buyer value studies, focus groups or other community building activities are key inputs to the product initiation.<br>Product Portfolio:<br>Product Management maximizes both customer value and profitability.<br>Product portfolio is reduced in redundancy and optimized for Customer, Operations and Marketing needs. |

TABLE 6

Pricing

| | |
|---|---|
| Description: | This process determines of the structure and level of prices to offer based on the cost to build the product/provide the service, market requirements and business strategy. The pricing strategy and guidelines are established and the price is determined. The pricing is market relevant and competitive, covers the costs of the provided services and allows for appropriate margin contribution. It is communicated internally and externally. |
| Basic Criteria: | Flexibility:<br>Basic and additional surcharges can have no interdependencies between them. |

TABLE 6-continued

Pricing

|  | |
|---|---|
| | Accuracy:<br>Pricing is based on data as given by the customer order and this data is only adjusted manually in case order data was significantly incorrect.<br>Customer Support:<br>Basic pricing grids are available to customers either paper-based or on website.<br>Governance:<br>Only basic pricing strategy is in place.<br>Pricing tariffs are managed in local terminal systems leading to no company wide overview of pricing and applied discounts.<br>Centrally structured pricing negotiation metrics and approval for more complex offerings (>5 days).<br>Market Agility:<br>Manual adjustments of tariffs only if needed. This is a time consuming process.<br>Price Determination:<br>Pricing mainly driven by market conditions not taking real costs (e.g., of additional services) into account.<br>Standardized pricing according to product. |
| Competitive Criteria: | Flexibility:<br>Through multi stage pricing conditional pricing rules can be defined taking interdependencies between services into account.<br>Support for spot market integration for ad-hoc pricing of charter or quotation requests.<br>Accuracy:<br>Pricing is based on shipment data, e.g., with inputs from weight and volume machines being more accurate.<br>Customer Support:<br>Service in call-centers which tariffs are most applicable for customer's needs.<br>Governance:<br>Detailed pricing strategy along customer segments.<br>Pricing guidelines are managed on corporate level. For Pricing real costs are considered.<br>Centrally structured and managed pricing negotiation guidelines for complex pricing and contract creation process (<1 day).<br>Market Agility:<br>Relative and absolute mass price update functionality is available.<br>Tariffs have start and end date.<br>Price Determination:<br>Some basic price simulations are performed. These are based on a basic understanding of associated costs.<br>Standardized pricing according to product and channel. |
| Market Leading Criteria: | Flexibility:<br>Support for multiple tariff structures with different inputs within one contract (e.g., pricing based on pallets, items or bulk volume).<br>What-if comparison, e.g., with competitor's tariff structures can be performed during price determination in order to provide a Competitive offering to customers in Customer Management capability (sales).<br>Accuracy:<br>Internal controls ensure that discounts are applied appropriately.<br>Customer Support:<br>Users can request price information using configuration tool on website.<br>Governance:<br>Pricing strategy also includes demand and competitor pricing and capacity plan.<br>Centrally structured, value based pricing negotiation guidelines, with assigned resource for complex pricing and contract creation process (Real Time).<br>Market Agility:<br>Pricing can be easily tailored to Marketing promotion requirements.<br>Price Determination:<br>Price simulations using market research, scenarios and activity based costing.<br>Dynamic pricing options are available and yield management is performed. Customer profitability, loyalty and/or risk profile used to determine pricing. |

TABLE 7

Marketing

|  |  |
|---|---|
| Description: | This capability entails the processes for marketing the products, services and brands. These include conducting market research and analysis in order to develop and execute marketing initiatives such marketing campaigns and targeted advertising activities. |
| Basic Criteria: | Marketing Data Foundation:<br>Marketing and promotional efforts are using generic market information and intelligence to a limited extent.<br>Marketing IT Support: Standard productivity tools are used to collect and consolidate marketing data.<br>Campaign Focus:<br>No customer segmented marketing, no differentiated campaigns.<br>No formal process for marketing campaign design.<br>Campaign Planning Time:<br>Long planning lead times for campaigns.<br>Campaign Monitoring:<br>Little application of prior campaign learning. No formal response tracking. |
| Competitive Criteria: | Marketing Data Foundation:<br>Marketing and promotional efforts target market segments in an industry wide format. Detailed market information and business intelligence is used to distill key insights.<br>Customer information is collected via transactional systems and addresses specific requirements.<br>Marketing IT Support:<br>Basic data mining facilities are in place for analysis of customer insight.<br>System support exists to assist or automate marketing activities (e.g., list generation).<br>Campaign Focus:<br>Campaign Management is used to foster the Marketing impact.<br>Increased use of targeted vehicles (e.g., email, direct mail), but limited message targeting. Marketing targeted to broad segments Marketing processes exist, but are inconsistently applied.<br>Campaign Planning Time:<br>Inconsistent planning lead times for campaigns<br>Campaign Monitoring:<br>Campaign results are tracked and monitored. Response tracking used to plan future campaign efforts. |
| Market Leading Criteria: | Marketing Data Foundation:<br>Information at market and customer level is obtained to allow for targeted analysis, cross-selling, account planning, marketing and promotions.<br>Marketing IT Support:<br>Marketing applications support easy access and distribution of information to dedicated target groups.<br>Advanced data mining capabilities and competitor tracking tools are available.<br>Full integration between marketing, sales, and customer service programs.<br>Campaign Focus:<br>Rigorous campaign management to outperform competitors.<br>One on one marketing. Customers finely targeted, with appropriate messages geared to customer segments.<br>Closed loop, repeatable and consistent processes in place for the marketing program.<br>Campaign Planning Time:<br>Short planning lead times.<br>Campaign Monitoring:<br>Analytics from previous campaigns used as input when designing future campaigns.<br>Consequent analysis and re-adjustment of Marketing spend. |

TABLE 8

Sales

|  |  |
|---|---|
| Description: | This capability entails all the processes that are necessary to sell the organization's products and services. This |

TABLE 8-continued

Sales

| | |
|---|---|
| Basic Criteria: | covers creating a sales plan/strategy, preparing for customer contact, executing sales activities (recommending and demonstrating products and services, etc.), and analyzing sales performance to ensure that sales objectives are being met.<br>Sales planning:<br>Planning is done standalone without being aligned with other capabilities.<br>Sales processes:<br>Product based sales support.<br>Product based sales execution and objectives (eye on only one prize).<br>Account Management:<br>Product based business case. Individual account based management of contract terms and conditions (focus on the individual sale).<br>Sales Activities Coordination:<br>Sales activities are not systematically tracked. Only limited information about number of leads and contracts available. This activity is substantial manual effort. No historical information available. Manual handling of quotations.<br>Customer Data Use:<br>Limited use of customer data.<br>Sales Force Compensation:<br>Performance appraisals have little or no impact on salary. Fixed compensation approach. |
| Competitive Criteria: | Sales planning:<br>Some alignment activities are performed between Sales Planning, Network Planning, Capacity Planning, Operations and Budgeting capabilities. However no joint planning is feasible as planning is performed on scattered applications.<br>Sales processes:<br>Consultative, generic solution sales support.<br>Combined product based sales execution and objectives (eye on a couple of prizes).<br>Account Management:<br>Account based business case. Central management of all customer contract terms and conditions (focus on the collective whole).<br>Sales Activities Coordination:<br>Sales activities supported by standalone applications that allow visibility of customer profitability, history and buying behaviors across modes. Tool support for quotations and RFQs. is available.<br>Customer Data Use:<br>Different sales approach for each customer segment.<br>Sales Force Compensation:<br>Some use of variable compensation tied to selling and service KPIs. |
| Market Leading Criteria: | Sales planning:<br>Full IT integration supports collaborative planning between capabilities.<br>Detailed collaboration and optimization approach is in place.<br>Sales processes:<br>Consultative, industry solution based sales support.<br>Solution based sales execution and holistic account execution and objectives (eye on the big prize).<br>Account Management:<br>Jointly defined business case with shared exposure.<br>Central management of all customer contract terms and conditions and their relationships to other contracts.<br>Sales Activities Coordination:<br>Networked sales force automation tools allow for global visibility of deals, leads, quotations and RFQs. Business intelligence solutions provide information at market and customer level to allow targeted cross-selling and account planning. Prospects tracking is performed.<br>Customer Data Use:<br>Insight into individual customer value/profitability, behavior, and preferences is leveraged to personalize customer interactions in real-time.<br>Sales Force Compensation:<br>Significant variable compensation as a percent of total, highly dependent on KPIs, including customer-centric measures. |

TABLE 9

Booking and Order Management

| | |
|---|---|
| Description: | Booking and Order Management entails all the interfacing activities required after the customer has agreed to a sale. This includes capturing the details of the order, validating the order can be fulfilled, verifying the order is correct, processing the order, releasing the order so that it can be fulfilled, verifying that the order has been fulfilled and performing of analysis on the entire order fulfillment process. This includes customer booking requests (for a capacity) and for orders (contract). |
| Basic Criteria: | Data Entry Performance:<br>Mostly manual order data entry performed into local systems.<br>Simple order validation by system.<br>No central order database.<br>Status and Workflow:<br>View and change order status not centrally possible.<br>Basic workflow components.<br>The order tracking system is manual and inaccessible to customers.<br>Information is shared internally only in the supply chain segment which owns the data.<br>Regular FTL Bookings (Point to Point):<br>Managed as single shipments/capacities.<br>No systematic management of lead and loading times and event management. |
| Competitive Criteria: | Data Entry Performance:<br>Multiple channels (manual, EDI, web-based) allow for automated order data validation by the system. Some manual verification on certain data categories is still required.<br>Order entry system linked to customer profiles, contract database and production systems: Pre-filled order templates enhance validation and prequalification of orders.<br>Automated order confirmation. Ability to consolidate multiple orders.<br>Automated reservation of capacity needed in operations.<br>Status and Workflow:<br>Enhanced workflow functionality including alarm and event management.<br>Tracking is automated and visible throughout the organization.<br>Customers do have access only through call centers.<br>Information is shared internally across the whole supply chain. |
| Market Leading Criteria: | Data Entry Performance:<br>Customer order integration via EDI, Customer Automation Systems, or website.<br>Full integration: Automated order confirmation, price calculation and scheduling.<br>Mapping of the end-customer profile for incoming third party orders (customer's customer orders).<br>Status and Workflow:<br>Order tracking is automated and visible throughout the organization and electronically to customers.<br>Shortfall in supply is forecasted and proactively managed.<br>Customers have full Track and Trace and Proactive Monitoring and Reporting capabilities.<br>Real time Information shared between supplier and customer systems, including funds transfer, POS data.<br>Regular FTL Bookings (Point to Point): |

TABLE 9-continued

Booking and Order Management

Full system support. Lead and loading times as well as events are managed according to detailed guidelines and procedures.

TABLE 10

Solutions Management

| | |
|---|---|
| Description: | The capability describes the definition, deployment and management of non-standard, customer-centric products, services and solutions. |
| Basic Criteria: | Requirements Management:<br>Product definition and operational requirements available only on a high level.<br>Development takes only internal requirements into account: participating external partners are not properly informed and controlled.<br>Collaboration:<br>Limited communication between customers, partners and operational staff.<br>Insufficient coordination of milestone and product rollout.<br>Solutions Development Environment:<br>Only little tool support for collaboration and operations design.<br>Solutions Management Quality:<br>Products are considered implemented but related service commitments are not ensured throughout the whole supply chain.<br>Agility:<br>Long product lead times: New products or solutions cannot be implemented as fast as needed. |
| Competitive Criteria: | Requirements Management:<br>Solution definition and operational requirements are defined on a detailed level.<br>Operations manual for each product/service has been developed and communicated to operations.<br>Collaboration:<br>Coordination and communication across all parties.<br>Milestones and project plan/roll-out is aligned with Marketing and Product Management capability.<br>Solutions Development Environment:<br>Technology is consistently leveraged to improve/extend services with a view to improve business performance.<br>Solutions Management Quality:<br>Product related services are ensured throughout the whole network. The product is properly integrated.<br>Service partners are aligned in order to support the product.<br>A business case is available and regularly updated to reflect real costs and benefits.<br>Agility:<br>Time to market issues are addressed. |
| Market Leading Criteria: | Requirements Management:<br>New advanced solutions are designed, developed and launched jointly with key customers.<br>Technology and new opportunities are consistently leveraged to improve services and performance.<br>Collaboration:<br>Interests of stakeholders are properly managed for smooth collaboration.<br>Open and team oriented working environment.<br>Solutions Development Environment:<br>Rapid new service introduction enabled by methodology and early 'fit' design.<br>Solutions operational costs to serve are known and controlled.<br>Solutions Management Quality:<br>Service quality KPIs are defined and monitored (with roll-out).<br>Product operational costs to serve are fully known and controlled.<br>Continuous follow-up activities to improve product and service. |

TABLE 10-continued

Solutions Management

Agility:
Optimized high speed product development.
Marketing takes development time into account during Marketing Plan.

TABLE 11

Customer Service

| | |
|---|---|
| Description: | This capability involves the processes required to service customers and measuring the service effectiveness. Customer care is administered, customer accounts and customer profiles are managed, and warranty/insurance and returns are processed. |
| Basic Criteria: | Customer Relationship Management (CRM):<br>Customer satisfaction only polled on ad-hoc basis.<br>No process for customer satisfaction improvements.<br>Service Performance:<br>Service level agreements are adopted by specific requests from key accounts.<br>No specific processes or systems are available to capture customer service performance.<br>Customer Specific Service Levels:<br>No customer differentiation, e.g., ABC customers.<br>No customer personalization.<br>Customer Service Quality:<br>Customer/Partner service initiatives are reactive in nature. |
| Competitive Criteria: | CRM:<br>Regular surveys sent to customers with improvement suggestions.<br>Service Performance:<br>Key performance indicators are developed at the regional level to support verification of customer service performance.<br>Consistent processes and systems are in place to capture data automatically with some manual intervention for service levels.<br>Customer Specific Service Levels:<br>Adjustments to a limited extend in service procedures for premium customers.<br>Customer Service Quality:<br>Customer information requests are handled dynamically.<br>Customer insight used to shape static customer experience.<br>Focus on relationships and value-add services. |
| Market Leading Criteria: | CRM:<br>Customer satisfaction is closely monitored and relationship management procedures are defined. Value contribution is continuously optimized over the full life-time of the customer.<br>Service Performance:<br>Key performance indicators on global level. Fully automated capture of service performance.<br>Processes and procedures for around the clock service performance and peak times exist.<br>Customer Specific Service Levels:<br>Customer service performance is differentiated to customer needs.<br>Highly differentiated treatment of customers based on revenue and profitability.<br>Service performance is adjusted to customer groups.<br>Customer Service Quality:<br>Interactive, closed loop one-stop problem resolution.<br>Proactive and interactive service established based on customer information.<br>Adequate information and empowerment to dynamically offer incentives to retain high value customers planning to defect.<br>Using customer service to strengthen overall value proposition.<br>Virtual access channels (anytime, anyhow, anywhere). |
| Description: | This capability involves the processes required to service customers and measuring the service effectiveness. Customer care is administered, customer accounts and customer profiles are managed, and warranty/insurance and returns are processed. |

TABLE 11-continued

Customer Service

| | |
|---|---|
| Basic Criteria: | Costs to Serve:<br>There is some understanding of the cost to serve customers/customer segments but costs are often merely allocated to products.<br>Claim/Complaint Centralization:<br>Back office processes are executed in the local facilities.<br>Claim/Complaint Tracking and Processing:<br>All transportation claims are manually tracked and processed.<br>Claim/Complaint Process:<br>Only basic descriptions of claims and complaints processes and guidelines are available.<br>Claims and complaints processes are distributed over several business functions.<br>Claim/Complaint Performance:<br>There is no visibility on claims and complaints performance.<br>Claim/Complaint Human Resources:<br>There is no specialized staff for claims and complaints management. |
| Competitive Criteria: | Costs to Serve:<br>There is an understanding of the cost to serve customers which is based on a contribution level analysis for each customer/customer segment.<br>Claim/Complaint Centralization:<br>Back office processes have been centralized.<br>Claim/Complaint Tracking and Processing:<br>Automated claim tracking process.<br>Service representative are system empowered to resolve issues.<br>Reminders and follow-up actions are automatically generated.<br>Claim/Complaint Process:<br>Claims and complaints processes and guidelines have been defined on a case by case basis.<br>Claim/Complaint Performance:<br>Goods investigation processes have service level agreements (e.g., same day). Some claims and complaints key performance indicators are measured like e.g. the time to manage a claim.<br>Claim/Complaint Human Resources:<br>Dedicated skilled staff for claims and complaints management. |
| Market Leading Criteria: | Costs to Serve:<br>There is a full understanding and control of the cost to serve all customers based on Activity Based Costing methodologies for all direct and indirect costs.<br>Claim/Complaint Centralization:<br>See Competitive Criteria.<br>Claim/Complaint Tracking and Processing:<br>Proactive and customer-focused claims resolution with automated submission and tracking systems.<br>Claim/Complaint Process:<br>Support tool with policies and guidelines which supports the staff during their work and increases efficiency. The support tool is fully integrated with claims and complaints systems and provided context sensitive help and guidance to the staff.<br>Claim/Complaint Performance:<br>Key performance indicators are monitored automatically. Reporting and follow-up facilities are in place in order to continuously improve performance. Trend analysis on any category of claims or complaints can be performed.<br>Claim/Complaint Human Resources:<br>Dedicated staff is foreseen which is skilled. Accountability of individual employees to resolve claims and complaints courteously and fairly is ensured. |

TABLE 12

Invoicing

| | |
|---|---|
| Description: | Invoicing refers to order-to-cash payment collection: invoicing preparation, delivery and investigation processes. |
| Basic Criteria: | Invoice Distribution:<br>Paper based invoices.<br>Multiple customer invoicing interface points within a country.<br>"Bill to" address can be different from customer address.<br>Invoice Consolidation:<br>No consolidation of transactions.<br>Rate Calculation:<br>Restrictions in rate calculation of basic or additional services. Services are rated stand-alone having no dependencies with other services. For international shipments manual split of duty and VAT for freight is performed.<br>Purchase order and non-purchase orders are possible to be invoiced.<br>Pre-Invoice:<br>Pre-invoice can be created in order to avoid credit notes after the invoicing. Reason is bad alignment of additional surcharges with the customer.<br>Self-Invoicing:<br>Customer cannot use self-invoicing option.<br>Customer Master Data:<br>Master data only optimized when errors detected. |
| Competitive Criteria: | Invoice Distribution:<br>Outsourced invoice printing and distribution has been considered.<br>Still multiple customer invoicing interface points within a country.<br>Invoice Consolidation:<br>Invoice printing/distribution is consolidated in order to take full advantage of bulk mail discounts.<br>Customization of invoicing facilities is provided for key customer, e.g., invoicing separately for each customer's business unit.<br>Rate Calculation:<br>Restrictions in rate calculation of basic or additional services: Services are rated stand-alone having no dependencies with other services.<br>For international shipments manual split of duty and VAT for freight is performed.<br>Pre-Invoice:<br>No pre-invoicing is necessary as invoicing stable and additional surcharges aligned with customers.<br>Self-Invoicing:<br>Customer can use self-invoicing option.<br>Customer Master Data:<br>A regular process for master data maintenance is in place. |
| Market Leading Criteria: | Invoice Distribution:<br>No paper-based invoice is needed anymore, payment can be made from EDI information; online approval for exception invoices over predetermined tolerances.<br>Invoice Consolidation:<br>Invoices can be consolidated for services provided by third parties over other distribution channels.<br>Single invoice reflects charges for all transactions, on customer request across business units.<br>An invoice can be created for a customer for all services provided within a region or all over the world.<br>Rate Calculation:<br>Proper invoicing of away collection (pick-up in country A, delivery in country B, invoicing/customer residing in country C) is fully supported.<br>Complex rating rules are supported like multi-dimensional tariffs, time bands and event segmentation.<br>Tariff change can be applied within an invoicing period.<br>Customer Master Data:<br>Customers can be required to complete their master data online. |

The following Tables 13-20 provide an explanation of the capabilities and corresponding key assessment areas and performance capability criteria for each capability within the enablement platform 104.

TABLE 13

Capacity Planning

| | |
|---|---|
| Description: | This strategic planning capability contains all activities required to forecast demand, determine the capacity required to profitably satisfy the demand, identify missing or excess capacity and decide whether to make or buy respectively sell or use the capacity. Simulations and what if scenarios are used to run different models and determine the most profitable way to meet the expected demand. This capability has a strategic, long- to mid-term time horizon, in which forecasts are continuously being concretized and capacity planning decisions are reviewed, adjusted and cascaded into lower-level planning cycles. |
| Basic Criteria: | Demand Determination: Demand forecasting is based on historical trends only. Each facility/division performs an individual forecast. Forecasting is a manual task using spreadsheets; statistical tools are not available/used. Forecasting techniques are judgmental and accountability is unclear/ineffective. Forecast Reliability: Reliable sales forecasts cannot be determined from Sales Planning resulting in a high degree of forecasting errors. Higher spare capacities foreseen to manage demand variance. Integration: Capacity planning process is not effectively integrated with Sales Planning, Marketing or Operations capabilities. Multiple forecasts exist for different functional purposes. Frequency: High-level capacity planning is tailored on yearly basis; its accuracy is not scientifically measured. |
| Competitive Criteria: | Demand Determination: Marketing insights (trends, events), sales forecasts, and external sources are used in order to forecast demand. Volume and capacity are forecasted consistently across facilities. Multiple algorithms are used to determine forecast. Forecast Reliability: Capacity planning can be forecasted to a certain extend in time and volume based on regularly updated sales and revenue figures. Figures have probabilities assigned, and variance of historical data is measured. Statistical techniques are well understood by users; specific data characteristics are evaluated. As a result spare capacities can be reduced. Integration: Capacity planning is key input into an integrated planning process; all relevant resources are modeled, including space, labor, freight volumes, production, etc. Operations managers and supervisors have access to forecasts and use them to adjust weekly/daily plans. Tools not yet fully integrated, require manual alignment. Frequency: Regular update of capacity plan is performed. Feedback is provided to forecast input providers through an exception based review process. |
| Market Leading Criteria: | Demand Determination: Demand is forecasted using statistical methods for trend analysis, including third party information and (real time) POS data. Sales forecasts obtained base on production forecasts of (key) customers wherever possible. Utilization of early demand signals or leading indicators for new products to extrapolate total demand. Forecasting accountability spread across corporate boundaries. Forecast Reliability: Multi-level aggregation capacity planning is tailored continuously and forecast errors are monitored, based on tracking signal and number of manual overrides. Shipment volumes are prioritized, e.g., by product code in order to compensate demand variations. |

TABLE 13-continued

Capacity Planning

| | |
|---|---|
| | Integration: Joint collaborative planning with Sales Planning, Marketing or Operations capabilities supported by fully integrated tools, e.g., to suggest alternate schedules. Collaborative planning approach includes clients, partners and suppliers. Integration of real-time demand information. Frequency: Capacity plan is continuously improved based on updated demand figures and probabilities. |

TABLE 14

Network Planning

| | |
|---|---|
| Description: | This strategic capability involves modeling and (re-)designing the network by performing cost evaluations of locations, what-if analysis of current territorial divisions, transportation network analysis, and positioning of terminals and distribution centers, sorting facilities as well as identification of strategic partnerships, multi-modal, round-flow and consolidation options. The network plan, being an output of this activity, balances the goods flows between the recommended facility and provides a routing table per product type on facility level. |
| Basic Criteria: | Network Complexity: Simple mono-modal national network based on historically grown structures, processing presence in each (local) geography served. Investment and Savings Detection: Occasional identification of investment or savings opportunities. Planning Aspects: Planning is based on expected volumes and available capacities only. Network planning is of tactical, rather than strategic nature. Strategic planning takes place in reaction to major discontinuities or marketplace events. Planning is done without standard tools and each processing center may have different format of plans. One-size-fits-all philosophy towards processing centers; each center had nearly identical processing plans. Back and round flows are subject of investigation. Network plan is verified against service commitments (e.g., day + 1 delivery within the country). Average transit times between terminals and hubs are taken into account during planning activity. Integration: Network plan adapted based on input from operations. Partner integration is not considered/feasible. |
| Competitive Criteria: | Network complexity: Regional network with limited flexibility. The network is not tailored to specific customers or customer segments. Inter-modal options are considered based on a rough calculation scheme. Multiple routing options are supported for overload management but without further differentiation (e.g., by product code). Some variability in scheduling plans at facilities, allowing capacity to be shared across the network. Investment and Savings Detection: Structured process for identification of investment or saving opportunities. Planning Aspects: Thorough analysis of vulnerabilities, dependencies and sensitivity is performed; strategic planning occurs periodically. Appliance of what-if scenarios. Sorting time-lags at hubs and terminals are taken into account. Outsourcing of network lines is a considered option. Standard tools are in place to help with the short term planning (focus on data collection). |

TABLE 14-continued

Network Planning

|  |  |
|---|---|
| | Integration: |
| | Mid-term sales forecasts considered for network planning, alignment with capacity planning. |
| | Key partners are integration to various extends into the network plan. |
| Market Leading Criteria: | Network complexity: |
| | Global network strategy under proactive reviews. |
| | The regional or global network is planned inter-modal. |
| | Partners are fully integrated within the network plan. |
| | Varying routings can be determined based on product code/service level of shipment (e.g., standard deferred shipments vs. time definite shipments). |
| | Investment and Savings Detection: |
| | Network simulation is a significant input into M&A decisions. |
| | Product flow and locations across the supply chain are optimized of cost, quality and service parameters. |
| | Planning Aspects: |
| | Customer and product SLAs and various optional constraints considered in the planning process. |
| | Network is flexible and therefore adapted to demand pattern changes, seasonality or terminal unavailability; outsourcing is applied where appropriate. |
| | Simulation tools are used applying strategic or heuristic approaches. |
| | Analytical tools support longer-term planning processes to understand the flexibility of the entire network. |
| | Integration: |
| | Fully integrated Capacity and Network Planning. |
| | Partners are fully integrated into the network plan. |

TABLE 15

Production Planning

|  |  |
|---|---|
| Description: | Production Planning is a tactical planning level where pick-up and delivery zones are determined and according pick-up, delivery and network tours are pre-planned. If there is varying supply/demand in different geographical regions the tactical balancing of equipment is investigated. An integrated production plan for resources and equipment, including sorting activities, within the terminals is created and managed. |
| Basic Criteria: | Planning Approach: |
| | Planning process is reactive due to limited information and visibility of future demand. |
| | Manual planning in monthly time periods with no simulation capability. |
| | Systems not integrated across multiple-plant environments. |
| | Transportation plans are developed for either inbound or outbound direction only. |
| | Decisions based on cost or service alone; Incomplete cost control/accountability (e.g., proper cost allocation). |
| | Planning Flexibility: |
| | Plans are static for long timeframes within a facility. |
| | Sort plans created without analytical tools; based on volume observations. |
| | Most processes are done manually with little tracking of quality or cost. |
| | Reluctant in partnering with service providers. |
| | (Systems) Integration: |
| | Small amount of data or no details collected for defining the transportation plan. |
| | Little, or no information is gathered from freight bill for management reporting or other uses. |
| Competitive Criteria: | Planning Approach: |
| | Planning is done for multiple time horizons with varying time buckets and product levels. |
| | Detailed planning tool for short term production scheduling. |
| | Business requirements planning with integrated feedback loops; long-term planning reflects seasonality and cyclicality. |
| | Primarily driven by demand-based (pull) scheduling techniques. |

TABLE 15-continued

Production Planning

|  |  |
|---|---|
| | Inbound shipments are tracked and inbound loads are manually matched to outbound loads for the own fleet. |
| | Planning Flexibility: |
| | Sort plans can be changed to some extent, based on a particular processing shift or time of year. |
| | (Systems) Integration: |
| | Facility-wide integration of production data. |
| | Partners are provided with a rolling forecast of transportation requirements monthly. |
| | Accurate data available without the ability for real time report generation. |
| | Business-focused negotiation but regionally/locally-managed relationships. |
| Market Leading Criteria: | Planning Approach: |
| | Simultaneous optimization of all planning activities. |
| | Customer/partner input submitted for optimal cost/service trade-offs. |
| | Short term requirements used to opportunistically shift modes, carriers, schedules. |
| | Planning Flexibility: |
| | Sort plans can be changed based on the actual shipments, analyzing large data to determine the correct machine routings. |
| | Automated transportation communication with partners and customers triggers flexible planning capabilities. |
| | (Systems) Integration: |
| | Integrated systems for all stages of operations, linked to inventory and materials planning - across the enterprise. |
| | Production schedules integrated with customers to develop mutually beneficial planning horizons or to support JIT sourcing. |
| | Create partnerships with service providers and share productivity gains. |
| | Excellent data available; contains complete, real-time production, carrier and other relevant data. |

TABLE 16

Scheduling

|  |  |
|---|---|
| Description: | Scheduling deals with the operational planning for customer orders and pick up requests. This includes the creation of transport orders for every leg of a specific customer order and the allocation of orders to pre-build trips as well as ad-hoc transport planning especially for freight shipments. Resources, like people, fleet, equipment or external partners/suppliers, are assigned to fulfill the planned transport and excess or missing capacity is traded on the spot market. Where required, detailed routing information is provided to execute a transport plan. Based on the planned transportation schedules, the production plans are reviewed and if necessary adjusted to address the actual transportation requirements. |
| Basic Criteria: | Scheduling Flexibility: |
| | Vehicle routes are rather fixed for the defined planning period (e.g., bi-annually). |
| | Basic constraints management with regular constraints identified and limited visibility to the schedulers. |
| | Alternative schedules not possible (or very time consuming). |
| | Scheduling alternatives only considered to address service/performance issues. |
| | Geographical Range: |
| | Scheduling is done locally or between few terminals. |
| | Scheduling Considerations: |
| | No time slotting in terminals. |
| | Frequency as well as peak demand volumes and timing are not considered. |
| | No formalized contingency plan in place. |
| | Downstream fulfillment constraints (warehouse, shipping, etc.) are not considered. |
| | Backhauls not considered when planning shipments. |
| Competitive Criteria: | Scheduling Flexibility: |
| | Maintenance slots, vacation, preferred teams are taken into account for scheduling. |

TABLE 16-continued

Scheduling

|  |  |
|---|---|
| | Time windows are established for in/outbound traffic. Guidelines for short term flexibility are defined and according schedule updates ensured. Scheduling is regularly reviewed and adjusted. Overcapacity is actively managed between terminals. Geographical Range: Scheduling of vehicles is performed on a regional level. Scheduling Considerations: Capacity utilization is monitored. Resources (vehicles, equipment, human resources) are categorized and classified and mapped with detailed criteria in order to fulfill the demand. Contingency plan based on experience and personal contacts rather than contracts. Maintenance slots, vacation, preferred teams are taken into account for scheduling. Time windows are established for in/outbound traffic. |
| Market Leading Criteria: | Scheduling Flexibility: Short term capacity forecasts are used to opportunistically shift modes, carriers and schedules. Automated scheduling forecast based on orders and bookings - bottlenecks are proactively managed; time windows are scheduled to the half hour. Continuous planning cycle which can quickly react to changes in forecasts or other parameters. Geographical Range: Scheduling of vehicles is done on regional or global level. Scheduling Considerations: Customer/partner input for optimal cost/service trade-offs is used. Documented contingency plans for action. Alternative relationships developed. Centralized and automated rule-based dynamic routing and scheduling. Advanced constraints such as business objectives, customer priorities, financial impact, and alternate routings are optimized. |
| Description: | Scheduling deals with the operational planning for customer orders and pick up requests. This includes the creation of transport orders for every leg of a specific customer order and the allocation of orders to pre-build trips as well as ad-hoc transport planning especially for freight shipments. Resources, like people, fleet, equipment or external partners/suppliers, are assigned to fulfill the planned transport and excess or missing capacity is traded on the spot market. Where required, detailed routing information is provided to execute a transport plan. Based on the planned transportation schedules, the production plans are reviewed and if necessary adjusted to address the actual transportation requirements. |
| Basic Criteria: | Scheduling Methods: Manual and static schedules base on "intuitive" judgment and "works as always". No continuous review of schedules. Develop schedule without analytical tools/systems support. Schedule bases on historical volumes (same period last year). Standalone systems in place to plan and report on scheduling operations. Resource Assignment: Human resources, equipment and vehicles are managed manually. "Bottleneck" resources are viewed as common constraints across all product lines. FTL/PTL Disposition: FTL/PTL requests are checked and allocated manually. Free spot capacities are offered informally. |
| Competitive Criteria: | Scheduling Methods: Simple optimization systems. Use of an analytical tool. Supporting Systems partially integrated. What-if scenarios are validated against the concrete scheduled movements (based on historical data and expected growth). Yearly review cycle to re-plan based on changes. Otherwise schedules are reviewed at "crisis" times and changed to reflect short-term fluctuations. |
| | Resource Assignment: Human resources, equipment, vehicles are managed in the context of daily capacities. Resources (vehicles, equipment, human resources) are categorized and classified and mapped with detailed criteria in order to fulfill the demand. FTL/PTL Disposition: FTL requests are checked and allocated manually and free spot capacities are offered informally. Capacity utilization is actively monitored. |
| Market Leading Criteria: | Scheduling Methods: Scenario based computer-aided simulation: network management tool to establish parameters, EDI or web links to share real time informationon requirements and capacities. Full systems integration (incl. analytical tools) allows consideration of all relevant areas/constraints. Sophisticated scheduling capabilities available in order to link human resources, vehicles and equipment to daily capacities taking all requirements into account. Use of advanced optimization methods and algorithms with a holistic view of an entire operation. Resource Assignment: Locate and manage employees using real-time clocking information Sophisticated scheduling capabilities available in order to link human resources, vehicles and equipment to daily capacities taking all requirements into account. FTL/PTL Disposition: Allocation of FTL requests automatically, just approval by dispatcher is required. Electronic support and integration with spot market where applicable. |

TABLE 17

Labor Planning

|  |  |
|---|---|
| Description: | Based on the required internal labor capacity, this capability deals with the planning of roster and shift schedules, planned resource availabilities to fill the determined slots and the management of peaks, adjustments and exceptions. |
| Basic Criteria: | Work Efficiency: Labor efficiency is reviewed on a regular basis. Employee Development: Training foreseen on individual need. No structured employee development. Employee Satisfaction: Team preferences are considered. Planning Approach and Accuracy: Jobs and positions are properly monitored. Required roles and teams are properly foreseen to be scheduled. Labor planning is aligned with scheduling. Processing issues determined by managerial observation. Employees managed and located by walking the shop floor. Labor plan developed based on historical labor usage and manager requests; no performance reports. Planning Flexibility: Shortages (e.g., illness) in staff are only managed in operations capabilities on ad-hoc basis. Staff foreseen which is not always fully utilized in average and low peak time periods. |
| Competitive Criteria: | Work Efficiency: Labor efficiency is reviewed on continuous basis. Results impact scheduling and mid-term roll-on/roll-off requests to HR department. Employee Development: Thorough understanding of training requirements and actual training performed (incl. coaching). Employee Satisfaction: Vacation planning and vacation backlog taken into account for scheduling. Planning Approach and Accuracy: Considers long-term contracts, temporary employments, contracts or personnel from human resources agency. |

TABLE 17-continued

Labor Planning

| | |
|---|---|
| | Exact staffing levels are forecasted and additional human resource costs are managed.<br>Planning Flexibility:<br>Processes and fall-back plans in place to eliminate unforeseen manpower shortages.<br>Part-time workers are used on ad-hoc basis to manage demand peaks. |
| Market Leading Criteria: | Work Efficiency:<br>Efficiency tracking is automated and integrated with HR planning.<br>Employee Development:<br>Training curriculum for employees defined.<br>Progress measured.<br>Employee Satisfaction:<br>Labor planning takes employee preferences into account (work-life balance).<br>Work time models are defined and implemented.<br>Planning Approach and Accuracy:<br>Long-term strategies are developed and they are refined with "what-if" scenarios.<br>Optimize utilizing advanced numerical methods and algorithms.<br>Optimized labor plan based on daily, weekly, and seasonal volume variability and union/specific labor rules.<br>Discover processing issues as they occur from real-time data and predict/prevent future issues.<br>Planning Flexibility:<br>Regional labor management, balancing between terminals and hubs or teams. |

TABLE 18

Operations Management

| | |
|---|---|
| Description: | The capability identifies critical business processes and establishes monitoring/reporting mechanisms (linked to track and trace and exception management capabilities) in order to enable seamless operations. |
| Basic Criteria: | Operations Visibility:<br>Little or no formal measurement approach or collection processes.<br>There is limited internal/external collaboration and optimization initiatives.<br>Simplistic measures, if any, for resource utilization.<br>Metrics are internally focused: terminal utilization, vehicle utilization and production variance.<br>Reporting Enablement:<br>Overall productivity, service, and cost measurements are tracked; performance to budget is reported.<br>Limited service objectives.<br>Performance measures are focused on individual performance and not related to business objectives.<br>Data passed between organizations is not automated.<br>All incidents are managed by phone or radio equipment.<br>Pro-active Monitoring:<br>Temporary teams are assembled to manage large-scale emergencies and disasters at individual nodes.<br>KPIs are measured monthly or quarterly.<br>Most exceptions are not known until a service target is missed. |
| Competitive Criteria: | Operations Visibility:<br>Increased visibility into business processes, such as inventory, logistics and orders.<br>External partners' (Vendors/carriers) performance is tracked.<br>Reporting Enablement:<br>Individual department/operator productivity and quality measurements are tracked.<br>Integrated data from multiple systems within the enterprise are used to monitor key events in the supply chain.<br>Some semi-automated cost and service tracking against actual and budget.<br>Performance measures span the internal supply chain but mainly from a high level strategic perspective.<br>Nodes have systems that provide data from other nodes that can be used to anticipate deviations from plan.<br>Electronic communication with remote employees is possible over wide-area (at least mono-directional) hand-held device.<br>Pro-active Monitoring:<br>Coordination on exceptions between nodes at an area or district level.<br>Some key performance tracking (e.g., MPG, maintenance cost, etc.).<br>Internally set service goals.<br>Some ability to alter plans given sufficient notice of an exception. |
| Market Leading Criteria: | Operations Visibility:<br>Detailed productivity, service, and quality measures across the organization and including third parties.<br>Reporting Enablement:<br>Reporting processes and systems allow activity-based cost reporting.<br>KPI's are tied to individual, department, and company performance goals.<br>Ability to integrate the bi-directional flow of data within key supply chain systems.<br>Central planning capabilities can fine-tune plans at upstream and downstream nodes to react to exceptions.<br>Incidents are managed by hand-held device and phone.<br>Pro-active Monitoring:<br>Exceptions at any node in the network are tracked and managed by specialized group or organization.<br>Preventive mechanisms and warnings support the dispatcher.<br>Automated response; rules can be established to trigger responses to alerts without human intervention.<br>Exceptions at one node trigger automatic notification to other nodes that will be impacted.<br>Operations metrics are communicated to/shared with key third parties (partners, customers, suppliers). |

TABLE 19

Partner and Supplier Management

| | |
|---|---|
| Description: | The capability contains all interaction-driven activities between an organization and its partners and suppliers from portfolio management and tender processing to relationship management. |
| Basic Criteria: | Integration:<br>No collaboration, e.g., partners/suppliers just execute parts of the transportation chain having only limited insight into service commitments originally made to customers, e.g., by 3PL.<br>Locally managed relationships by individual facilities, not integrated into wider network and/or limited flexibility to include regional differences.<br>Products or services are partially offered under the partner's brand.<br>Selection process:<br>Selection criteria is based on price and quality only.<br>Many partners and suppliers within the portfolio.<br>Establish and track Key Metrics:<br>Only cost and service/product delivery are tracked.<br>Internal and external Benchmarks:<br>No benchmarking analysis is carried out.<br>Performance Feedback:<br>No formal or scheduled feedback takes place with suppliers. Supplier is contacted only when a problem occurs. |
| Competitive Criteria: | Integration:<br>Suppliers and partners are beginning to act strategically; they give more insight into their capabilities and flexibility options, work on common cost optimization goals (e.g., under/over capacities) and have full understanding of their responsibilities.<br>Detailed mutual understanding of activities and related costs. |

TABLE 19-continued

Partner and Supplier Management

|  |  |
|---|---|
|  | Regionally managed relationships under common business umbrella.<br>Selection process:<br>Reduced number of partners or suppliers selected according to strategic or at least tactical goals set. Strategic sourcing has reduced partners/suppliers but results are not communicated to users; "non-approved" companies are still utilized.<br>Business users are involved into the selection process.<br>Establish and track Key Metrics:<br>Quality, lead-time and delivery measures are commonly tracked in ERP system with periodic reviews to spot and improve on performance opportunities.<br>Internal and external Benchmarks:<br>Performance is measured against industry benchmarks.<br>Performance Feedback:<br>Specified feedback is shared with individual suppliers. Feedback is tied directly to corporate goals. |
| Market Leading Criteria: | Integration:<br>Partners and suppliers are integrated along the value chain into customer feedback analysis, failure analysis and other key functions.<br>Shared/integrated systems.<br>Collaboration in the realization of complex logistics solutions as well as in related strategic decisions.<br>Selection process:<br>Identification and selection takes place with emphasis placed on willingness/ability to develop long-term strategic relationship.<br>Selection criteria reflects a mix of requirements (service, cost, reliability, technology, etc.).<br>Sourcing of non-strategic goods/services outsourced to third party aggregator or procurement service provider.<br>Establish and track Key Metrics:<br>Key metrics are tracked globally, consolidated; real-time reporting.<br>Partners and suppliers track their own metrics, share and reconcile, and react pro-actively as necessary.<br>Internal and external Benchmarks:<br>Measurement against external benchmarks and against available partner/supplier base.<br>Performance Feedback:<br>Scorecard is provided at set frequency.<br>Continuous communication with partners/suppliers to improve efficiency or service levels and to drive innovations. |

TABLE 20

Settlement

| Description: | This capability describes monetary third party (supplier/partner and inter-/intracompany) settlement procedures for exchanged products or services: receiving, validating, preparing and sending settlements as well as clearing accounts through sending or receiving payments. |
|---|---|
| Basic Criteria: | Invoicing Mode:<br>Third parties invoices are checked manually.<br>No consolidation of transactions: multiple invoices from one partner/supplier per run.<br>Multiple settlement interface points within a region.<br>Accounts payable processes are disbursed throughout the organization (invoicing, approval).<br>Invoicing Options:<br>Third party partners can be invoiced on shipment level. Restrictions in rate calculation of basic or additional services: Services are rated stand-alone having no dependencies with other services.<br>Data, Archiving and Investigation:<br>Third party supplier invoices are archived in local or a central facility and can be obtained on request.<br>Copies of each (paper-based) invoice is made and stored at multiple locations or departments.<br>Master data only optimized when errors detected.<br>Process Flexibility: |

TABLE 20-continued

Settlement

|  |  |
|---|---|
|  | Departments are owners of the processes—errors are corrected at the back-end; much time spent chasing small-value items. |
| Competitive Criteria: | Invoicing Mode:<br>Third parties can use self-invoicing. The third party has to check the invoice if it is correct.<br>Approval process in place but not rigidly followed.<br>The most common transactions can be managed electronically with the bigger partners.<br>Reduced, but still multiple settlement interface points within a region.<br>Invoicing Options:<br>Partners or third parties can be invoiced on other than shipment level, e.g., by stops performed during pick-up and delivery services.<br>Settlement customization is possible for key partners/suppliers, e.g., invoicing separately for each business unit.<br>Outsourced invoice printing and distribution has been considered.<br>Data, Archiving and Investigation:<br>Third party invoices can be optically scanned and archived. Archived invoices can be viewed by staff and customer service.<br>Process Flexibility:<br>Not provided customer payments can be charged directly against the third party.<br>Invoicing is fully flexible to any pricing model, including dependencies between services. Discounts can be on a sophisticate level (e.g., service, bundle or event). |
| Market Leading Criteria: | Invoicing Mode:<br>Electronic settlement is implemented. Full electronic payment and transaction management (e.g., transactions according to Bill of Lading).<br>Paper-based settlement is not needed anymore, payment can be made from EDI information.<br>Online approval for exception invoices over predetermined tolerances is common.<br>View purchasing and payables as one seamless process versus two distinct organizations.<br>Invoicing Options:<br>Settlement can take place for all services provided within a region or globally.<br>Invoice-less processing through use of ERS (evaluated receipts settlement where payment is made after matching receipt to purchase order).<br>Allow suppliers access to view status of payments.<br>Data, Archiving and Investigation:<br>Third party invoices can be obtained/viewed by the partner/supplier (self-invoicing) over the most important distribution channels.<br>Process Flexibility:<br>Complex rating rules are supported like multi-dimensional tariffs, time bands and event segmentation. Tariff changes can be applied within settlement period. |

The following Tables 21-23 provide a continuing explanation of the capabilities and corresponding key assessment areas and performance capability criteria for each capability within the enablement platform 104, and in particular, criteria for a sub-platform referred to as asset management.

TABLE 21

Facility Management (Asset Management)

| Description: | The capability describes the management of terminals, hubs, offices, cleaning, water, maintenance, or electricity. The facility portfolio is maintained and in- or disinvestment decisions are taken. |
|---|---|
| Basic Criteria: | Sourcing Model:<br>All facilities are property of the operator. Facility Management performed in-house and locally. |

TABLE 21-continued

Facility Management (Asset Management)

| | |
|---|---|
| | Facility Design:<br>Evolutionary layout/expansion.<br>Asset Evaluation:<br>Facilities are only evaluated with their booked value.<br>No strategy or plan for asset portfolio. No assessment of market conditions is performed.<br>Security:<br>Facilities are just secured by entry checks. Non-electronic badges.<br>Quality:<br>Facility maintenance services are locally hired resources. Individuals are working on best personal knowledge.<br>Operations:<br>No leverage on purchasing power. No facility deployment plan. Stand alone process or system to track and manage facility information.<br>Monitor and track facility occasionally.<br>No fragmented alignment with Capacity Planning, Network Planning and Scheduling. |
| Competitive Criteria: | Sourcing Model:<br>Sell and lease back of facilities has been evaluated. Procurement takes place against a master business plan.<br>Facility Design:<br>For new facilities optimized layouts and design are implemented according to productivity and efficiency requirements.<br>Asset Evaluation:<br>Develop a sound understanding of a facility's economic life.<br>Security:<br>Usage of electronic badges with key functionality and security concept based on roles.<br>Quality:<br>Quality guidelines and inspection schedules for cleaning, catering, heating and sanitation are defined. Resources can be internal or external.<br>Operations:<br>Deployment is planned according to facility type. Facilities are regularly monitored in automated ways. Limited alignment with Capacity Planning, Network Planning and Scheduling. |
| Market Leading Criteria: | Sourcing Model:<br>Facility management itself is outsourced.<br>Facility Design:<br>Layout of facilities is designed for optimal handling capabilities and maximum throughput in processing facilities.<br>Warehouses and Storage locations are optimized in layout for storing goods.<br>Asset composition is aligned with market and sales strategy.<br>Asset Evaluation:<br>Regular market evaluation is performed in order to understand current value of available facilities.<br>Financial analysis of optimum P&L impact taking account of cash flow objectives.<br>Security:<br>Security concept foresees biometric access checks for key/sensitive areas.<br>Quality:<br>External service provider is managed based on service level agreements.<br>Operations:<br>Advanced tools and technologies are used to manage and track asset.<br>Focus on service level, cost control and competitive advantage. |

TABLE 22

Fleet and Equipment Management (Asset Management)

| | |
|---|---|
| Description: | The capability describes the management of trucks, trailers, loading devices like containers, as well fork lifts, pallets, boxes, cages, tour devices. The fleet and |

TABLE 22-continued

Fleet and Equipment Management (Asset Management)

| | |
|---|---|
| | equipment portfolio is maintained and in- or disinvestment decisions are taken. |
| Basic Criteria: | Sourcing Model:<br>All vehicles and equipment are property of the operator and are managed in-house.<br>Limited leverage on purchasing power.<br>Alignment:<br>No alignment with Capacity Planning, Network Planning, Scheduling, Maintenance, Repair and Overhaul capabilities.<br>Geographical Range:<br>Local and inconsistent fleet and equipment management.<br>Efficiency:<br>No consistent fleet and equipment management; manual and irregular tracking.<br>Fleet and equipment is very fragmented or homogeneous over the facilities, asset portfolio managed reactively.<br>Poor asset utilization, significant detention and loss; asset disposal upon convenience.<br>No asset deployment procedure available.<br>No limited asset lifecycle management and systems support for ALM and/or tracking.<br>Demurrage/Balancing of Loading Devices:<br>Manual and inconsistent management of demurrage and fees for loading helps, etc.<br>Staff loses overview on loading devices. Claims because customer's loading devices not send back. |
| Competitive Criteria: | Sourcing:<br>Outsourcing and leasing have been considered as management and sourcing options.<br>Alignment Limited alignment with corporate goals and Maintenance, Repair and Overhaul capabilities. Incorporation of network requirements.<br>Geographical Range:<br>Regional fleet and equipment management, balancing between facilities.<br>Efficiency:<br>Consequent fleet and equipment management: reduced fleet and equipment types, incorporation of network requirements.<br>Key performance tracking in place. Periodic reviews are performed.<br>Demurrage/Balancing of Loading Devices:<br>Process for demurrage and loading device exchange with customers and partners manually but consistently executed. |
| Market Leading Criteria: | Sourcing:<br>Out-/in-sourcing of fleet management is actively managed.<br>Asset portfolio (plan) fully aligned with market/sales strategy. Asset leases included in asset portfolio. Procurement strategy with formalized bid process and strong relationship with asset vendors.<br>Alignment A well articulated fleet and equipment strategy is in place aligned with the Capacity Planning, Network Planning, Scheduling and Operations capabilities, market and fleet strategy.<br>Geographical Range:<br>Central fleet and equipment management with full insight into available assets.<br>Efficiency:<br>Full ALM and reutilization management of fleet and equipment assets.<br>Focus on service level, cost control and competitive advantage. Mixed fleet tied to requirements, rationalized network.<br>Advanced tools and technologies to manage and track assets.<br>System support integrated to planning functions.<br>Demurrage/Balancing of Loading Devices:<br>Automatic determination of demurrage fees and exchange balances of loading devices with customers and partners. |

TABLE 23

Maintenance, Repair and Overhaul (MRO) (Asset Management)

| | |
|---|---|
| Description: | The capability contains ad-hoc as well as planned and regular maintenance, repair and overhaul activities of fleet and equipment. |
| Basic Criteria: | Supervision:<br>Part-time manager. Shared, internal maintenance resources.<br>Productivity and Performance Tracking:<br>Manual, paper based.<br>No equipment, parts, and performance standards.<br>No formal productivity measurement. No mechanic standards.<br>Cost Controlling:<br>Maintenance costs captured and tracked on aggregate level in broad categories.<br>Process Quality:<br>Equipment replaced when it breaks down or becomes too expensive to repair.<br>Spare Parts:<br>Forecasting non-existent or based on simple historical stocking levels. Each location responsible for planning and procuring their own spares, limited leverage of purchasing power.<br>Manual, paper driven records keeping for parts inventory. |
| Competitive Criteria: | Supervision:<br>Full-time maintenance supervisor reports to operations manager.<br>Some outsourcing of MRO activities is performed.<br>Productivity and Performance Tracking:<br>Computerized maintenance records and warranty tracking. Begin automation of spare parts bank.<br>Cost Controlling:<br>Costs tracked by vehicle in major categories. Maintenance efficiency tracking (implies standards).<br>Process Quality:<br>Time, mileage, age-based scheduling. Annual maintenance schedules are available.<br>History-based rules on asset life; exceptions accepted. Beginning to implement statistical life-cycle modeling.<br>Spare Parts:<br>Begin of automating parts bank, reduce slow turning parts Inventory and service targets set with regular performance assessment.<br>Use of forecasting tools that incorporate parameters such as mean time between failure to develop stock levels.<br>Ability to share spare parts on an emergency basis; some equipment and parts standards developed. |
| Market Leading Criteria: | Supervision:<br>Maintenance supervisor responsible for "profit/loss" performance of operation or outsourced MRO service provider's performance.<br>Productivity and Performance Tracking:<br>Standards based on thorough analysis and industry research.<br>Automated tracking of standardized spare parts inventory.<br>Cost Controlling:<br>Monthly reports detail costs by age, make, model in specific categories, with anticipated variance and exceptions bulletins.<br>Process Quality:<br>Proactive scheduling of preventive maintenance based on forecast failures, on-board diagnostics.<br>Statistical life-cycle analysis can forecast failures and determine acquisition and divestiture policies.<br>Spare Parts:<br>Spare parts are planned and administered across the entire network, with stocking strategies based on demand volume.<br>Performance standards developed through internal analysis and industry research for all equipment and major parts.<br>Fast moving parts held in "consignment"; reorder/replenishment handled by supplier. |

The following Tables 24-26 provide a continuing explanation of the capabilities and corresponding key assessment areas and performance capability criteria for each capability within the enablement platform 102, and in particular, criteria for a sub-platform referred to as information and data management.

TABLE 24

Master Data Management (Information and Data Management)

| | |
|---|---|
| Description: | This capability deals with master and transactional data management as well as with address data and documents management.<br>Master Data Management includes the compilation of a corporate model, ownership, cleansing, maintenance, replication and purging of master and transactional data. |
| Basic Criteria: | Master Data Distribution and Maintenance:<br>Master data is maintained in the diverse applications, creating redundancies.<br>Customer data management is distributed and account data has to be entered several times in the different applications.<br>Individuals create useful processes, but no standard procedures exist across groups or locations.<br>Tools tend to be general-purpose software (Microsoft Excel, Microsoft Access) and no intensive data management software is in use.<br>Most data is not integrated, but some departments attempt integration efforts.<br>No data profiling, analysis, or auditing is used to determine data characteristics.<br>Data cleansing or standardization may occur in isolated areas or data sources.<br>Attempts to consolidate data (such as a data warehouse) requires scrap and rework due to data quality issues.<br>Data Security:<br>No official data privacy policy in place, which severely limits data sharing within the organization.<br>Security is controlled at line of business level. |
| Competitive Criteria: | Master Data Distribution and Maintenance:<br>Shared master data layer provides a central repository for customer master data and references.<br>Data is standardized, consistent and measurable.<br>The most frequent updated data entities are replicated automatically to the listening systems.<br>Management understands and appreciates the role of data management in corporate initiatives.<br>Data management technology providers become strategic partners with the organization.<br>A dedicated corporate data management group maintains corporate data definitions, synonyms, business rules, and business value for data elements.<br>Enterprise data architects evaluate extensions of the shared master data layer and cost/benefit of application integration.<br>Data management goals shift from problem correction to problem prevention.<br>Ongoing data audits and data monitoring help the company maintain data integrity over time.<br>Relational data stores with integrated selection mechanism are used to feed analysis extracts.<br>Data Security:<br>An official data privacy policy in place.<br>Centralized security process and standards.<br>Access is controlled by role and authority. |
| Market Leading Criteria: | Master Data Distribution and Maintenance:<br>Request/approval process for data exits.<br>Full definition and buy-in which data can be maintained by enterprise hierarchy level.<br>Data quality improvement has executive-level sponsorship.<br>"Zero defect" policies for data collection and management are in place.<br>Procedures help the organization achieve the highest levels of data integrity.<br>Corporate data management tools are standardized.<br>All aspects of the organizations utilized the standard metadata and rules definitions created and maintained by the data management group.<br>Data models capture the business meaning and technical details of all corporate data elements.<br>Processes for continuous improvement of customer data and consolidation of customer accounts are available. |

TABLE 24-continued

Master Data Management (Information and Data Management)

There is minimal data redundancy (duplicates <= 2%).
Data Security:
Data privacy policy is clearly communicated to customers.
Potential security violations are actively investigated.
Access is controlled by role and authority.
Security systems and policies are routinely audited to ensure they are functioning as intended.

TABLE 25

Address Management (Information and Data Management)

| | |
|---|---|
| Description: | This capability deals with master and transactional data management as well as with address data and documents management. Address data management deals with collection, cleansing, filtering, and usage of address data within the logistical core processes as well as for additional services. |
| Basic Criteria: | Address Data Distribution and Maintenance: Address changes are re-active, initiated by carriers as they identify undeliverable mail. New addresses are requested by residents and businesses. Addresses are maintained in multiple systems. New addresses take several weeks to synchronize across systems automated sorting center systems. No de-duplication, address or name standardization, or other data cleansing methods are internally applied. Duplicate individual and household records exist at all sub-system levels. External agencies used to support data matching and address standardization/validation. No sharing of address data; mail clients develop and use separate mailing lists. |
| Competitive Criteria: | Address Data Distribution and Maintenance: Address changes are initiated by consumers/clients via a non-automated process. Addresses are maintained in a central repository, and each internal entity has access to import/use the data according to their needs. Addresses are shared with large mailing clients on a periodic basis. Some de-duplication, address, or name standardization is in place. Data cleansing performed primarily in reaction to errors spotted. Individual and household consolidation processes executed on a periodic basis. |
| Market Leading Criteria: | Address Data Distribution and Maintenance: Address changes are made in near real-time by customers/partners/suppliers via Internet. New addresses are setup through integrated processes with municipal planning and zoning entities. Address additions and changes are automatically integrated at all levels of the supply chain, from sorting center machines to delivery unit management systems. Dynamic data cleansing and consolidation exists at sub-system and repository levels. Address data is synchronized daily. |

TABLE 26

Document Management (Information and Data Management)

| | |
|---|---|
| Description: | This capability deals with master and transactional data management as well as with address data and documents management. Document management focuses on provision of standard documents and templates as well as workflow procedures and archiving of electronically and physical documents. |

TABLE 26-continued

Document Management (Information and Data Management)

| | |
|---|---|
| Basic Criteria: | Document Management: The document generation process is manual. No common procedures to manage documentation changes. Difficulty to find the last version of documents. Project documentation is not synchronized with product information. Document exchange with customers or partners is a manual process. Inventory of document types, formats and applications across enterprise are not consistent. Archiving of paper documents is done completely manual in local facilities. If a document is needed is must be send by FAX, original document or copy of document. |
| Competitive Criteria: | Document Management: Some processes are developed to automatically generate documentation with updated product information. Use of standardized document folders and templates across some product configuration elements. Document search cannot be executed across multiple disparate data sources. Basic document management system capabilities are in place. Archiving is outsourced (non knowledge). Documents are archived using optical scan. Document access according to user's role and data protection guidelines. |
| Market Leading Criteria: | Document Management: Development of a process that automatically generates the documentation with updated product information. Standardized document folders and templates with reference to product configuration elements. Improved change management by using a structured process. Integrate project documentation in a single document repository with a classification system that facilitates document search. Advanced document management capabilities. Electronic consolidation and forwarding of suppliers invoices to customers. Archiving is fully integrated in the workflow of document management. Archiving system is certified against international standards |

The following Table 27 provides an explanation of the capabilities and corresponding key assessment areas and performance capability criteria for each capability within the contract management platform 110.

TABLE 27

Contract Management

| | |
|---|---|
| Description: | This capability involves all the activities that are required to prepare, negotiate, process and manage contracts. It further outlines the importance of standardizing contract structures and linking them into corporate-wide tariff and pricing grids. |
| Basic Criteria: | Contract price, terms, and conditions differ from site to site for the same items. There is merely any contract standardization. Paper contracts exist, but requestors are unclear who preferred suppliers are. Little electronic management of contracts. Printed documents travel via mail or fax for editing and approvals requiring manual data entry. Disparate systems for customer and contract data. There is no integration of contract data, tariff/ pricing grids, and booking/order management. Individual purchase orders created without reference to master contract or blanket PO. |

TABLE 27-continued

| | Contract Management |
|---|---|
| Competitive Criteria: | Long-term, company wide contracts exist for some key items and customers/suppliers/partners.<br>Various contract types and blanket purchase orders established.<br>third party contracts are viewed as business relationships whose goals are aligned with yours, sharing both risks and rewards.<br>Formal standardized service level agreements exist and are electronically implemented.<br>Customer and contract data are hosted in the same system.<br>Customer insight is available to support contract extension. |
| Market Leading Criteria: | Global standardized contracts are in place; use is mandatory.<br>Blanket PO use replaced by procurement cards and eProcurement.<br>Service management framework is in place which provides effective operations and continuous improvement.<br>Guaranteed business benefits sustained over period of contract and are electronically monitored.<br>Electronic exchange and approval with customers on their contracts is in place.<br>Contract data can directly be interfaced with the billing system making real time adoption of contracts feasible. |

The following Tables 28-32 provide an explanation of the capabilities and corresponding key assessment areas and performance capability criteria for each capability within the mail operations platform 112.

TABLE 28

| | Mail Production |
|---|---|
| Description: | This capability area includes all processes related to producing a mailing for a customer from gathering content requirements to finally printing and packaging the mailing. The mailing may be produced as a one time event or it could be regularly scheduled. |
| Basic Criteria: | Mailing Plan Development:<br>Customer requirements are collected manually<br>No pre-scheduling for mail production based on the requirement collected.<br>Mailing Design Development:<br>No template or historical working product can be used for mailing design.<br>Mailing Data:<br>Collected from mailer through different ways, e.g., email.<br>Mail Induction Planning:<br>No advance preparation or planning for the induction of the mailing. |
| Competitive Criteria: | Mailing Plan Development:<br>Created based on customer requirement on an ad-hoc basis.<br>Customer requirements are collected through multiple ways, e.g., web, phone.<br>Mailing Design Development:<br>Database in place to store the historical template or design product of the customer to save the effort for mailing design.<br>Mailing Data:<br>Data from mailer are merged into mailing with standard tools pre-defined.<br>Store mailing details so they can be leveraged if the requirements are similar or the same for future mailings. |
| Market Leading Criteria: | Mailing Plan Development:<br>Historical data is used for forecasting the large mailing in advance. |

TABLE 28-continued

| | Mail Production |
|---|---|
| | Requirement confirmation is taken place proactively to make sure requirement are fully understood.<br>Mailing Design Development:<br>Suggestion are given to customer with personalized design feature as a value add service.<br>Mailing Data:<br>Data integration between postal and large mailer smoothes the process or mailing creation.<br>Mail Induction Planning:<br>Induction is planned in advance so that some mailing does not have to go through the acceptance stage, e.g., determine point of induction and how mail should be packaged for induction. |

TABLE 29

| | Mail Preparation |
|---|---|
| Description: | This capability area focuses on preparing the mailing for induction. All processes that must be executed prior to induction to allow mail to travel from origin to destination including address verification, address application, postage application and mail presortation. |
| Basic Criteria: | Mailing List Generation:<br>Based on the customer requirement, e.g., demographic or geographic type information.<br>Level of Pre-sorting:<br>No pre-sorting is performed.<br>No verification for the address list.<br>Label Design:<br>Basic label options are provided to customer as choices.<br>Postage Options:<br>Postal standard postage are provided as the only option. |
| Competitive Criteria: | Mailing List Generation:<br>Multiple queries can be performed depending on the type of mailing list.<br>Data formatting can be performed based on the customer requirement.<br>Level of Pre-sorting:<br>Presortation list is created based on the point of induction and level of presort required.<br>Label Design:<br>Labels are designed based on the customized requirements from customer.<br>Postage Options:<br>Some types of postage will allow for a flexible design that might be specific to the mailer. |
| Market Leading Criteria: | Mailing List Generation:<br>Personalized customer data can be retrieved from postal database as a value added service provide to large mailer.<br>Detailed verification are performed on the address list, e.g., post code, country, city, street name, street number, apartment/unit/suite number and potentially occupant name.<br>Level of Pre-sorting:<br>Mailer are encouraged to do the presortation by themselves and pay less. |

TABLE 30

| | Acceptance and Induction |
|---|---|
| Description: | The Acceptance capability area includes all processes that involve taking possession of the mail for subsequent processing. It also includes the transfer of electronic mailing data before the mailing is actually physically handed over to the post. The Induction capability area focuses on those processes that are executed when the mail is physically handed over to the post. Revenue protection is a key process within |

TABLE 30-continued

Acceptance and Induction

| | |
|---|---|
| Basic Criteria: | this capability where large volume mailings are verified to ensure proper payment.<br>Mailer Communications:<br>No communication between acceptance units and large mailers until mailings arrive.<br>Mail Collection Services:<br>Only available in collection boxes and retails office; there is no differentiate service for large mailers.<br>Revenue Verification:<br>No process to change degree of audit from customer to customer.<br>The cost associated with recovering outstanding revenue does not justify collecting the outstanding accounts.<br>Payment Receipt:<br>Payment parameters with customers are not enforced. |
| Competitive Criteria: | Mailer Communications:<br>Large mailer receiving includes some level of scheduling and pre-advice.<br>Mail Collection Services:<br>Large mailer acceptance units are set up especially for them and large mailer are encourage to use those units for more convenient and tailored service.<br>Revenue Verification:<br>Revenue audit process varies from customer to customer depending on historical information that is not stored and analyzed.<br>Payment Receipt:<br>Organization has limited ability to pursue clients with outstanding accounts. |
| Market Leading Criteria: | Mailer Communications:<br>Large mailer receiving system used to schedule mailers and collect pre-advice data about their mailings.<br>Mail Collection Services:<br>Maximum accessibility (i.e. - collection boxes, retail offices, large mailer acceptance units, etc.).<br>Revenue Verification:<br>Optimal volume collected in each collection instance and at each acceptance unit.<br>Revenue audit process systemically modified and expedited depending on customer information.<br>Minimize lost revenue by verifying high risk mail and auditing a reasonable percentage of general mail.<br>Payment Receipt:<br>The organization has an integrated payment process with tier 1 clients and the other clients are managed on a tight payment schedule.<br>Mail Volume:<br>Minimum volatility associated with inefficient processes and poorly controlled entry timing of verified mail into the supply chain.<br>Optimize entry of verified mail to sort operations by minimizing variances in planned volume arrival profiles (VAP).<br>Minimum volatility in mail consolidation levels to expedite downstream sort operations. |

TABLE 31

Mail Sorting

| | |
|---|---|
| Description: | This capability area involves manual or mechanical separation of items according to a particular characteristic or marking on the mail item. It also includes those processes to deal with exceptions when the mail cannot be sorted at all. For general handling and sorting processes refer to the Transportation platform - Handling and Sorting |
| Basic Criteria: | Issue Resolution:<br>Operators do not have the ability to fix sortation issues. They are only able to apply temporary fixes to the problems.<br>Pre-sorting Discounts:<br>No preferential policy in place for pre-sorted mail.<br>Address Verification:<br>Receiver's address is manually identified and sorted.<br>Sortation Method:<br>Sortation is done using static sort plans by product type based on the destination address.<br>Highly skilled workers perform sortation, with deep skills in address recognition.<br>Sortation is mostly manual with very little to no automation.<br>Cause of Missorts:<br>The number of missorts is high and could be prevented by improvements in upstream processes. |
| Competitive Criteria: | Issue Resolution:<br>Operators have limited ability to fix sortation issues. Operators have the visibility to mail inflow and they intermittently plan production schedules.<br>Pre-sorting Discounts:<br>Commissions are given to those presorted mails to improve the percentage of mail properly prepared.<br>Address Verification:<br>Advanced technology is used to scan and identify the receiver's address automatically.<br>Sortation Method:<br>Manual sortation is still executed based on static sort plans but automated sortation is more dynamic and not necessarily by product or based on the destination address. Although sorting based on the destination address is still the most prevalent method.<br>Sortation is automated for most products but there is still a large amount of manual sorting done.<br>Cause of Missorts:<br>Missorts are mostly attributed to errors made by the automated readers or a customer's failure to follow addressing guidelines. |
| Market Leading Criteria: | Issue Resolution:<br>Operators are continually viewing demand and adjust the production schedules to maximize facility productivity.<br>Operators are able to address mail sortation issues by analyzing root causes rather than implementing temporary fixes.<br>Address Verification:<br>Maximize the quality and accuracy of the sorting process by correctly and quickly identifying the receiver's address and referencing up-to-date address information.<br>Sortation Method:<br>Sortation is executed dynamically based on daily volumes using criteria other than only the destination address.<br>Sortation is fully automated with manual processes in place to handle exceptions.<br>Upstream processes are streamlined with sortation processes to minimize errors in product classification and assignment to sort plans.<br>Cause of Missorts:<br>Missorts are mostly attributed to errors made by the automated readers or a customer's failure to follow addressing guidelines. |

TABLE 32

Mail Management

| | |
|---|---|
| Description: | This capability area includes process groups that involve managing the mail for a customer usually after the mail has been inducted into the mail operations pipeline. These processes are typically value-added services that a post may offer to its customers like scanning mail for hazardous materials and managing their mailroom. |

TABLE 32-continued

Mail Management

| | |
|---|---|
| Basic Criteria: | Response Mail Handling:<br>Services are provided to collected the response mail from the customer on behalf of the mailer.<br>Redirecting Mail:<br>Redirect according to redirection requirement, e.g., change of address.<br>Holding Mail:<br>Mail is held only when the mail cannot be delivered. No hold mail service before the mail is physically delivered.<br>Hazardous Mail Handling:<br>Screen mail for hazardous substances, facilities are provided for scanning mail and information are store, e.g., how many pieces where scanned and how many were hazardous. |
| Competitive Criteria: | Response Mail Handling:<br>Detail plan and process are in place to manage the response mail, e.g., plan induction, build sortation plan, etc.<br>Redirecting Mail:<br>Database is updated after mail is redirected by overwriting the existing address with the new, redirected address.<br>Holding Mail:<br>Provide holding mail as a kind of service according to client requirements, e.g., duration of hold, where to be held, occupant name, etc.<br>Mail Room Services:<br>Provided for interoffice, intraoffice mail transfer, including pickup, sorting, distribution, etc. |
| Market Leading Criteria: | Response Mail Handling:<br>Post processing service is provided, e.g., open, read, analysis, store data from the response mail. Response mail data is distributed according to agreed on channels.<br>Redirecting Mail:<br>Sorting and updating the address of redirected mail is an entirely automated process, and does not significantly affect the delivery date.<br>Holding Mail:<br>Address information, induction plan and sortation plan are all integration according to the requirement for holding mail.<br>Archiving Mail:<br>Detail process and advance tools are used for mail archive according to client requirement. Retrieve mail at the customer's request.<br>Undeliverable Mail Handling:<br>Return mail according to the specific requirement of the mailer, either return the physical mail or a list of addresses that failed to be delivered. |

The following Tables 33-44 provide an explanation of the capabilities and corresponding key assessment areas and performance capability criteria for each capability within the transportation platform 114.

TABLE 33

Dispatch

| | |
|---|---|
| Description: | The capability covers load dispatching to propelled capacities (PUD truck, line haul, aircraft, train) or for consolidation to loading devices. |
| Basic Criteria: | Allocation:<br>Dispatch of pieces to capacities is performed manually based on a static paper based allocation scheme.<br>There is no upstream and upfront information on dispatching volumes.<br>All paperwork is printed manually.<br>Daily load is optimized ad-hoc on dispatcher's experience.<br>No pre-departure check of shipments loaded is performed. |

TABLE 33-continued

Dispatch

| | |
|---|---|
| | Incident Management:<br>Incidents in transport operations are managed manually. Dealing with incidents the dispatcher communicates over phone or radio equipment. |
| Competitive Criteria: | Allocation:<br>Dispatcher is supported by a tool offering basic allocation mechanisms, e.g., based on ZIP code.<br>Regular load can be allocated automatically and associated paperwork is printed automatically.<br>The dispatcher is supported by basic KPI overviews to re-allocate load efficiently.<br>Timeliness of dispatches is continuously improved by coordination of sort and transportation planning and proper mode assignment.<br>Ad-hoc requests during the day are allocated manually.<br>Incident Management:<br>Electronic communication with remote employees is possible over wide-area (at least mono-directional) hand-held Device. |
| Market Leading Criteria: | Allocation:<br>Sophisticated dispatch tool with advanced multi-criterion allocation mechanisms is in place.<br>Automated dispatch systems integrated into other operating, administrative and financial systems (TMS/WMS).<br>The dispatch tool suggests optimization opportunities.<br>The allocation scheme is optimized on statistical measures.<br>Operators ensure timeliness of dispatches by investigation and coordination of sort and transportation planning and proper mode assignment.<br>In Road Transport even ad-hoc pick-ups during the day are sent directly to couriers on tour.<br>Allocation schemes allow for joint capacities of different divisions (Express, Freight).<br>Incident Management:<br>Preventive mechanisms and warnings support the dispatcher.<br>Electronic communication with remote employees using bi-directional hand-held device communication.<br>Documents printed by hand-held device and status information is immediately exchanged with central system when recorded. |

TABLE 34

Pick-up and Receive

| | |
|---|---|
| Description: | The capability covers all variations of road or railcar pick-up/reception/input of shipments, including all pick-up activities starting with vehicle departure from and ending with re-arrival at the terminal/hub gate, or direct receipt at facility for further processing. |
| Basic Criteria: | Flexibility:<br>Only pick-up tours are supported.<br>Data and Document Exchange:<br>All work is performed based on paperwork handed over to the courier/driver.<br>The courier provides empty paper forms to shipper. These forms are filled out manually by the shipper.<br>Piece Tagging:<br>Piece tagging will be performed during unload of the pick-up truck in the terminal.<br>Navigation:<br>The courier/driver drives by experience and map.<br>Feature support:<br>Only pick-up is supported.<br>Status Recording:<br>Shipment status information is recorded manually or by scanning of documents during trip return. |

TABLE 34-continued

Pick-up and Receive

| | |
|---|---|
| Competitive Criteria: | Flexibility:<br>Mixed pick-up and delivery tours are supported.<br>Data and Document Exchange:<br>Customer sends order files electronically using customer automation system.<br>Additional paperwork like dangerous goods declaration or customs documents still managed manually.<br>Piece Tagging:<br>Pieces are already tagged by the shipper or preliminary label concept is used.<br>Navigation:<br>The courier drives by experience and map.<br>Feature support:<br>Remote pick-ups are supported (requirement for systems integration).<br>Loading device exchange is managed manually.<br>Status Recording:<br>Shipment status information is recorded manually or by scanning of documents during trip return. |
| Market Leading Criteria: | Flexibility:<br>Pick-ups and delivery from multiple domains (freight, express) are supported.<br>Data and Document Exchange:<br>Customer sends order files electronically using customer automation system, web site or full ERP integration.<br>Additional paperwork is communicated electronically and only for legal reasons paper copies are handed over to courier.<br>Piece Tagging:<br>Pieces are already labeled by the shipper or preliminary labels are used in order to give the customer a unique reference on piece level.<br>Navigation:<br>The hand-held Device supports navigation and leads the courier with optimal efficiency to the pick-up locations.<br>Feature support:<br>Sophisticated product features are supported using a mobile device: proper planning of additional load times, pick-up feasibility, loading help management, trailer management and courier meet pick-up/delivery; real-time with updates and re-routes<br>Status Recording:<br>Tour feasibility and current status is confirmed using a hand-held device.<br>Wireless communication with central system during operations is enabled. |
| Description: | The capability covers all variations of road or railcar pick-up/reception/input of shipments, including all pick-up activities starting with vehicle departure from and ending with re-arrival at the terminal/hub gate, or direct receipt at facility for further processing. |
| Basic Criteria: | Trip Results:<br>Heavy post tour registration process in order to record trip results.<br>Payment Reconciliation:<br>Payment reconciliation is done manually based on paperwork.<br>Performance Management:<br>No guidelines are in place for courier/driver performance.<br>Subcontractors and staff are debriefed only in case of bigger problems.<br>Unplanned Activities:<br>All incidents and same day ad-hoc pick-ups are managed by phone or radio equipment. |
| Competitive Criteria: | Trip Results:<br>Pick-ups are registered by pick-up un-load registration.<br>Payment Reconciliation:<br>Payment reconciliation is supported by a system.<br>Performance Management:<br>Subcontractors and staff are debriefed based on manager experience. |
| | Briefing guidelines are in place.<br>Unplanned Activities:<br>All incidents are managed by phone or radio.<br>Ad-hoc pick-ups during the day can be received over hand-held Device.<br>Paper receipts are still filled out manual. |
| Market Leading Criteria: | Trip Results:<br>Pick-up information from hand-held device loaded. No further registration in post trip necessary.<br>Payment Reconciliation:<br>Quick payment reconciliation by using hand-held device information.<br>Performance Management:<br>Operational delivery performance is determined automatically and service level agreement checks of sub-contractors are performed as an input for the debrief.<br>Unplanned Activities:<br>Incidents are managed by hand-held device and phone.<br>Ad-hoc pick-ups during the day can be received over hand-held Device.<br>Hand-held device is used to print receipts. |

TABLE 35

Terminal Handling and Sorting-Handling

| | |
|---|---|
| Description: | The capability covers all activities from vehicle reception at the gate, unloading, sorting, forwarding and loading to releasing the vehicle from the gate. |
| Basic Criteria: | Terminal Layout:<br>Terminal layout is taken as given.<br>No systematic alignment between network and local capacities.<br>Measurement:<br>Weight and dimensions are recorded manually and only sporadically or for non-conveyable traffic.<br>Dock Inventory:<br>Paper based dock inventory is performed.<br>Goods Management:<br>All leftover shipments remain in the bays after departure.<br>Transit Documentation:<br>Transit documents are just handed over manually by terminal staff. |
| Competitive Criteria: | Terminal Layout:<br>Existing terminal layouts are individually optimized.<br>Measurement:<br>Weight and dimensions for conveyable traffic automatically recorded.<br>Dock Inventory:<br>Scan based dock inventory is performed.<br>Goods Management:<br>All leftover shipments are recorded with a leftover reason and checked in.<br>Dedicated secured places for dangerous or valuable goods.<br>Discrepancy reports are regularly run for quality improvements.<br>Transit Documentation:<br>Transit documents are managed manually.<br>Additional checks are performed by line haul management that all transit documents are properly forwarded. |
| Market Leading Criteria: | Terminal Layout:<br>Terminal layouts of all terminals are efficiently designed in order to ensure quick handling.<br>Systematic and technology supported alignment between network and local capacities to ensure minimum goods movements. |

TABLE 35-continued

Terminal Handling and Sorting-Handling

Measurement:
Weight and dimensions for conveyable traffic
automatically recorded and updated in records.
Dock Inventory:
Scan based dock inventory is performed.
Miss-routings are monitored and reasons diminished.
Goods Management:
All leftover shipments are recorded with leftover
reason and checked in.
Dedicated secured places for dangerous or valuable
goods.
Special requirements goods are controlled (e.g., reefer
cargo temperature).
Transit Documentation:
Transit document content is sent electronically to the
dedicated receivers.
Paper based transit documents are stuck to pieces
whenever possible.
Additional paperwork (e.g., dangerous goods) is
properly and efficiently sorted and forwarded to
line haul driver.

TABLE 36

Terminal Handling and Sorting-Unloading/Loading

| | |
|---|---|
| Description: | The capability covers all activities from vehicle reception at the gate, unloading, sorting, forwarding and loading to releasing the vehicle from the gate. |
| Basic Criteria: | Unloading/Loading a Vehicle:<br>Manual loading processes including generation of shipping documents.<br>Loading helps getting short sometimes; qualification for certain devices can be an efficiency limiting factor (e.g., fork-lift or harbor crane).<br>Manual carton/pallet counts as they are loaded onto shipping vehicle.<br>100% QA checking of all shipments.<br>Operational safety guidelines are available, but rarely supervised in a borderline way.<br>Hardly any terminal worker has a certification to handle special requirements goods (e.g., dango, gas, fluids, secured).<br>No electronic loading confirmation in place.<br>No communication to shipment consignee. |
| Competitive Criteria: | Unloading/Loading a Vehicle:<br>RF dispatched loading of staged product, based on priority in task queue.<br>System suggested load sequence - based on product requirements and location min/max.<br>Loading helps are sufficiently available and accessible for every terminal worker. A sufficient number of loading personnel is qualified to use special loading devices.<br>System generated shipping documents.<br>Exception based QA checks; random check of loaded orders.<br>Operational safety guidelines are in place and are regularly checked and updated.<br>Shift supervisors and team leads have specific complementary special requirements goods certifications (e.g., dango, gas, fluids, secured).<br>BOL and/or packlist is faxed to consignee after shipment is dispatched. |
| Market Leading Criteria: | Unloading/Loading a Vehicle:<br>Load sequence is dictated by the customer order.<br>Load confirmation using RF in place.<br>Direct computer links to pickers via RF.<br>Productivity standards are measured by assignment.<br>Loading helps are considered being an efficiency driver. Devices are sufficiently available in top conditions and a high number of terminal workers is qualified to operate special devices (fork-lifts, cranes, etc.). |

TABLE 36-continued

Terminal Handling and Sorting-Unloading/Loading

Bar coded container identification outlining pallet
contents for mixed SKU pallets.
System directed random checks using SPC.
Operations safety is a key value. All terminal workers
are equipped with specific safety apparel.
A high number of terminal workers have complemen-
tary special requirements goods certifications (e.g.,
dango, gas, fluids, secured).
ASN (advance shipping notice) delivered to consignee
as shipment is released.

TABLE 37

Terminal Handling and Sorting-Sorting

| | |
|---|---|
| Description: | The capability covers all activities from vehicle reception at the gate, unloading, sorting, forwarding and loading to releasing the vehicle from the gate. For further mail specific sorting processes refer to the Mail Operations platform—Mail Sorting. |
| Basic Criteria: | Sorting:<br>Manual sorting only.<br>Mail focus:<br>Operators/loading personnel do not have the ability to fix sorting issues. They are only able to apply temporary fixes to the problems.<br>No preferential policy in place for pre-sorted mail.<br>Receiver's address is manually identified and sorted.<br>There is only limited automation in the process.<br>Classification of mail is done by visual inspection.<br>Decoding of sort criteria is based on human knowledge of postal code data.<br>Manual processes in place to handle missorts that are labor intensive; missorts are high and are largely attributed to human errors.<br>Mail is cleared by operators only; when they see the operational fit; usually based on volumes. |
| Competitive Criteria: | Sorting:<br>Use of sorting machines/belts for standard pieces (size within range) or only for specific pieces.<br>Mail focus:<br>Operators/loading personnel have limited ability to fix sorting issues.<br>Operators have the visibility to mail inflow and they intermittently adapt production schedules.<br>Commissions are given to those presorted mails to improve the percentage of mail properly prepared.<br>Sorting is automated for most products but there is still a large amount of manual sorting done.<br>Advanced technology is used to scan and identify the receiver's address automatically.<br>Addresses are validated using data that has been downloaded daily.<br>Some level of automation is involved in classifying the mail by scanning identification labels.<br>Missorts are mostly attributed to errors made by the automated readers or a customer's failure to follow addressing guidelines.<br>Processes to handle missorts are manual.<br>Clearing mail is still a manual process but has been partially planned out based on the production schedule. Highly skilled workers are responsible for clearing the mail. |
| Market Leading Criteria: | Sorting:<br>Using sorting machines/belts for standard pieces allowing for direct load from them. |

TABLE 37-continued

Terminal Handling and Sorting-Sorting

Mail focus:
Sorting machines support wide range of pieces.
Container/Ship lading:
Terminal automation and marshalling is performed.
Operators/loading personnel are continually viewing demand and adjust the production schedules to maximize facility productivity.
Operators are able to address mail sorting issues by analyzing root causes rather than implementing temporary fixes.
Piece-embedded sort criteria (e.g., data glyphs) maximize quality and accuracy of the sorting process referencing up-to-date address information.
Sorting process speed is maximized to achieve improved customer service while minimizing the costs associated with sorting the mail.
Volume of missorts is small; most missorts are due to a customer's failure to follow addressing guidelines.
Mail is cleared only when necessary and depends on the separation volumes and the production schedule; clearance is performed fully automated in most cases.

TABLE 38

Terminal Handling and Sorting-Storage

| | |
|---|---|
| Description: | The capability covers all activities from vehicle reception at the gate, unloading, sorting, forwarding and loading to releasing the vehicle from the gate. Related to storage activities along the shipments' flow through the value chain, differentiating from Warehousing. |
| Basic Criteria: | Storage Security:<br>Non-secured storage area is in place. No check-in/check-out is performed.<br>Storage Inventory and Utilization:<br>Only basic storage guidelines are in place.<br>Storage Locations and Conditions:<br>Kind of goods not taken into account for storage location or conditions.<br>Inventory Facilities:<br>Physical storage is limited to stacking.<br>For more storage related input see Warehousing. |
| Competitive Criteria: | Storage Security:<br>Secured and non-secured storage areas are in place. Pieces are checked-in/checked-out using scanning.<br>Storage Inventory and Utilization:<br>Manual storage inventory performed regularly.<br>Storage Locations and Conditions:<br>Dedicated storage areas for specific types of goods.<br>Inventory Facilities:<br>Use of shelving, case flow rack, etc., integrated into rack system. High density storage options including push-back, flow-thru, and double deep selective rack. |
| Market Leading Criteria: | Storage Security:<br>System control to monitor and manage storage retention.<br>Storage Inventory and Utilization:<br>Storage bay utilization is monitored and storage layout adapted to goods needs. Storage is organized based on pieces priorities.<br>Storage Locations and Conditions:<br>Proper storage conditions are ensured for dedicated goods (temperature, humidity).<br>Inventory Facilities:<br>Use of high density racking with integrated pick tunnel, etc. |

TABLE 39

Sea Operations

| | |
|---|---|
| Description: | The capability covers all transportation activities specific to sea cargo operations (excluding pick-up and delivery). |
| Basic Criteria: | Reserved. |
| Competitive Criteria: | Reserved. |
| Market Leading Criteria: | Reserved. |

TABLE 40

Line Haul

| | |
|---|---|
| Description: | The capability covers shipping activities specific to road transportation between terminals or hubs (excluding pick-up and delivery). |
| Basic Criteria: | Shipment Location and Identification:<br>Shipments on line hauls can be identified by accompanying paperwork only.<br>Sealing:<br>Sealing is managed manually.<br>Briefing and Feedback:<br>Subcontractors and staff are debriefed only in case of bigger problems.<br>Line Haul Status:<br>Line haul status is communicated over phone or radio equipment.<br>Rare communication with drivers for their status in-transit.<br>Proof of delivery not required or includes manual signature.<br>Shipment Allocation and Overload Management:<br>Shipments are routed to line hauls and are loaded.<br>Overloads are detected when they appear.<br>Manual follow-up on incidents. |
| Competitive Criteria: | Shipment location and identification:<br>Full visibility of shipments on line hauls in the systems.<br>Sealing:<br>Sealing is managed manually with limited electronic support (e.g., seal number can be scanned into the system).<br>Briefing and Feedback:<br>Subcontractors and staff are debriefed based on line haul manager experience. Briefing guidelines are in place.<br>Line Haul Status:<br>Line haul movement driver communicates status and location only in case of incidents by phone or radio equipment, otherwise proper line haul operation is assumed.<br>Proof of delivery included in billings or dispatch paperwork.<br>Shipment Allocation and Overload Management:<br>Shipments are allocated to line hauls automatically to a high percentage.<br>Some manual reallocation is required.<br>Significant overloads are early detected.<br>Load alternatives must be identified manually. |
| Market Leading Criteria: | Shipment location and identification:<br>Full visibility of shipments on line hauls down to piece level as well with line hauls executed by third parties.<br>Sealing:<br>Electronic seal management, piece-level line haul arrival notification.<br>Briefing and Feedback:<br>Operational line haul performance is determined automatically and SLA checks of subcontractors are performed as an input for debriefs.<br>Line Haul Status:<br>Communication with drivers using advanced on-board technology, with 2-way messaging capability.<br>Line hauls send status and location (transponder, GPS) information to line haul managers. |

TABLE 40-continued

| | Line Haul |
|---|---|
| | Incidents are communicated electronically. |
| | Automated on-line update on proof of delivery. |
| | Shipment Allocation and Overload Management: |
| | Shipments are allocated to line hauls automatically using vehicle characteristics. |
| | Overloads are early detected and followed up on. |
| | Tool suggests alternatives (e.g., according to shipment priorities) before loading. |

TABLE 41

| | Rail Operations |
|---|---|
| Description: | The capability covers all shipping activities specific to railway cargo transportation (excluding pick-up and delivery) |
| Basic Criteria: | Reserved. |
| Competitive Criteria: | Reserved. |
| Market Leading Criteria: | Reserved. |

TABLE 42

| | Air Operations |
|---|---|
| Description: | The capability covers all shipping activities specific to air freight transportation (excluding pick-up and delivery). |
| Basic Criteria: | Reserved. |
| Competitive Criteria: | Reserved. |
| Market Leading Criteria: | Reserved. |

TABLE 43

| | Delivery |
|---|---|
| Description: | The capability covers all variations of road or railcar delivery/output of shipments. It covers all delivery activities starting with vehicle departure from and ending with re-arrival at the terminal/hub gate. |
| Basic Criteria: | Flexibility: Only delivery tours are supported. Data and Document Exchange: All work is performed based on paperwork handed over to the courier/driver during tour preparation or delivery. Navigation: The courier drives by experience and map. Feature support: Some additional delivery services are supported like proof of delivery or cash collection. Proof of delivery and signature is paper work. Pre-Departure Check: No pre-departure check of shipments loaded is performed. Status Recording: Shipment status information is recorded manually or by scanning of documents. |
| Competitive Criteria: | Flexibility: Mixed pick-up and delivery tours are supported. Data and Document Exchange: Delivery receipts are still provided manually. Navigation: The courier drives by experience and map. Feature Support: Shipments can be delivered before a certain time limit (e.g., pre-10 a.m.). Loading devices are managed manually. |

TABLE 43-continued

| | Delivery |
|---|---|
| | Proof of delivery and signature still on paper work. Pre-Departure Check: Pre-departure check of shipments loaded is performed random-based. Status Recording: Load scan is done with terminal scanner on piece level. Allows to record additional status information. |
| Market Leading Criteria: | Flexibility: Pick-ups and delivery from multiple domains (freight, express) are supported. Data and Document Exchange: Hand-held device is used to print receipts. Hand-held device allows to record proof of delivery and signature on display. Receipts are printed by hand-held device. Navigation: The hand-held device supports as well navigation and leads the courier with optimal efficiency to the delivery locations. Feature support: Sophisticated product features are supported by hand-held Device: proper planning of additional lead times, delivery feasibility, cash collection, loading helps management, trailer management and courier meet pick-up/delivery and in time delivery. Pre-Departure Check: Pre-departure check of shipments loaded is performed random-based controlled by system. Status Recording: Tour feasibility is confirmed using the hand-held Device. Automatic piece level checks are performed, e.g., for customers not allowing partial deliveries. |
| Description: | The capability covers all variations of road or railcar delivery/output of shipments. It covers all delivery activities starting with vehicle departure from and ending with re-arrival at the terminal/hub gate. |
| Basic Criteria: | Trip Results: Extensive post tour registration process in order to record trip results. Payment Reconciliation: Payment reconciliation is done manually based on paperwork. Performance Management: No guidelines are in place for courier performance. Subcontractors and staff are debriefed only in case of bigger problems. Unplanned Activities: All incidents are managed by phone or radio equipment. Management Support: Management is not supported by systems to minimize resources and improve customer service. |
| Competitive Criteria: | Trip Results: Only detailed recording of reason for non-delivery and proof of delivery. Payment Reconciliation: Payment reconciliation is supported by system. Performance Management: Subcontractors and staff are debriefed based on manager experience. Briefing guidelines are in place. Unplanned Activities: All incidents are managed by phone or radio. Management Support: Management supported with limited tools, which are not integrated with other functions' captured data. |
| Market Leading Criteria: | Trip Results: Detailed recording of reason for non-delivery available from hand-held device. Payment Reconciliation: Quick payment reconciliation by using hand-held Device information. Performance Management: Operational delivery performance is determined automatically and service level checks of subcontractors are performed as an input for the debrief. |

TABLE 43-continued

| | Delivery |
|---|---|
| | Unplanned Activities:<br>Incidents are managed by hand-held device and phone.<br>Management Support:<br>Suite of integrated management tools available to optimize resource usage and maximize customer service. |

TABLE 44

| | Delivery-Mail Delivery |
|---|---|
| Description: | The capability covers all variations of road or railcar delivery/output of shipments. It covers all delivery activities starting with vehicle departure from and ending with re-arrival at the terminal/hub gate. For mail delivery, processes start with sorting and sequencing mail for final (last-mile) delivery. |
| Basic Criteria: | Merge, Prepare, Order Mail:<br>Non-motorized, manual equipment is used to pick-up mail containers from loading dock and transport them to delivery staging area.<br>Little to no mail containers contain mail that is pre-sorted to the delivery final route.<br>Generic process used for delivery sequencing.<br>Little integration with Route Management and Address Management systems. |
| Competitive Criteria: | Merge, Prepare, Order Mail:<br>Motorized equipment is used to pick-up mail containers from loading dock and transport them to delivery staging area.<br>Some mail containers contain mail that is pre-sorted to the final delivery route, provided to delivery personnel at remote pick-up locations in delivery area proximity.<br>Paper-based forms of communication are used to communicate requirements for unaddressed admail for carrier's route.<br>Specific process for manual sequencing of delivery route.<br>Some integration with Route Management and Address Management systems. |
| Market Leading Criteria: | Merge, Prepare, Order Mail:<br>Motorized equipment is used to pick-up mail containers from loading dock and transport them to delivery staging area.<br>Mail within mail containers is pre-sorted to the delivery final route, provided to delivery personnel at remote pick-up locations in delivery area proximity.<br>Use of mobile communication devices (i.e., PDA) are used to communicate requirements for unaddressed admail for carrier's route.<br>Route sequencing is automated.<br>Route sequencing system is integrated with Route Management and Address Management systems to optimize route sequencing. |

The following Tables 45-51 provide an explanation of the capabilities and corresponding key assessment areas and performance capability criteria for each capability within the supplemental services platform 116.

TABLE 45

| | Customs Management |
|---|---|
| Description: | Management of all import/export/transit related collaboration with customs representation of the local country. Optional: Customs broker. |
| Basic Criteria: | Data and Document Exchange:<br>Customs is managed paper-based at least on one side, resulting in additional data capture effort.<br>Documents are printed and forwarded via mail to customs agency.<br>Split duty and VAT:<br>Split duty and VAT, declared value manually calculated when needed. |

TABLE 45-continued

| | Customs Management |
|---|---|
| | Customs Clearance Procedure and Scalability:<br>Customs clearance procedures for specific goods or locations are investigated when needed.<br>Customs processes are designed only for low volumes.<br>No active management of tariffs and quota, seeking exemptions and NAFTA qualifications for new products.<br>Customs Broker:<br>Customs processes are managed in house. |
| Competitive Criteria: | Data and Document Exchange:<br>Customs documentation is generated and submitted electronically.<br>Split Duty and VAT:<br>Split Duty and VAT, declared value are calculated system supported.<br>Repository for customs regulations available.<br>Access to harmonized customs tariffs structure is in use to forecast actual customs payments to customers to reduce risk.<br>Customs Clearance Procedure and Scalability:<br>Customs clearance procedures for specific goods or locations are in place.<br>Customs processes are scalable.<br>Use of tools to manage tariffs/quotas and accurately track country of origin for proper assessment of tariffs.<br>Customs clearance status is fully visible.<br>Use of Foreign Trade Zones and bonded facilities to clear customs nearest to point of use.<br>Customs Broker:<br>Customs management optionally handled by external customs broker.<br>Documents are forwarded manually to customs broker. |
| Market Leading Criteria: | Data and Document Exchange:<br>High level of process and system integration with customs authorities.<br>Customs receives all manifests required for export electronically and as early as possible to ensure quick clearance.<br>Only legally required documents are forwarded paper-based.<br>Customs is automatically informed on import arrival.<br>Split Duty and VAT:<br>Duty and VAT split is automatically performed. Repository for customs regulations is managed.<br>Additional services like trade and customs advice are provided to customers.<br>Global Trade Management tool tracks tariffs, duties, and quotas, alerting when quotas are being reached.<br>Customs Clearance Procedure and Scalability:<br>Automated clearance procedures for specific goods or locations are in place and supported by systems.<br>Scalable processes.<br>A dedicated organization in large scale cases is foreseen just to deal with customs.<br>Customs clearance status is continuously monitored.<br>Customs Broker:<br>Customs management completely handled by external customs broker.<br>Customs brokerage fees/SLAs are thoroughly controlled. |

TABLE 46

| | Yard and Handling Area Management |
|---|---|
| Description: | Management of the handling areas within the yards: apron, yard in front of terminals and hubs, rail car yards. |
| Basic Criteria: | Traffic Management:<br>Traffic not coordinated.<br>Only in-/out movement is controlled to avoid traffic jams in the yard and ensure security of goods.<br>Docking:<br>Fixed docks for specific movement relations.<br>Only incidental re-docking for delayed capacities.<br>Sorters sort always in the same way. |

TABLE 46-continued

Yard and Handling Area Management

| | |
|---|---|
| Competitive Criteria: | Inventory Management:<br>Inventory in the yard is not tracked at all.<br>In case inventory is missing, search activities start.<br>Traffic Management:<br>Movement lanes and vehicle flows are defined.<br>Management of waiting queues.<br>Docking:<br>Docks can be rescheduled to increase efficiency of terminal.<br>No loading/unloading time slots defined and managed.<br>Docks are freed when un-/loading is finished and then used by next capacity.<br>Inventory Management:<br>Inventory in the yard is regularly tracked and followed up on, some use of tracking devices. |
| Market Leading Criteria: | Traffic Management:<br>Traffic control (e.g., traffic lights) and planned slotting on the yard.<br>Waiting queues are taking into account for delay determination of shipments.<br>Task generation and assignment optimization, rules engine that automates business functions and an alerting mechanism to flag critical yard activities.<br>Docking:<br>Dynamic docking plan with assigned time slots for loading/unloading.<br>Sorters in Handling configured accordingly.<br>Incentives for movement operators to keep the time slot.<br>Management of delays for optimal terminal utilization.<br>Inventory Management:<br>Inventory in the yard is continuously tracked and followed up on.<br>RFID or radio senders/transponders used for real time tracking of loading devices and trailers. |

TABLE 47

Track and Trace

| | |
|---|---|
| Description: | This capability area involves recording and tracing information, tracking goods, mail, containers, vehicles, etc., through the network. Key information is stored throughout the network and aggregated to the appropriate level depending on the end user. |
| Basic Criteria: | Status Recording:<br>Shipment status information is recorded manually or by scanning documents.<br>Simple description of the event; description is not self-explanatory (e.g., location/airport not provided for events outside country).<br>Check Points:<br>Only basic check points are available.<br>Organizational Range:<br>Track and Trace is available only nationally and only on shipment Id level.<br>Little or no visibility to international in-transit shipments.<br>Phone calls to carriers required for status.<br>Track and Trace Availability:<br>Track and Trace information is available for customers only through customer service interaction on customer request. |
| Competitive Criteria: | Status Recording:<br>Scanning information is recorded in addition to the manual status information.<br>Load scan is done with terminal scanner on piece level.<br>Allows to record additional status information.<br>Better look, more descriptive event information are provided to (internally and to partners/customers).<br>Check Points:<br>Advanced check point information can be provided.<br>Visibility is available throughout the whole transportation processes, including departure, in transit, and destination. |

TABLE 47-continued

Track and Trace

| | |
|---|---|
| | Organizational Range:<br>Track and trace harmonized regionally with partners.<br>In-transit info is pooled into one tracking system, hosted either internally or by one of the broker/carriers.<br>Track and Trace Availability:<br>Customers can look-up shipment status on the internet on shipment level.<br>Customer may use Pro-Active Monitoring feature. |
| Market Leading Criteria: | Status Recording:<br>Manual or automated (RFID) scanning are recorded additionally to manual status information.<br>Real time information is available through couriers using hand-held Devices.<br>Check Points:<br>Selection of checkpoints can be tailored to freight types.<br>Full Visibility is available throughout the whole transportation processes, including departure, in transit, and destination.<br>Organizational Range:<br>Track and Trace harmonized over global supply chain.<br>Single global tracking system hosts up-to-date info for all in-transit, domestic and international shipments.<br>SC customers have controlled access to the system.<br>Track and Trace Availability:<br>Track and Trace information is available on external order number on the internet on piece level, real time.<br>Pro-Active Monitoring feature available with ERP integration. Proactive event management alerts are triggered by pending exceptions.<br>Current status and history of all the tracking events are available. |

TABLE 48

Transport Management

| | |
|---|---|
| Description: | The capability describes the management of complex transportation chains (e.g., inter modal) and control over documents flows. Service provider gets a service fee for doing coordination and administrative tasks on behalf of the customer. This service can be performed by any transportation provider, not only by classic 3/4PLs. |
| Basic Criteria: | Carrier/Partner Portfolio:<br>  Carrier/partner portfolio is historically grown and not consistently managed.<br>  See Supplier Management capability for further details.<br>Document Management:<br>  Invoice consolidation is not possible; it is mainly a paper-based manual process.<br>  Document exchange with customers or partners is a manual process.<br>  For document archiving see Information/Data Management capability.<br>Financial Management:<br>  Payments and transactions managed manually. |
| Competitive Criteria: | Carrier/Partner Portfolio:<br>  Carrier/partner portfolio is regularly categorized and evaluated based on SWOT analysis.<br>  Network plans and schedules are fully aligned with the external partners.<br>  See Supplier Management capability for further details.<br>Document Management:<br>  Basic document management system capabilities are in place.<br>  For document archiving see Information/Data Management capability.<br>Financial Management:<br>  The most common transactions can be managed electronically with the bigger partners. |

TABLE 48-continued

Transport Management

| | |
|---|---|
| Market Leading Criteria: | Carrier/Partner Portfolio:<br>   Carrier/partner portfolio continuously categorized and evaluated based on SWOT analysis or strategic sourcing.<br>   Carriers and partners are individually informed about forecast of volumes.<br>   See Supplier Management Element for further details.<br>Document Management:<br>   Advanced document management capabilities.<br>   Electronic consolidation and forwarding of suppliers invoices to customers.<br>   For document archive see Data Management capability.<br>Financial Management:<br>   Full electronic payment and transaction management (e.g., transactions according to Bill of Lading). |

TABLE 49

Payment Handling

| | |
|---|---|
| Description: | This capability involves various payment collection options (EXW, DDU/DDP, cash-on-delivery, third-party payment collection) for shipments, excluding mail postage counter payment collection. |
| Basic Criteria: | Payment Types:<br>   Cash and cheque against service provider are valid payment options.<br>Supported Payment Features:<br>   Payment collection for freight pre-paid (DDP/DDU), collect (EXW) and COD for the goods is possible.<br>Documentation:<br>   The process is completely paper-based. Payments are documented on pick-up delivery receipts.<br>Payment Reconciliation:<br>   Reconciliation of payments is done against receipts.<br>Processes and Systems Support:<br>   Payments and transactions managed manually.<br>   Restrictions in rate calculation of basic or additional services. Services are rated stand-alone having no dependencies with other services.<br>   For international shipments manual split of duty and VAT for freight is performed. |
| Competitive Criteria: | Payment Types:<br>   Cash, cheque, and cheque against customer are valid payment options.<br>   Redirection to account payment is possible.<br>Supported Payment Features:<br>   Additionally to payment collection for freight pre-paid (DDU/DDP), collect (EXW) and COD for the goods payments can be collected as well on behalf of any third party (EXW) (e.g., partner).<br>Documentation:<br>   Payment confirmation can be printed using hand-held Device.<br>Payment Reconciliation:<br>   Payment discrepancies are balanced using the software.<br>   Outstanding payments can be charged to pick-up and delivery service provider/courier.<br>Processes and Systems Support:<br>   The most common transactions can be managed electronically.<br>   Outsourced invoice printing and distribution has been considered.<br>   Customization of invoicing facilities is provided for key customer.<br>   No restrictions in rate calculation of basic or additional services.<br>   Invoicing is fully flexible to any pricing model.<br>   For international shipments automated split of duty and VAT for freight is performed. |

TABLE 49-continued

Payment Handling

| | |
|---|---|
| Market Leading Criteria: | Payment Types:<br>   Cash, cheque, cheque against customer and credit cards are supported for payment. Credit card checks can be performed wireless.<br>   Automatic account validation and charge of payments against account is possible via hand-held Device.<br>Supported Payment Features:<br>   Same as "competitive".<br>Documentation:<br>   Payment process during pick-up and delivery is completely done using hand-held Devices.<br>   Payment confirmation can be printed using a hand-held Device.<br>Payment Reconciliation:<br>   Payment discrepancies are balanced using the software.<br>   Follow-up mechanisms are in place.<br>   Outstanding payments can be charged to pick-up and delivery service provider/courier.<br>   Payment reconciliation is done based on hand-held device information downloaded.<br>Processes and Systems Support:<br>   Full electronic payment and transaction management (e.g., transactions according to Bill of Lading).<br>   Complex rating rules are supported like multi-dimensional tariffs, time bands and event segmentation. |

TABLE 50

Special Requirements Management

| | |
|---|---|
| Description: | Management of freight and mail, which require special treatment (e.g., temperature control, oversize, dangerous). |
| Basic Criteria: | Operational Excellence:<br>   Goods with special requirements only transported occasionally.<br>   Manual, effort-intensive and inefficient procedures.<br>Support Paperwork:<br>   Support paperwork managed manually.<br>Special Vehicle and Driver Requirements:<br>   Special vehicle and driver requirements are checked manually. |
| Competitive Criteria: | Operational Excellence:<br>   Easy to understand guidelines for employees to fulfill requirements of goods with special requirements.<br>   Staff trained on the different kinds of goods with special requirements and how to handle them efficiently and correctly.<br>   Cleaning and waste management detailed procedures defined and controlled.<br>Support Paperwork:<br>   Support paperwork managed manually. Quality checklists in place.<br>   Legal requirements are managed in a look-up repository.<br>Special Vehicle and Driver Requirements:<br>   Special vehicle and driver requirements are checked automatically.<br>   Temperature control in place when needed.<br>   Dangerous goods check performed manually to avoid illegal combination of goods. |
| Market Leading Criteria: | Operational Excellence:<br>   All legal and transportation requirements and constraints are automatically checked by the system.<br>   Warnings are generated to ensure proper handling of goods by staff.<br>   Scalability of processes ensured, especial when large volumes or quantities have to be transported.<br>Support Paperwork:<br>   System requires check of support paperwork at dedicated checkpoints. |

TABLE 50-continued

Special Requirements Management

Special Vehicle and Driver Requirements:
  Dangerous goods check performed automatically to avoid illegal combination of goods.
  Automatic detection of hazardous goods/shipments to specified addresses (e.g., parliament), as part of sorting capability.

TABLE 51

Exceptions Management

| | |
|---|---|
| Description: | This capability includes the generic activities that are required to manage exceptions. Exceptions to the usual way of operations can range from misrouted shipments to facility outages due to critical incidents or disasters and need to be dealt with accordingly. A common understanding is required of how events will be captured and handled. |
| Basic Criteria: | Process Definition:<br>  Exceptions (rejected, damaged, etc.) are managed when they appear.<br>  Exceptions handling procedures are documented and staff trained.<br>Exception Identification:<br>  Customer service must investigate with operations if there is an exception and which type in case of a customer complaint.<br>  See capability Customer Interaction (Claims and Complaints).<br>Shipment Modification:<br>  No control over shipment modifications. Only done by staff when needed. |
| Competitive Criteria: | Process Definition:<br>  Exceptions process definitions are managed and documentation regularly updated (best practices) and communicated.<br>Exception Identification:<br>  Exceptions can be seen by customer service within shipment record.<br>  Statistics about exception occurrences and analysis of root causes are regularly performed.<br>Shipment Modification:<br>  Shipment modification rules are documented and known but not checked by system.<br>  Only a knowledgeable responsible can perform shipment modification. |
| Market Leading Criteria: | Process Definition:<br>  Exception handling strategy is developed and in place.<br>  Exception process definitions are continuously improved, documented and trained.<br>  System support for exception management continuously evaluated for extensions.<br>Exception Identification:<br>  Exceptions are automatically monitored and related processes automatically initiated.<br>  Detailed processes are defined and implemented for all generic processes like rejected, misrouted, damaged, incomplete shipments.<br>Shipment Modification:<br>  Shipment modification rules are automatically checked by the system. |

The following Tables 52-57 provide an explanation of the capabilities and corresponding key assessment areas and performance capability criteria for each capability within the retail operations platform 118.

TABLE 52

Store Operations

| | |
|---|---|
| Description: | This capability area includes all activities related to running the brick-and-mortar store from an administrative perspective. |
| Basic Criteria: | Staff Management:<br>  No systemized performance evaluation of store operating personnel.<br>Staff Training:<br>  Training of store personnel done on an as needed basis per employee.<br>  Training performed by the local staff.<br>  Select staff members are trained to perform special services, e.g., handle passport requests.<br>Cash Management:<br>  Nightly procedures for balancing the store's cash balance are created by each store. |
| Competitive Criteria: | Staff Management:<br>  Performance of store operating personnel is measured in terms of services provided in total and varies considerably between individuals.<br>Staff Training:<br>  Training of store personnel done on a regional or organization level basis. All new personnel attend the same training session.<br>  All staff members are trained to perform the entire range of services offered at the store.<br>Cash Management:<br>  Nightly procedures for balancing the store's cash balance are created centrally. |
| Market Leading Criteria: | Staff Management:<br>  Pro-active store operating personnel assessment by key performance indicator using performance analysis software.<br>Staff Training:<br>  POS and other store data is taken into account when designing the content for the store staff training program. Updates to the ongoing training curriculum are based on the data collected at stores.<br>Cash Management:<br>  Cash Management procedures are audited by a central team at each store. |

TABLE 53

Category Planning and Management

| | |
|---|---|
| Description: | This capability area includes all activities related to planning and managing the assortment of goods and services offered through the post's retail activities, including their assignment to and within stores. |
| Basic Criteria: | Product Trend Tracking:<br>  Product attributes not tracked/maintained.<br>Category Planning Integration:<br>  Lack of integration between category planning and other function, e.g., customer insight, pricing, forecasting.<br>Item Management:<br>  Items are maintained in system manually, often duplicate keying, paper based and redundant set up across channels.<br>Historical Sales Analysis:<br>  Limited historical measures (e.g., sales, margin) used to analyze historic performance of the assortment.<br>Category Development:<br>  Assortment plans developed by buyers and communicated around the business at key stages.<br>Store Format:<br>  Generic store format not customized to local market. One assortment for the entire chain. |
| Competitive Criteria: | Product Trend Tracking:<br>  Track key attribute trends to make broad decisions.<br>Category Planning Integration:<br>  Manual integration between category planning and other functions. |

TABLE 53-continued

Category Planning and Management

| | |
|---|---|
| | Item Management:<br>  Centralized item maintain function within the organization.<br>Historical Sales Analysis:<br>  Detailed analysis and measures available when choosing assortment items.<br>Category Development:<br>  Assortment plans developed primarily by buyers and merchandisers but with a clearly defined RACI to describe input required from finance, stores, marketing, supply chain and logistics.<br>Store Format:<br>  Store offerings are standardized on regional basis.<br>  Basic store groups used such as geography, climate.<br>  Some stores offer tailored products based on customer's special requirements. |
| Market Leading Criteria: | Product Trend Tracking:<br>  Multiple views to attribute mix available and used extensively in planning the assortment.<br>Category Planning Integration:<br>  Seamless integration between category planning and other functions.<br>  Data synchronization with suppliers.<br>Item Management:<br>  Centralized management of item data across channels/lines of business.<br>  Items are maintained electronically with global standards.<br>Historical Sales Analysis:<br>  Use of leading measures in choosing the assortment, e.g., "True" SKU and item level profitability, trickle sales, EVA.<br>Category Development:<br>  Assortment plans created collaboratively between all functions within the business and suppliers.<br>  Key input provided from stores and space planning.<br>Store Format:<br>  Individual store offers aligned with needs of specific customer base.<br>  Assortments created using store groupings that are based on store-level demand patterns.<br>  Differentiated and branded services and convenience products. |

TABLE 54

Price and Revenue Management

| | |
|---|---|
| Description: | This capability area includes all activities related to the management of retail prices and revenue for goods and services, including the required planning aspects as well as handling slow sellers, clearance and markdowns. |
| Basic Criteria: | Pricing Methodology:<br>  Retail price is a simple mark-up on cost price.<br>  Simple price ladder distribution - entry price, mid price, premium price.<br>Price Markdowns:<br>  Simple tactical promotions implemented with little program management.<br>  Generic price markdown strategies that are generally aggressive e.g. 50%+ off.<br>Use of Sales History during Contracting:<br>  Seldom sales and marketing information feedback into contracting and negotiation, new/extension of contract varies significantly. |
| Competitive Criteria: | Pricing Methodology:<br>  Understanding of price sensitive items.<br>  Price sensitivity models, price halo item selection, category roles.<br>Price Markdowns:<br>  Markdown strategies implemented to optimize sales and actual andforecast end of season inventory positions.<br>  Clearly defined exit strategies with options based on product type, priority and trading conditions. |

TABLE 54-continued

Price and Revenue Management

| | |
|---|---|
| | Use of Sales History during Contracting:<br>  Clearance decisions feedback into contracting and negotiations to build flexibility for high risk lines. |
| Market Leading Criteria: | Pricing Methodology:<br>  Understand customer segment price sensitivity.<br>  Statistical understanding of price elasticity.<br>  Sku store price optimization based on elasticity, distance to competitors, price strategy, etc.<br>Price Markdowns:<br>  High inventory lines managed by exception early on in season through what-if modeling.<br>  Tailored clearance and markdown strategies implemented to optimize margin, sales and inventory levels based on price elasticity and accurate forecasts of sales and stock.<br>Use of Sales History during Contracting:<br>  Flexibility in contract cancellations to reduce stock into business and clearance requirements. |

TABLE 55

Store Inventory Management

| | |
|---|---|
| Description: | This capability area includes all activities related to the management of inventory, including the regular tracking and updating of movements, inventory performance and valuation as well as analysis and periodic inventory taking. |
| Basic Criteria: | Inventory Tracking Method:<br>  'Big bang' manual physical stocktakes occur at certain points in the calendar (quarterly, half yearly).<br>  Stocktakes based on value as opposed to units.<br>  Limited shrinkage controls, e.g., Tagging.<br>  Forecasting, planning and scheduling activities driven by convenient calendar cycles.<br>Inventory Visibility:<br>  No SKU level inventory visibility or some stock visibility at store level only; supply is not pooled across locations.<br>Inventory Performance Management:<br>  Evaluation of store inventory done manually.<br>  No metrics for evaluation of store inventory. |
| Competitive Criteria: | Inventory Tracking Method:<br>  Manual physical stocktakes still used.<br>  Low inventory cycle count accuracy.<br>  Integrated inventory planning systems.<br>  Some perpetual inventory counts to provide SKU visibility.<br>  Forecasting, planning and scheduling time buckets determined by business process cycles (e.g., manufacturing).<br>Inventory Visibility:<br>  Inventory visibility on regional basis. Organization is in cross-communications over shared SKUs.<br>Inventory Performance Management:<br>  Common KPIs are used for measure the performance for all the store inventory with limited flexibility. |
| Market Leading Criteria: | Inventory Tracking Method:<br>  Ability to utilize capital budget constraints to determine optimal inventory levels and resulting customer service levels.<br>  Have separate inventory planning processes for: fast turning central stock; contracted inventory in field; new product intro inventory; end of life.<br>  Collecting POS demand data at the SKU level and aggregating it to develop safety stocks and inventory requirements.<br>  Extensive use of inventory decisions models - updated regularly.<br>Inventory Visibility:<br>  Visibility of inventory across all geographies to be able to minimize safety stock; advance deployment of parts in advance of introduction of new products. |

TABLE 55-continued

Store Inventory Management

Supply is pooled and committed based on demand patterns or captured business rules, and termed Available to Promise in an Advanced Planning System.
Inventory Performance Management:
  Advanced system is used to evaluate inventory performance according to historical data collected with integration of customer and vendor.

TABLE 56

Replenishment

| | |
|---|---|
| Description: | This capability area includes all activities related to the replenishment of a store with goods and service related material, link brochures, forms, etc. It includes demand determination activities, order requisition to balance the demand as well as the goods receipt. It also covers any inter-store transfers and reservations. |
| Basic Criteria: | Replenishment Method:<br>  Basic sales based replenishment methods. Replenishment parameters managed at lower levels of the hierarchy (e.g., SKU).<br>  No replenishment parameter tuning; replenishment parameters are difficult to update.<br>Replenishment Plan Modifications:<br>  Manual intervention to change replenishment orders (e.g. exceeding OTB, change forecasts, etc.).<br>Automated Replenishment Calculations:<br>  Automated sales based replenishment system based on simple calculations, e.g., min/max, RWIS, etc.<br>Stock Allocation:<br>  Stock allocation process independent of store replenishment processes and allocated in a single lump. |
| Competitive Criteria: | Replenishment Method:<br>  Replenishment accountability primarily within dedicated Supply Chain function but with a clearly defined RACI to describe input required from stores, marketing, B&M and logistics.<br>Replenishment Plan Modifications:<br>  Optimize replenishment settings by identifying hot sellers early in the season and putting them on back order early.<br>  Automated ordering based on historical sales, forecasted demand, presentation levels and dynamic safety stock.<br>  Exception reporting on out-of-stocks, shortages and excess stock.<br>Automated Replenishment Calculations:<br>  Replenishment engine driven by accurate forecasting system within tailored replenishment algorithms.<br>  Replenishment integrated with stock management systems to automate ordering/allocations.<br>Stock Allocation:<br>  Allocations integrated with replenishment process.<br>  Variable allocations based on store size/range and on hand quantities and incorporate recent trading history. |
| Market Leading Criteria: | Replenishment Method:<br>  Inventory planners proactively manage the process, tuning replenishment parameters through monitoring key metrics and trends, such as forecast performance, in-stock %, etc.<br>Replenishment Plan Modifications:<br>  Continuous replenishment using real-time sales and stock information.<br>  Replenishment driven by single, high accuracy forecast.<br>  Wide range of replenishment cycles, tailored to fit product characteristics, category role, supply chain requirements. Process integrated with OTB and WSSI.<br>Automated Replenishment Calculations:<br>  An advanced replenishment system will determine store/SKU level inventory requirements utilizing multiple forecasting and replenishment methodologies and order at the store/SKU level. Automated alerting systems with exception management. |

TABLE 56-continued

Replenishment

Stock Allocation:
  Allocation decision based on visibility of stock in the pipeline.
  Final store allocations to be delayed until latest possible moment prior to DC arrival to leverage most recent information.

TABLE 57

Licensing Management

| | |
|---|---|
| Description: | This capability area covers the management of postal licenses provided to third parties that offer services on behalf of the post. After the required partner selection is made this area includes the operational support, training and integration of a third party as well as regular performance audits and the settlement of outstanding fees and revenues. |
| Basic Criteria: | Training Standards:<br>  Training content development and execution is done by local teams.<br>  Training not standardized or prioritized.<br>LPO Support:<br>  Localized support teams created for each LPO. No standard support channel for all LPOs.<br>Performance Audits:<br>  Ad hoc performance audits of LPOs. No standard checklist used in each audit. Audit is performed at the discretion of each employee. |
| Competitive Criteria: | Training Standards:<br>  Training content for LPOs is developed centrally into Computer Based Trainings and store manuals.<br>  Training performed on an ad hoc basis as requested by LPOs by local teams.<br>  Training prioritized and rigorously implemented.<br>LPO Support:<br>  A dedicated central team handles all LPO support requests.<br>Performance Audits:<br>  Completed with a standard checklist of items for every LPO. |
| Market Leading Criteria: | Training Standards:<br>  One training program instituted. Attendance required for all LPOs.<br>  Centralized team dedicated to developing training content and training execution.<br>  Continuous training programs with zero tolerance conformance.<br>Staff Skillset:<br>  Store staff multi-skilled, tailored by format.<br>LPO Support:<br>  Multiple channels of support offered to LPOs, including a call center and web/mobile/email channels.<br>Performance Audits:<br>  Audits completed by a central team and the data is used to compare and rate LPO performance.<br>  Performance gaps are assessed and communicated to LPOs. Used as input to the LPO training development. |

The following Tables 58-68 provide an explanation of the capabilities and corresponding key assessment areas and performance capability criteria for each capability within the enterprise platform 120.

TABLE 58

| | Corporate Strategy |
|---|---|
| Description: | Please note that the majority of these capabilities are being developed by the respective Business Consulting Service Lines. Please refer to the Strategy SL asset for details on this capability. |
| Basic Criteria: | Strategic Planning:<br>No strategic planning, no collaborative planning; little or no continuous improvement focus.<br>Strategic Supply Chain planning takes place in response to major discontinuities or marketplace events.<br>Business planning is limited to annual budgeting and forecasting.<br>Return on capital employed is used as a key driver of business decisions. |
| Competitive Criteria: | Strategic Planning:<br>Strategic plan specified, infrequently implemented.<br>Strategic plan and alliance strategy in place.<br>Strategic supply chain planning takes place periodically.<br>Business planning is structured process including a detailed audit of the previous year's initiatives and the progress made on achieving them.<br>The firm makes decisions (e.g., investment decisions) based on cash flow and payback criteria. |
| Market Leading Criteria: | Strategic Planning:<br>1-3-5 year strategy document; joint continuous improvement based on solid data. Scenario response based on real-time status feeds.<br>Regular strategic review process keeps proactive supply chain strategy updated.<br>The firm uses shareholder value analysis to make business decisions.<br>Business planning is a regular and scheduled process. It requires dedication from the entire team. |

TABLE 59

| | Finance and Accounting |
|---|---|
| Description: | This capability relates to finance and accounting operations, enterprise performance management, capital stewardship and risk management. |
| Basic Criteria: | Organization has limited processes for F&A, business units, or geographies.<br>Multiple ERP and legacy systems.<br>Spreadsheets and/or various stand alone applications dominate planning, forecasting, data analysis, and reporting activities.<br>No web enablement of any F&A applications.<br>Department are owners of the processes. Errors corrected at the back-end Much time spent chasing small $ items.<br>Nearly all managers with cost center or profit and loss responsibility have dedicated finance support.<br>No limit on ability to consume finance time.<br>Finance and Accounting provides basic planning and forecasting.<br>Manages cost structures not consistently and not systematically.<br>Managed costs are gathered and consolidated but not optimized.<br>Applicable laws, regulations, standards are controlled by random tests.<br>Only basic internal policies and rules are available not systematically controlled. |
| Competitive Criteria: | Organization has define processes for F&A, is limited to certain business units or geographies, has service centers in moderate to high cost locations.<br>Single ERP system, with exceptions, some legacy systems not yet decommissioned. Best of breed extensions deployed inconsistently, spreadsheets still tool of choice.<br>Web connections to other functions automated work flow.<br>Process owners entirely within Finance. Errors corrected at the back-end. Limited use of materiality limits.<br>GMs with profit and loss responsibility have dedicated finance support, others share finance resources.<br>Limited self service capabilities in place.<br>Finance and Accounting provides basic planning and forecasting.<br>Cost structures are managed consistently and systematically to a medium hierarchy level. .<br>Some unsystematic optimization of costs is performed.<br>Applicable laws, regulations, standards are consecutively checked and the organization is probed against them.<br>Internal policies and rules are defined and communicated on a detailed level but internal controls not yet fully implemented. |
| Market Leading Criteria: | All appropriate transaction processing, closing, and reporting. Nearly all redundant activities and organizations are eliminated. Service centers even in low cost locations.<br>Provides self service capabilities wherever possible.<br>Single ERP system used worldwide; no legacy system.<br>Best of breed extensions used with spreadsheets as "supplements".<br>Web connections to customers, suppliers, and other functions; automated work flow.<br>Process owners "Upstream" activities designed with "downstream" processing in mind.<br>Minimum exceptions.<br>GMs with material profit and loss responsibility have dedicated finance support - others share finance resources.<br>Recurring, standard reporting delivered via self serve portal. Focuses on business analytics and "what if" scenario planning and forecasting rather than data gathering and consolidation.<br>Manages cost structures down consistently to achieve and sustain operating cost leadership. Optimizes managed costs such as working capital, effective tax rates, benefits costs, etc., in addition to operating cost structures.<br>Ensures effective compliance with applicable laws, regulations, standards, internal policies and rules (including budgets) in all financial transactions and reporting. |

TABLE 60

| | Human Resources |
|---|---|
| Description: | This capability relates to the management of the company's human resources and covers all related non-operational activities from sourcing to enabling to retiring resources. |
| Basic Criteria: | Following extract non exhaustive for demo and reference only - please consult the HP SL for full details.<br>Ability to Change:<br>Change is Leadership-driven.<br>Change is based on the focus, tenacity and leadership of an individual.<br>A top-down approach is used to drive change efforts. Leaders generally rely on several key techniques to push change, such as: invoking an outside crisis; transforming the enterprise to a new operating model; articulating a common-sense business case for change; and, frequent communication with all levels of the organization.<br>Individuals are generally resistant to change, and lack the skills and experience to adapt effectively.<br>Change efforts take a long time to complete and often fail to produce expected results. |
| Competitive Criteria: | Following extract non exhaustive for demo and reference only - please consult the HP SL for full details.<br>Ability to Change:<br>Change is process driven, and the responsibility for change no longer rests solely with leadership.<br>Systems within the organization support, rather than impede, change. |

TABLE 60-continued

| | Human Resources |
|---|---|
| Market Leading Criteria: | The organization typically has mechanisms in place in the areas of performance measures, employee competencies, decision-making, organizational structure, and communication that allow employees to not only implement change, but drive it in a way that is consistent with the organization's reward system and performance measures.<br>Most individuals neither support nor resist change. Some, but not all individuals are skilled in managing change.<br>Change efforts are generally lengthy and costly.<br>Following extract non exhaustive for demo and reference only - please consult the HP SL for full details.<br>Ability to Change:<br>The organization has developed an organic capacity to change<br>Change is so ingrained into day-to-day behavior that it is in a sense invisible.<br>This capability and behavior defines the culture of the organization.<br>Change is often driven from the bottom of the organization.<br>Employees do not see it as a separate effort, but as part of their jobs, and as an opportunity rather than a threat.<br>The organization embraces learning, relies on self-defined, team-based performance measures, has high levels of trust between employees and management, and focus on developing change competencies in employees.<br>Change typically happens quickly and with minor disruptions to the organization. |

TABLE 61

| | Procurement |
|---|---|
| Description: | This capability relates to the provisioning of equipment and material for operational activities. |
| Basic Criteria: | Requisitions:<br>Paper- or phone-based requisitions placed to purchasing or directly to vendor.<br>Procurement and AP spend large percentage of time processing low-dollar transactions.<br>No formal/consistent approval process in place.<br>Purchase Goods and Services:<br>Procurement professionals spend large percentage of time sourcing low-dollar requisitions into purchase orders.<br>No supplier rationalization program in place.<br>Each site has autonomy to source materials and services from vendor of choice.<br>Invoice Processing:<br>Accounts payable processes are disbursed throughout the organization.<br>Receipt required for the majority of purchases; match invoice to purchase order and other supporting documentation.<br>Copies of each invoice is made and stored in multiple files in Purchasing, and Accounts Payable.<br>Pay Suppliers:<br>Automation of payments is unavailable.<br>Checks are manually produced in some instances.<br>Payment is made to a supplier even though the supplier may owe the buyer.<br>Multiple invoices from one vendor result in multiple checks being issued.<br>Check runs are not optimized. |
| Competitive Criteria: | Requisitions:<br>Use of Procurement cards to eliminate the transactions associated with high-volume, low dollar purchases (POs/Invoices).<br>Web-based requisitioning tools made available to select employees. |

TABLE 61-continued

| | Procurement |
|---|---|
| | Approval process in place but not rigidly followed; requisitioners have no consistent access to status of approval.<br>Purchase Goods and Services:<br>Strategic sourcing has reduced suppliers but results are not communicated to users; "non-approved" suppliers still utilized; process to rationalize suppliers is inconsistent. Requisitioner/BU involved in sourcing decision.<br>POs transmitted via auto-fax.<br>Invoice Processing:<br>Invoices received via EDI or XML, paper invoices scanned for documentation and approval routing purposes.<br>Invoices not referencing a PO are electronically routed for approval; invoices that have been matched do not require an additional approval.<br>Vendors provide weekly/monthly summary invoices.<br>Pay Suppliers:<br>Consolidate payments to same supplier from invoices across the organization.<br>Use automatic payment for standard, recurring items.<br>Electronic check signing/approval can occur remotely. |
| Market Leading Criteria: | Requisitions:<br>Utilize eProcurement applications with preferred supplier/preferred item catalogs; requisition approval steps are automated and minimized; no approval necessary for expense items below a certain dollar amount;<br>Requisitioners have real time access to requisition approval status and PO status.<br>Purchase Goods and Services:<br>Routine purchases bypass procurement through the use of p-cards, eP, and reorder systems;<br>No approval required on PO if obtained on requisition;<br>EDI/XML PO sent to supplier via eMarketplace or private exchange.<br>Preferred suppliers are strategically selected "partners" and communicated to organization.<br>Invoice Processing:<br>View purchasing and payables as one process versus two distinct organizations.<br>Invoiceless processing through use of ERS (evaluated receipts settlement, where payment is made after matching receipt to purchase order);<br>invoices received and processed by centralized shared services center or outsourced to third party;<br>minimize levels of reporting hierarchy in SSC.<br>Pay Suppliers:<br>Entire disbursements process is outsourced to third party; payments made via EDI/EFT;<br>allow suppliers access to view status of payments.<br>Link AR and AP systems to prevent payments being made to suppliers who are also customers with outstanding receivables. |

TABLE 62

| | Information Technology |
|---|---|
| Description: | This capability covers the management of Information Technology, and the related processes to create, run and maintain the IT architecture, applications and infrastructure. |
| Basic Criteria: | IT Strategy:<br>Lack of supply chain IT strategy, or supply chain IT strategy is not aligned with an enterprise-wide IT strategy.<br>Limited buy-in to new technology.<br>New technology is implemented in fragmented way that does not cover entire operations area. |

TABLE 62-continued

Information Technology

| | |
|---|---|
| Competitive Criteria: | IT Strategy:<br>IT strategy defined at specific function level only, but may not be articulated across the business.<br>Developing support for changes in technology.<br>Use of PC tools such as spreadsheets and basic database. |
| Market Leading Criteria: | IT Strategy:<br>Enterprise-wide IT strategy clearly defined and understood; supports and enables supply chain technology initiatives.<br>Continuously seek out knowledge on available technology and practical application to business.<br>High degree of buy-in leading to successful implementation.<br>Full integrated transactional systems with decision support tools that provide quick resolution to complex issues across businesses. Explores and utilizes eCommerce opportunities.<br>Standard suite of end user tools rolled out.<br>Tool standards exist and are enforced. |
| Description: | This capability covers the management of Information Technology, and the related processes to create, run and maintain the IT architecture, applications and infrastructure. |
| Basic Criteria: | General Architecture:<br>Internally-centric architecture.<br>All system interfaces are point-to-point, mostly batch.<br>Most planning is monthly or weekly.<br>Many fragmented planning applications with overlapping functions/data supporting optimization at the local level only.<br>Functionally-oriented applications vs. process-oriented.<br>Security cannot extend beyond the enterprise.<br>Discontinuity of business data viewed by different levels of the organization.<br>Primary reporting is static printed reports from each application.<br>Data is messaged at each level of the organization over a period of time before senior management sees it. The value of this old and "improved" data is questionable. |
| Competitive Criteria: | General Architecture:<br>Architecture extends beyond the enterprise with Point-to-Point business connectivity (i.e., EDI).<br>System interfaces includes both batch and real-time.<br>Planning is mostly weekly or daily.<br>System integration tools (EAI) provide standard package connectors and tools for building or customizing new integration.<br>Global consolidation of internal data for global decision-making (may be data warehouse). Timing age of data is usually an issue.<br>Process-oriented applications or collections of data for cross-process visibility/analysis.<br>Data for external use is sent to business partners or posted in DMZ for viewing/extraction by the business partner.<br>Single data source for all business reporting/metrics with ad-hoc analysis capabilities.<br>Standard KPI defined/reported. |
| Market Leading Criteria: | General Architecture:<br>Global architecture and connectivity. All customers/suppliers have access to relevant data real-time.<br>Data is "trickled in" vs. periodic batch extract.<br>System interaction is controlled via a data-bus which supports both batch and real-time interaction, enhances data/process reuse, and is enables reduced on-going support effort by better isolation of system changes.<br>Global planning capabilities driven off of global instance of real-time data. Data is provided in a net-change mode to eliminate long extract/transfer processing times. Global planning is run daily or even multiple times daily (shift).<br>Data warehouse and data analytics capability replaces most of static reporting. Pre-packaged standard metrics and views enable consistent business metrics at all levels of the organization.<br>Business driver KPI's are visible to all organizational levels. |

TABLE 62-continued

Information Technology

Management dashboards with exception-based views, drill-down and notation capabilities are used to drive and improve the business management.

TABLE 63

Information Technology Development Architecture

| | |
|---|---|
| Description: | This capability covers the management of Information Technology, and the related processes to create, run and maintain the IT architecture, applications and infrastructure. |
| Basic Criteria: | Development Architecture:<br>The development environment consists of PC's or one or more small or shared servers.<br>The test environment is shared with development.<br>Training is planned without a hands-on component or environment.<br>Multiple tools/technologies are used to source data from other systems based on the client's current environment and tools. Most work is custom.<br>Integration is point-to-point.<br>HW and SW version control process over development and test environment is ad-hoc.<br>Each project team member brings in their own tools and methods to the project.<br>Cross-project communication and coordination is ad-hoc. |
| Competitive Criteria: | Development Architecture:<br>A development environment setup to deliver maximum productivity of project team on design/build activities.<br>A separate test environment is setup to deliver the complete scope of project testing requirements.<br>Hands-on training is delivered using the test environment.<br>Integration tools used are provided by the planning system vendor or the source system and are based on ease/speed of delivery.<br>Mix of custom and standard or configurable products.<br>Integration is product-dependent.<br>A manual process is established to control HW and software changes to all operating environments.<br>Standard tools are identified and provided to the project team based on project needs, and budgeted in the project plan.<br>Cross-project communication and sharing is facilitated by providing a shared repository for project deliverables and documentation. |
| Market Leading Criteria: | Development Architecture:<br>Flexible and separate development and test environments are planned, scheduled, built, partitioned and scaled to support project maximum project effectiveness with parallel work streams and a mix of prototyping/dev, unit and full volume system testing, user testing and training activities.<br>A separate training environment is setup and maintained as an on-going capability.<br>A formal data integration layer is built using EAI tools reducing overall integration complexity. A small set of effective tools used to source data from other systems based on best fit and performance requirements. Integration is partially de-coupled from the source systems and future integration support effort is reduced.<br>HW and SW change is controlled and delivered with a formal process with tools and automated processes to insure controlled and efficient change control is delivered to the project across all operating environments.<br>A pre-packaged development environment including all tools and processes are delivered via solution centers. |

TABLE 64

Information Technology Execution Architecture

| | |
|---|---|
| Description: | This capability covers the management of Information Technology, and the related processes to create, run and maintain the IT architecture, applications and infrastructure. |
| Basic Criteria: | Execution Architecture:<br>Most planning systems have a limited client UI, some require client-installed SW, some are web-based.<br>Most are focused on planning output data views.<br>Transaction/Messaging Services for planning are typically limited to internal order fulfillment or ATP functions.<br>Batch Services are traditionally at the heart of planning systems.<br>Large/long batch optimization runs are the norm.<br>Data Transfer Services typically allow for mass data movement between applications or internal sites<br>Database Services are usually coupled with the UI for viewing output data.<br>Security Services are frequently absent in planning systems due to the normally small number of users.<br>Reporting capabilities are generally limited to viewing output data online. |
| Competitive Criteria: | Execution Architecture:<br>Some planning products provide both input and output data viewing, some also support mass editing capabilities via upload/download.<br>Transaction/Messaging Services may also provide integration of planning and ERP applications for data synchronization using EAI.<br>Batch Services provide periodic refresh of data between planning and execution systems, running the optimization and controlling complex processing sequences within the application.<br>Data Transfer Services are implemented for both internal and external business activity.<br>Database Services may be extended to data entry and output data views via the UI. It may also be used for data staging or for better access control.<br>Security Services are primarily for authentication services<br>Reporting is delivered by via data warehouse.<br>Print Services may be deployed where large static reporting is delivered. |
| Market Leading Criteria: | Execution Architecture:<br>The best web-based UI has a small network footprint.<br>Transaction/Messaging Services may be outsourced to business network providers for transaction routing or provide a message bus within the application architecture.<br>Batch Services provide control for complex and interrelated processes across all applications.<br>Data Transfer Services may provide secure and compress data migration for both internal and external system feeds.<br>Database Services may extend to provide analysis or complex reporting capabilities.<br>Security Services are extended to include authorization services and user profiles to support internal and external user bases.<br>Reporting is an integral part of the planning solution. Simple to complex static, ad-hoc, or packaged data analytics can deliver this capability.<br>Offline Simulation/What-if capabilities may be provided to allow offline analysis of altering business rules to assess impact before they are implemented. |

TABLE 65

Information Technology Infrastructure Management

| | |
|---|---|
| Description: | This capability covers the management of Information Technology, and the related processes to create, run and maintain the IT architecture, applications and infrastructure. |
| Basic Criteria: | Operations Architecture/Physical Infrastructure Management:<br>Processes/Staff exist to assess operational status of key datacenter components.<br>Manual procedures are defined to restore failed services.<br>Capacity is upgraded based on infrequent analysis, actual failures or reported performance problems.<br>Recovery activities are always "fire-drills".<br>All activity/processes have equal priority/access to capacity (servers, networks, services).<br>Data and SW backup is ad-hoc.<br>Batch scheduling is handled on a "timed" basis.<br>There is no visibility to failed processes. Multi-application batch integration is ad-hoc or manual.<br>Printing to local printers is supported via user request. There are practical limits on volume and potential network impact.<br>Availability and Performance management is ad-hoc. No SLA exists. |
| Competitive Criteria: | Operations Architecture/Physical Infrastructure Management:<br>Tools are in-place to monitor and report any primary service failure.<br>Processes/scripts are defined for operations or support staff to recover failed services.<br>Capacity is periodically evaluated. Upgrades are implemented based on evaluation results. Sudden changes in resource usage can create surprise failures.<br>Processes are scheduled to avoid capacity bottlenecks..<br>Manual priority is established for each activity.<br>Data and SW backups are scheduled as needed. Recovery is manual based on request.<br>Each application has an internal batch scheduling capability. Cross-application batch integration is handled via "triggering". Multiple scheduling tools may be used.<br>Mass printing and distribution is handled on site-based printers and manual distribution.<br>Formal SLA's are written and metrics established to manually track and report services availability and performance. |
| Market Leading Criteria: | Operations Architecture/Physical Infrastructure Management:<br>Tools, processes and redundancy is planned and implemented to automatically recovery from service failures (lights out operations).<br>Capacity is modeled and actively monitored. Thresholds are established for alerting support of potential failures or performance impacts.<br>Priority schemes and tools are implemented to reduce capacity requirements and insure critical business processes have required capacity.<br>Data and SW backup and recoveries are fully automated. Data and SW redundancy is maintained for immediate recovery. Backups are rotated off-site for disaster recovery.<br>There is a master production batch scheduling capability. Cross-application integration and visibility is fully supported with a single tool.<br>Print management is implemented to enable print routing, support reprint, print monitoring and reduce network impact of printing.<br>Tools are implemented to constantly monitor and report services availability and performance metrics. Real-time visibility is provided to SLA compliance. |

TABLE 66

Information Technology Application Management

| | |
|---|---|
| Description: | This capability covers the management of Information Technology, and the related processes to create, run and maintain the IT architecture, applications and infrastructure. |

TABLE 66-continued

Information Technology Application Management

| | |
|---|---|
| Basic Criteria: | Operations Architecture/Application Management:<br>Manual processes/staff exist to assess operational status of key application components.<br>Manual procedures are defined to restore failed application services.<br>Application support reviews application error logs to determine the cause of failures.<br>Application performance issues are reported by users. Support then takes action to address them.<br>Client/Workstation SW must be manually distributed/installed and upgraded over time. Old versions may be incompatible with new releases.<br>New SW installation or fix migrations are manual and overlays prior software components.<br>Users call application support directly with application questions or problems.<br>Application availability and performance levels are managed ad-hoc.<br>No SLA exists. |
| Competitive Criteria: | Operations Architecture/Application Management:<br>Tools are in-place to monitor and report a key application service failure.<br>Processes/scripts are defined for support staff to recover failed application services.<br>The application error logs are parsed and detected errors create an alert or notification of failures.<br>Application performance is periodically evaluated to insure it continues to meet business needs.<br>Clients use web browser, but must download and install browser plug-in. Version checking is embedded to prevent application corruptions.<br>Processes/Scripts are built to migrate SW changes across environments (including maintaining copies of old versions).<br>Users or application help desk log problems to a problem ticket capability. Support staff monitor and address problems reported. Formal SLA's are written and a process established to manually track and report key application metrics. |
| Market Leading Criteria: | Operations Architecture/Application Management:<br>Tools are implemented and integrated with the application to detect and auto-recover from many application service failures. Where automated recovery is not possible, automated notification of the failure is executed.<br>Tools are implemented to collect and monitor key application performance metrics. Key thresholds are established and support is notified to proactively address potential performance problems.<br>All user components are Web-based (no plug-ins). Standard browser is all that is needed.<br>No SW distribution, no version control issues.<br>Tools are implemented to control changes, maintain code versions, and package/deliver upgrades across environments. Both install or back-out can be executed rapidly.<br>Users log problem tickets and support is immediately notified of critical issues. Users are notified when ticket/problem is closed. Key SLA support metrics are captured and reported.<br>Tools are implemented to constantly monitor and report application availability and performance metrics. Real-time visibility is provided to SLA compliance. |

TABLE 67

Performance Management

| | |
|---|---|
| Description: | The capability covers process steps to define and set targets based to measure and report corporate performance. The nature of the processes is generic, which makes them applicable to all capabilities that need to be measured. This capability area is closely related to Finance. |
| Basic Criteria: | Operations Management Objectives:<br>Performance measures are focused on individual performance and not related to business objectives.<br>End-to-end Integration:<br>Performance measures do not span the supply chain due to limited alignment of departmental goals.<br>Measure Focus:<br>Performance measures are limited to financial measures only.<br>Performance measures focus on punishment rather than reward.<br>Scope of Metrics:<br>Performance metrics for organizations, work teams, and individuals are minimal. |
| Competitive Criteria: | Operations Management Objectives:<br>Some team performance measures have been introduced that are focused on business unit objectives.<br>End-to-end Integration:<br>Performance measures span the internal supply chain but mainly from a high level strategic perspective.<br>Measure Focus:<br>Performance measures are used to prioritize action points for key customers.<br>Performance measures are used to promote collaboration with suppliers to improve services, but are also used to serve the relationship if no immediate improvements are obtained.<br>Scope of Metrics:<br>Functional performance objectives are used. |
| Market Leading Criteria: | Operations Management Objectives:<br>There is an integrated performance management system where an optimal mix of individual and team measures are directly tied to business objectives.<br>End-to-end Integration:<br>Performance measures span the internal and external supply chain and are operationally as well as strategically focused and linked to customer needs satisfaction. The total supply chain is monitored continuously and measures are used to optimize performance.<br>Measure Focus:<br>There is a full range of heard financial and soft performance measures to ensure that customer needs are fully met.<br>Delivery to customer requested delivery dates is measured, as well as order aging for back orders.<br>Performance measures focus on rewards and improvement opportunities.<br>Scope of Metrics:<br>Business strategy, performance objectives and goals for organization, work teams and individuals are defined and aligned with performance targets and goals. |
| Description: | The capability covers process steps to define and set targets based to measure and report corporate performance. The nature of the processes is generic, which makes them applicable to all capabilities that need to be measured. This capability area is closely related to Finance. |
| Basic Criteria: | Usage of Metrics:<br>Metrics are occasionally used to drive performance.<br>Focus of Metrics:<br>Metrics internally focused, such as terminal utilization, vehicle utilization and production variance; KPIs are measured monthly or quarterly. |
| Competitive Criteria: | Usage of Metrics:<br>Metrics integrated into incentive programs and reward structure.<br>Focus of Metrics:<br>Metrics are work group and business focused, such as output, yield, and efficiency;<br>KPIs are measured weekly or daily. |

TABLE 67-continued

Performance Management

| | |
|---|---|
| Market Leading Criteria: | Usage of Metrics: Metrics are integrated into incentive programs and used to drive continuous performance improvement. Focus of Metrics: Metrics are customer and shareholder value focused, such as on-time delivery, product quality and profitability; KPIs are measured at optimal frequency to allow immediate corrective action. |

TABLE 68

Quality Management

| | |
|---|---|
| Description: | This capability covers all processes to ensure and maintain the required high levels of quality for services and products offered and produced, throughout the entire value chain. |
| Basic Criteria: | Quality is been reviewed occasionally and locally. Actions to improvement are taken on an operational basis. Basic understanding of requirements with many gaps. Infrequent updates to customer needs. No defined quality strategy. No defined quality process. Carriers do not participate in quality driven initiatives. |
| Competitive Criteria: | Quality management processes are established. Targets are locally defined and measured with a well-defined KPI metrics. Adequate understanding of requirements with a few gaps. Periodic updates reflect changing customer needs. Each business unit uses separate transportation quality strategies. Initiating TQM process, having completed ISO9000 programs. Carriers mandated to participate in quality programs. |
| Market Leading Criteria: | Enterprise wide quality targets are set up. Measurements based on a well defined structured process are taken. Targets are defined. Measures to improve quality are defined on operational, tactical and strategic levels. Clear understanding of needs. Requirements continuously updated. A formal, firm-wide transportation-specific quality strategy is in place. Fully developed TQM process implemented into transportation with independent audits. Carriers participate fully in quality process. |

Figure 12:
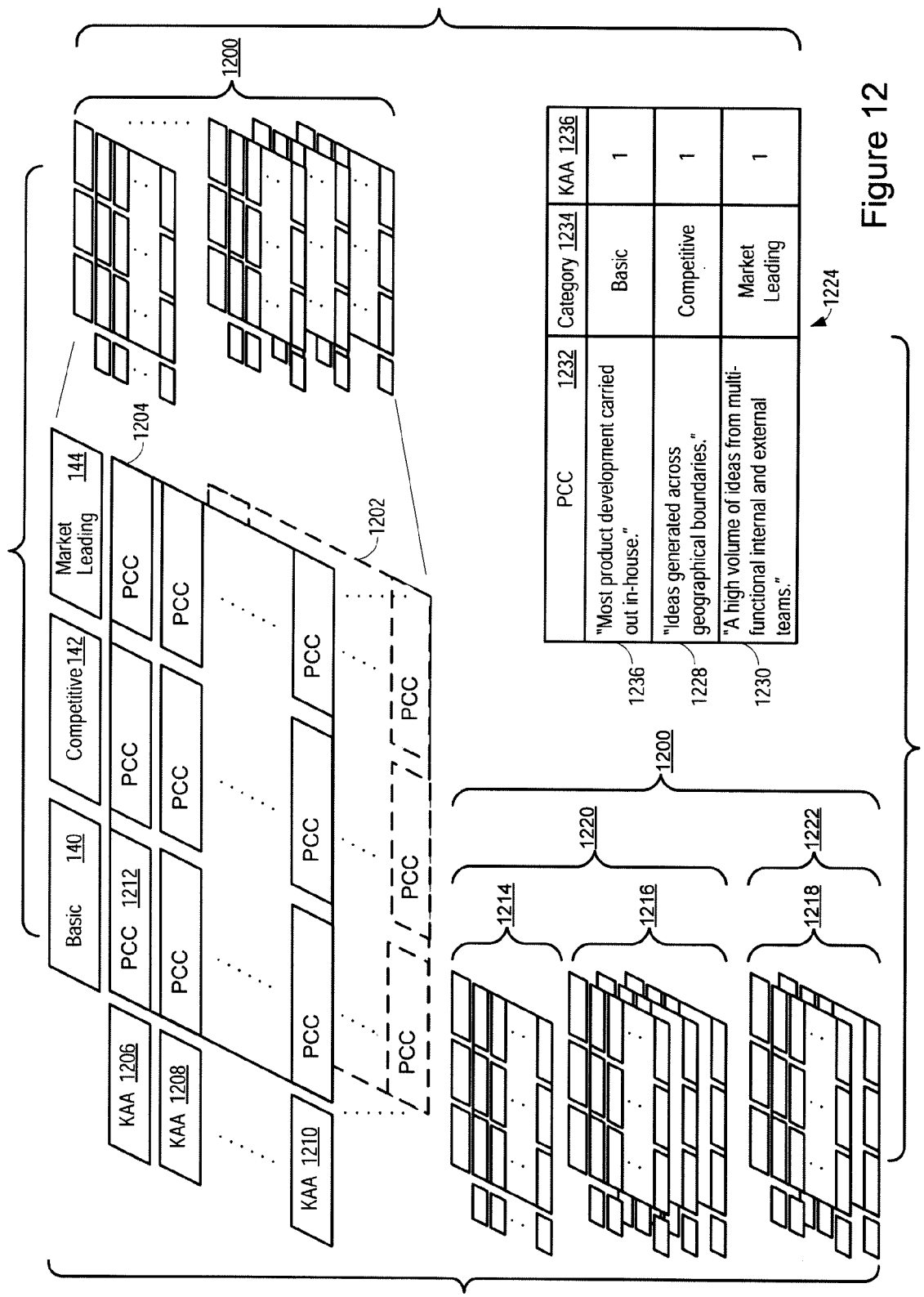
FIG. 12 shows a capability detail pool providing a multidimensional postal industry performance reference set where multiple key assessment performance reference tables are collected and stored.

FIG. 12 shows a multidimensional postal industry performance reference set 1200 ("reference set 1200") that provides a capability detail pool from which the system described below may obtain benchmarking tables for a postal business. The reference set 1200 includes multiple key assessment performance reference tables ("reference tables"), two of which are labeled 1202 and 1204. Each reference table may provide the benchmarking criteria for a specific capability, such as those noted above with respect to FIGS. 2-11.

One dimension of each table may establish the 'Basic' performance capability level 140 specifying 'Basic' performance assessment criteria, the 'Competitive' performance capability level 142 specifying 'Competitive' performance assessment criteria, and the 'Market Leading' performance capability level 144 specifying 'Market Leading' performance assessment criteria. Another dimension of each table may specify one or more key assessment areas (KAAs), several of which are labeled 1206, 1208, and 1210. As noted above, performance capability criteria, e.g., the PCC 1212, populates each key assessment performance reference table to provide benchmark criteria for 'Basic', 'Competitive', and 'Market Leading' characteristics.

The reference set 1200 represents the HPCA model 100. Consistent with the HPCA model 100, the reference set 1200 may organize multiple reference tables into a hierarchical structure defining discrete changes in granularity. In one implementation, the hierarchical structure includes reference tables, sub-platforms, platforms, and models. FIG. 12 labels three sub-platforms 1214, 1216, and 1218. The reference set 1200 may further organize the sub-platforms into platforms, two of which are labeled 1220 and 1222. Platforms aggregate into the HPCA model 100 and corresponding reference set 1200. Additional, different, or fewer levels of granularity may be defined in the HPCA model 100.

The reference set 1200 may dynamically populate the reference tables with the most up-to-date performance capability criteria, for example upon retrieval and presentation by a business analysis consultant. The performance capability criteria may be retrieved from a performance capability criteria database or other information source.

FIG. 12 also shows an example of a database implementation 1224 of a portion of a reference table. In particular, the database implementation 1224 includes records (e.g., the records 1226, 1228, 1230) that establish each PCC 1212. In the example shown, each record includes a PCC field 1232, a category specifier field 1234, and a KAA specifier field 1236. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 13:
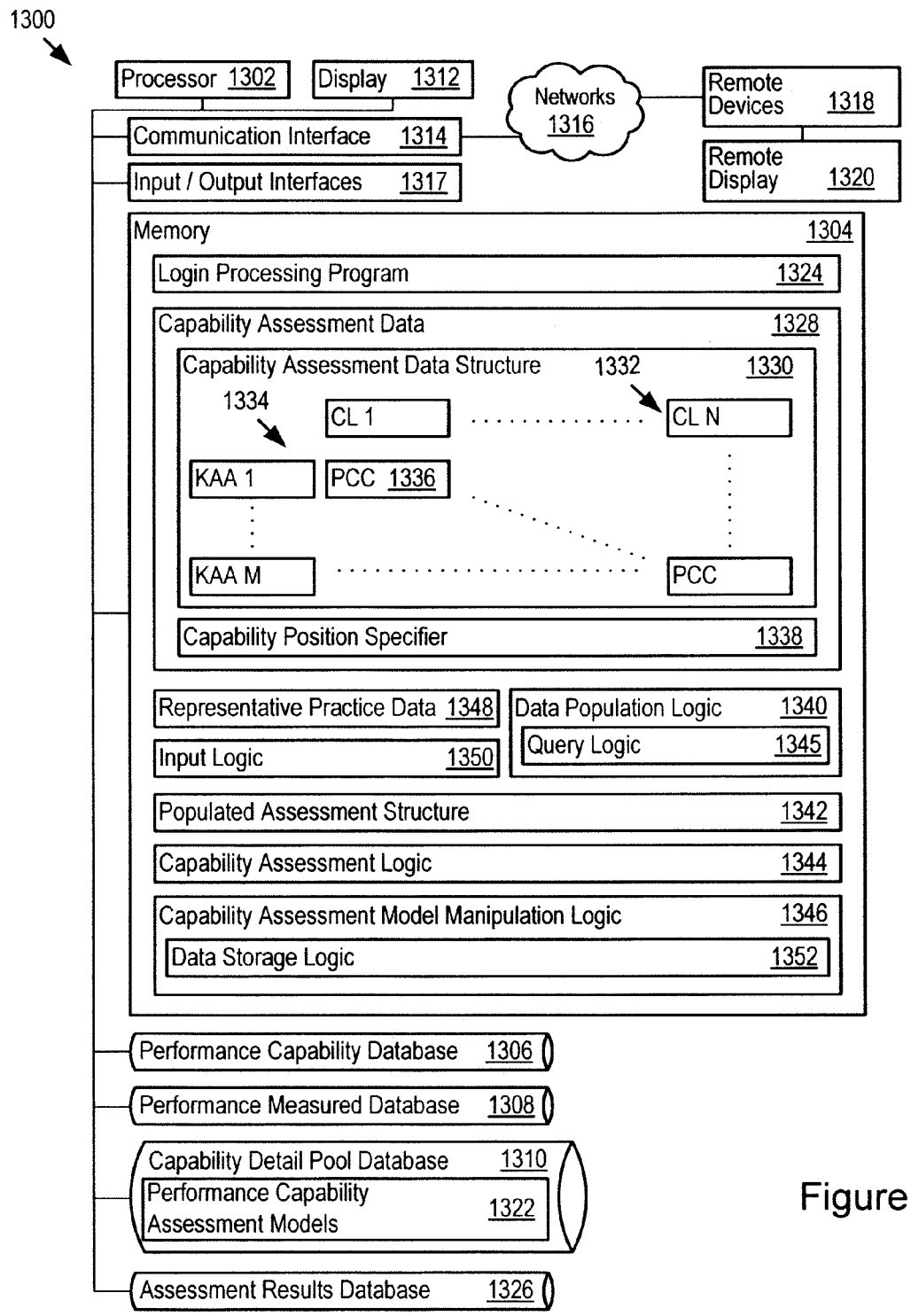
FIG. 13 shows a capability assessment system.

FIG. 13 shows a high performance capability assessment system ("system") 1300. The system 1300 includes a processor 1302 and a memory 1304. Several databases support the operation of the system 1300, including a performance capability database 1306, a performance measured database 1308, a capability detail pool database 1310, and an assessment results database 1326. The system 1300 may include a local display 1312 and input/output interfaces 1317 (e.g., including a keyboard, mouse, microphone, speakers, or other device), and, through the communication interface 1314 and networks 1316, may communicate with remote devices 1318 and remote displays 1320. The networks 1316 may be any combination of external networks (e.g., the Internet) and internal networks (e.g., corporate LANs). The displays 1312 and 1320 may, for example, present performance capability assessment models 1322 that the system 1300 retrieves from the capability detail pool database 1310 for review, modification, and application by process engineers or other individuals. With regard to local, access or access by the remote devices 1318, the system 1300 may include a login processing program 1324 to authenticate and/or authorize access to the system 1300. To that end, the login processing program 1324 may include username/password verification, private/public key encryption, or other validation and data protection capabilities.

In one implementation, the performance capability database 1306 stores performance capability criteria. As will be described in more detail below, the system 1300 may populate performance capability assessment models with performance capability criteria suited to any particular platform (e.g., customer interaction platform 102, enablement platform 104 and asset management platform 106 etc.) and business capability at one or more capability levels across one or more key assessment areas. The performance measured database 1308 may store the determined, measured, or otherwise ascertained characteristics, criteria, and other measured data of a particular key assessment area as representative practice data 1348. The representative practice data 1348 may be obtained through interviews with business consultants and industrial engineers, through online questionnaires, through manual or automated analysis of business data (e.g., year end operating reports), or in other manners. The capability detail pool database 1310 stores the capability detail pool 1200, which includes pre-defined performance capability assessment models 1322. The assessment results database 1326 stores determined capability levels for specific capabilities that have been analyzed.

The system 1300 facilitates the review, modification, creation, and application of performance capability assessment models. In that role, performance capability assessment model manipulation logic ("manipulation logic") 1346 within the system 1300 creates, retrieves, and stores capability assessment data 1328 in the memory 1304. The manipulation logic 1346 may establish capability assessment data 1328 in the memory 1304, including a capability assessment data structure 1330 with multiple capability levels ("CL") 1332 organized along a capability scale dimension, multiple key assessment areas ("KAA") 1334 organized along a key factor dimension, and performance capability criteria ("PCC") 1336 that populates the performance capability assessment model 1330. The manipulation logic 1346 may vary widely in implementation, and, as one example, may include data storage logic 1352 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 1346 establishes the capability assessment data structure 1330 to include a multidimensional postal industry performance reference set that includes multiple key assessment performance reference tables in which the key assessment performance reference tables include a 'Basic' performance capability level, a 'Competitive' performance capability level and a 'Market Leading' performance capability level.

The capability assessment data 1328 may also include a capability position specifier 1338. The capability position specifier 1338 may record the capability level along the performance capability scale 146, as determined for any particular capability. Thus, the system 1300 may store the capability level in the assessment results database 1326 or elsewhere for future retrieval and review.

In one implementation, the data population logic 1340 may be a data population program executed by the processor 1302 that populates template performance capability assessment models. For example, the data population logic 1340 may include input logic 1350 that accepts input specifying a capability of interest that indicates a particular performance capability assessment model. The data population logic 1340 may include query logic 1345 that executes database queries and prompts a user for input to obtain the corresponding performance capability criteria for the capability of interest.

In another implementation, for example, the query logic 1345 may receive an input specifying a postal industry area and a postal industry key assessment area with the postal industry area for analysis. The query logic 1345 searches the multidimensional postal industry performance reference set for a matching key assessment performance reference table that matches the postal industry area and the postal industry key assessment area, and retrieves the matching key assessment performance reference table.

The data population logic 1340 may further include storage logic that adds the retrieved performance capability criteria to the template performance capability assessment model. The data population logic 1340 produces populated performance capability assessment structures 1342 that may be stored in the capability detail pool database 1310.

In addition to the analysis process described above, the system 1300 may provide an automated analysis of representative practice data 1348 that identifies relevant performance capability criteria and determines the position on the performance capability scale 146 of each key assessment area corresponding to the performance capability criteria for the representative practice data 1348. As one example, the system 1300 may implement capability assessment logic 1344 that includes comparison and/or matching logic that analyzes the representative practice data 1348 with respect to performance capability criteria to locate key assessment areas for which the system 1300 can determine capability levels to obtain a resultant performance capability level for each key assessment area.

Furthermore, the capability assessment logic 1344 may determine an overall position on the performance capability scale 146 as the capability position specifier 1338, for a capability under examination given the knowledge of where the key assessment areas corresponding to the capability under examination fall in each capability level. Thus, for example, the capability assessment logic 1344 may determine an overall capability level for a capability corresponding to the capability level for the majority of the key assessment areas, or it may apply a weighted analysis technique to give more emphasis to some key assessment areas than others in determining the overall position on the performance capability scale 146 for a capability. As another example, the capability assessment logic 1344 may implement an expert system (e.g., based on a neural network trained on prior determinations) that analyzes the determined characteristics with respect to the performance capability criteria and ascertains where the capability under examination falls along the performance capability scale 146 for each of the key assessment areas, or overall on the performance capability scale.

Figure 14:
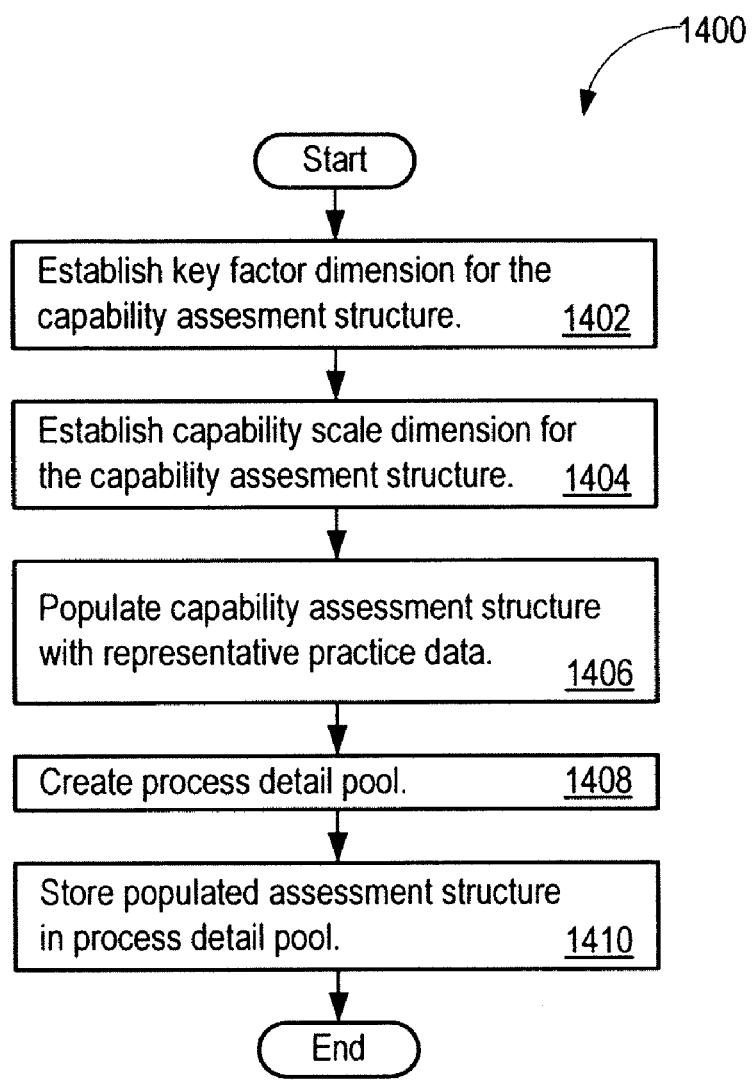
FIG. 14 shows a flow diagram for establishing high performance capability assessment models.

FIG. 14 shows a flow diagram 1400 for creating performance capability assessment models. The performance capability assessment model creator (e.g., the manipulation logic 1346) establishes a key factor dimension for the performance capability assessment model (1402). The performance capability assessment model creator also establishes a capability scale dimension for the performance capability assessment model (1404). The capability scale dimension may define a scale of increasing organizational capability. For example, the structure creator may create the 'Basic' capability level 140, the 'Competitive' capability level 142, and the 'Market Leading' capability level 144. The performance capability assessment model creator also populates the performance capability assessment model with performance capability criteria (1406). A capability detail pool 1200 may be formed to hold multiple tailored key assessment performance reference tables (1408). The performance capability assessment model creator may store the populated assessment structure in the capability detail pool for subsequent retrieval and analysis (1410).

Figure 15:
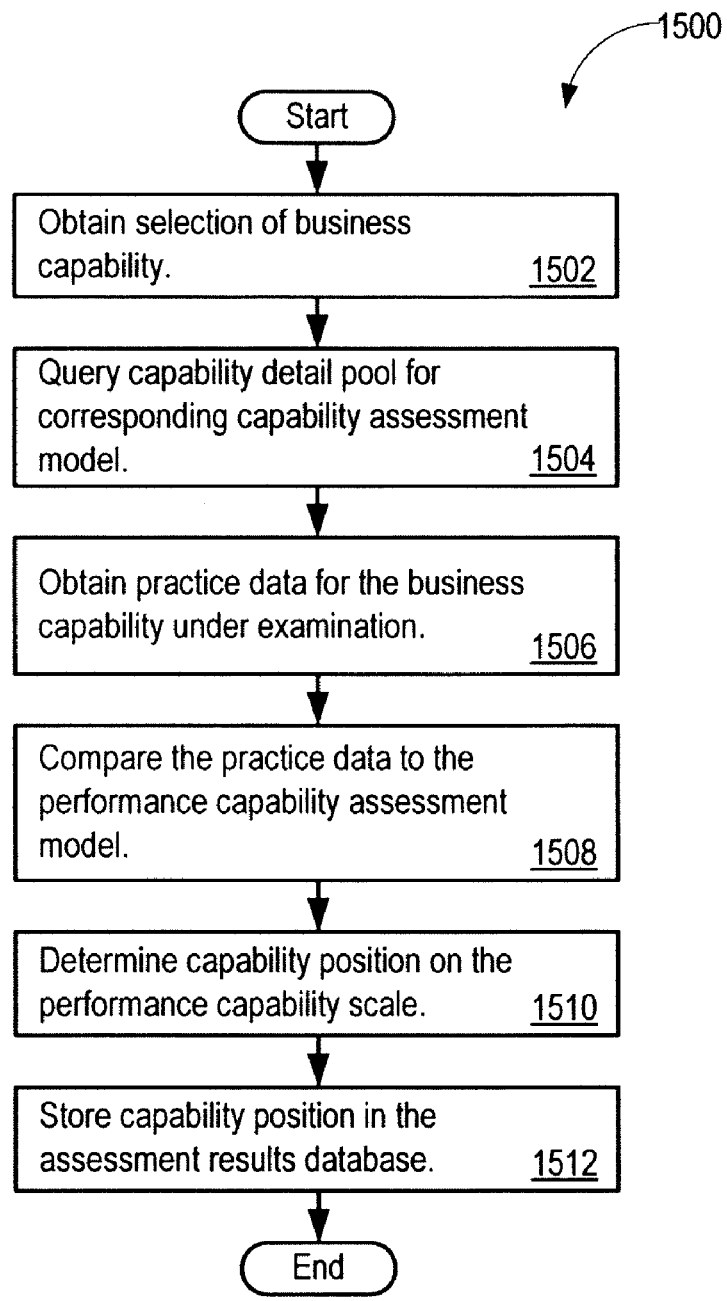
FIG. 15 shows a flow diagram for retrieving and applying high performance capability assessment models.

FIG. 15 shows a flow diagram 1500 for retrieving and applying performance capability assessment models. A selection of a capability to be analyzed is obtained (1502). In one implementation, the system 1300 receives input data that specifies a postal industry area and a postal industry key assessment area for analysis. For example, the system 1300 may accept input from a business consultant that specifies a capability for analysis. The system 1300 may query the capability detail pool 1200 for a corresponding performance capability assessment model (1504). The corresponding performance capability assessment model may be pre-defined in the capability detail pool 1200, or the data population logic 1230 (or other actor) may populate a performance capability assessment model template that the system 1300 newly creates, or that the system 1300 retrieves from a data store, such as the capability detail pool database 1310.

In another example, the system 1300 searches the multidimensional postal industry performance reference set in the capability detail pool 1200 for a matching key assessment performance reference table based on the input data that specifies a postal industry platform and a postal industry key assessment area. The system 1300 retrieves the matching key assessment performance reference table and initiates analysis of the matching key assessment performance reference table to obtain a resultant performance capability level for the postal industry key assessment area.

The system 1300 obtains representative practice data 1348 for the capability under examination in the specific business under review (1506). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 1300 may retrieve the representative practice data 1348 from a database of previously obtained representative practice data.

The system 1300 compares the representative practice data 1348 to the performance capability criteria in the performance capability assessment model (1508). For example, a business consultant may use his or her expertise to arrive at a determination of capability level for the business and the capability under examination (1510). Alternatively or additionally, the capability assessment logic 1344 may perform an automated analysis of the assessment results data in the assessment results database 1326 and ascertain the capability level on the performance capability scale 146 (1510). The system 1300 may store the assessment results, including the determined capability level, for future reference in the assessment results database 1326 or other location (1512).

Figure 16:
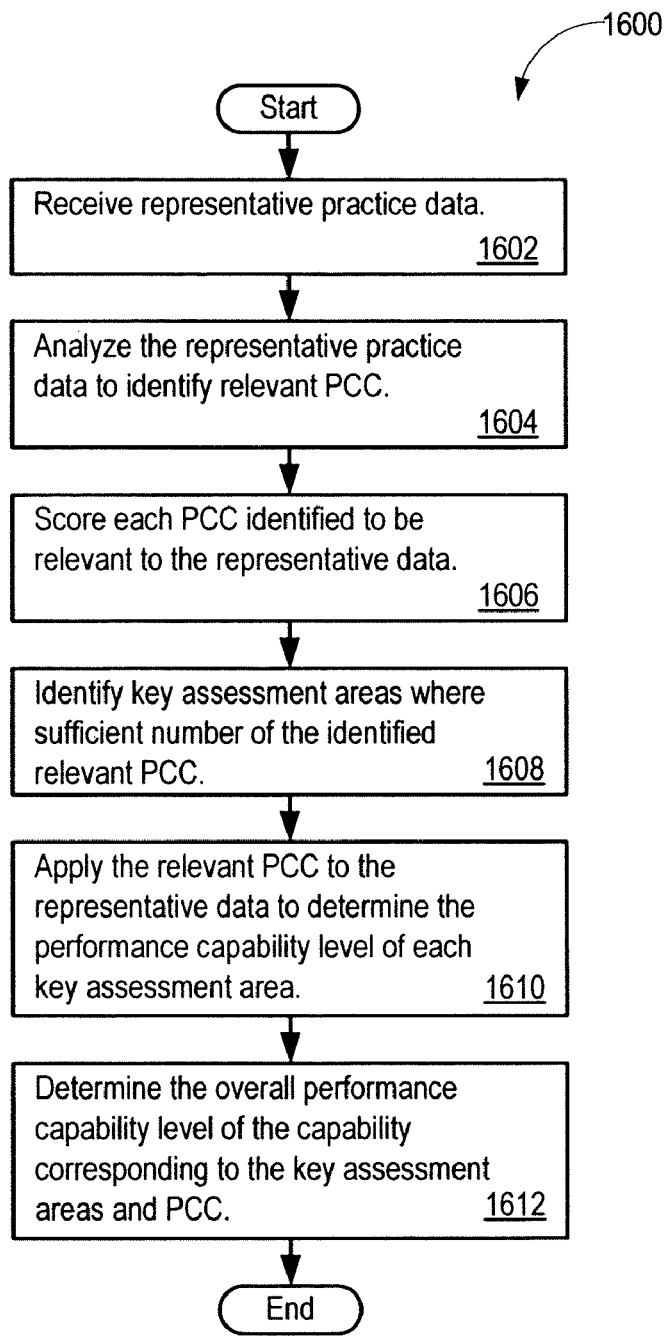
FIG. 16 shows a flow diagram for analyzing representative practice data to determine a postal industry and a postal key assessment area to which the representative practice data applies.

FIG. 16 shows a flow diagram 1600 for analyzing representative practice data 1348 to determine a postal industry and a postal key assessment area to which the representative practice data applies. The system 1300 receives representative practice data 1348 as input data (1602). The system 1300 may receive the representative practice data 1348 from a database query performed by the query logic 1345 that the query logic executes periodically, when instructed by an operator, and/or automatically against any number of available database sources that store representative practice data 1348. The capability assessment logic 1344 analyzes the representative practice data 1348 to identify performance capability criteria in the capability detail pool 1200 that the capability assessment logic 1344 determines relevant to the representative practice data 1348 (1604). For example, the capability assessment logic 1344 may compare and/or match the content of the representative practice data 1348 with the performance capability criteria using natural language processing (NLP), text string and/or substring matching, by comparing tags linked to the representative practice data 1348 and that specify that any portion of the representative practice data 1348 is applicable to a specific PCC, by querying for a manual classification of the representative practice data 1348 to a PCC, or other matching technique. The capability assessment logic 1344 may score and/or weight a performance capability criteria and compare the score and/or weight to a user specified relevance threshold to rank the relevance of the performance capability criteria to the representative practice data 1348 (1606). The user may specify particular terms and/or phrases to search and match between the performance capability criteria and the representative practice data 1348, in order to score the performance capability criteria.

The capability assessment logic 1344 may determine, based on the number of performance capability criteria that meet or exceed the relevance threshold, that the capability assessment logic 1344 has identified a sufficient number of performance capability criteria for a specific key assessment area in order to determine a performance capability level for the capability as a whole or any key assessment area within the capability (1608). As one example, where at least 51% of the performance capability criteria for a particular key assessment area meet or exceed the relevance threshold, the capability assessment logic 1344 applies the performance capability criteria to the representative practice data 1348. In another example, the performance capability criteria for a particular key assessment area may be ranked in importance and/or designated as mandatory in order to assess the key assessment area. In the event the capability assessment logic 1344 identifies the mandatory performance capability criteria for a key assessment area the capability assessment logic 1344 applies the performance capability criteria to the representative practice data 1348.

The capability assessment logic 1344 may apply the performance capability criteria meeting or exceeding the relevance threshold to the representative practice data 1348 to determine whether any particular PCC is met. Accordingly, as the capability assessment logic 1344 analyzes the PCC, the system 1300 tracks the best fit of the representative practice data 1348 to the PCCs in the key assessment performance reference tables. In other words, the system 1300 determines how the representative practice data 1348 meets (or does not meet) each PCC, thereby gaining insight into whether the representative practice data 1348 is indicative of Basic, Competitive, or Market Leading practices.

The system 1300 may also gauge the position on the performance capability scale 146 of each key assessment area corresponding to the performance capability criteria (1610). The capability assessment logic 1344 may further determine an overall position on the performance capability scale 146 for a capability (1612). The capability assessment logic 1344 may establish that a desired number and/or designated mandatory performance capability criteria for the key assessment areas have been identified as relevant to a capability and sufficient to determine the position on the performance capability scale 146 for the capability. For example, the capability assessment logic 1344 may determine an overall capability level for the capability based on the capability level determined for the majority of the key assessment areas. The capability assessment logic 1344 may apply a weighted analysis technique to give more emphasis to some key assessment areas than others in determining the overall position on the performance capability scale 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 1300 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the postal industry. In particular, the combinations of key assessment areas and particular assessment criteria of the HPCA model, including the criteria noted in Tables 4-68 above, provide significant advantages over other assessment models. The unexpectedly good results include clearly identifying and delineating from among multiple related complex processes specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for high performance capability assessment of a postal business, comprising:
    defining, by a processor coupled to a machine-readable memory, a multidimensional postal industry performance reference set stored in the memory and comprising multiple key assessment performance reference tables, at least one key assessment performance reference table further defining an enablement platform including:
        a 'Basic' performance capability level specifying 'Basic' performance assessment criteria;
        a 'Competitive' performance capability level specifying 'Competitive' performance assessment criteria;
        a 'Market Leading' performance capability level specifying 'Market Leading' performance assessment criteria;
    establishing capacity planning performance assessment criteria,
        wherein the 'Basic' performance assessment criteria includes a first criteria: Demand forecasting is based on historical trends only;
        wherein the 'Competitive' performance assessment criteria includes a first criteria: Marketing insights (trends, events), sales forecasts, and external sources are used in order to forecast demand; and
        wherein the 'Competitive' performance assessment criteria includes a first criteria: Marketing insights (trends, events), sales forecasts, and external sources are used in order to forecast demand;
    receiving, through a communication interface coupled to the processor, an input specifying a postal industry area and a postal industry key assessment area (KAA) with the postal industry area for analysis;
    searching, by the processor, the multidimensional postal industry performance reference set for a matching key assessment performance reference table that matches the postal industry area and the postal industry key assessment area (KAA);
    retrieving, by the processor, the matching key assessment performance reference table;
    analyzing, by the processor, the matching key assessment performance reference table; and
    obtaining, by the processor, a resultant performance capability level for the postal industry key assessment area (KAA).

2. A computer-implemented method for high performance capability assessment of a postal business, comprising:
    defining, by a processor coupled to a machine-readable memory, a multidimensional postal industry performance reference set stored in the memory and comprising multiple key assessment performance reference tables, at least one key assessment performance reference table further defining an enablement platform including:
        a 'Basic' performance capability level specifying 'Basic' performance assessment criteria;
        a 'Competitive' performance capability level specifying 'Competitive' performance assessment criteria;
        a 'Market Leading' performance capability level specifying 'Market Leading' performance assessment criteria;
    establishing network planning performance assessment criteria,
        wherein the 'Basic' performance assessment criteria includes a first criteria: Simple mono-modal national network based on historically grown structures, processing presence in each (local) geography served;
        wherein the 'Competitive' performance assessment criteria includes a first criteria: Regional network with limited flexibility;
        and
        wherein the 'Market Leading' performance assessment criteria includes a first criteria: Global network strategy under proactive reviews;
    receiving, through a communication interface coupled to the processor, an input specifying a postal industry area and a postal industry key assessment area (KAA) with the postal industry area for analysis;
    searching, by the processor, the multidimensional postal industry performance reference set for a matching key assessment performance reference table that matches the postal industry area and the postal industry key assessment area (KAA);
    retrieving, by the processor, the matching key assessment performance reference table;
    analyzing, by the processor, the matching key assessment performance reference table; and
    obtaining, by the processor, a resultant performance capability level for the postal industry key assessment area (KAA).

3. A computer-implemented method for high performance capability assessment of a postal business, comprising:
- defining, by a processor coupled to a machine-readable memory, a multidimensional postal industry performance reference set stored in the memory and comprising multiple key assessment performance reference tables, at least one key assessment performance reference table further defining an enablement platform including:
  - a 'Basic' performance capability level specifying 'Basic' performance assessment criteria;
  - a 'Competitive' performance capability level specifying 'Competitive' performance assessment criteria;
  - a 'Market Leading' performance capability level specifying 'Market Leading' performance assessment criteria;
- establishing production planning performance assessment criteria,
  - wherein the 'Basic' performance assessment criteria includes a first criteria: Planning process is reactive due to limited information and visibility of future demand;
  - wherein the 'Competitive' performance assessment criteria includes a first criteria: Planning is done for multiple time horizons with varying time buckets and product levels; and
  - wherein the 'Market Leading' performance assessment criteria includes a first criteria: Simultaneous optimization of all planning activities;
- receiving, through a communication interface coupled to the processor, an input specifying a postal industry area and a postal industry key assessment area (KAA) with the postal industry area for analysis;
- searching, by the processor, the multidimensional postal industry performance reference set for a matching key assessment performance reference table that matches the postal industry area and the postal industry key assessment area (KAA);
- retrieving, by the processor, the matching key assessment performance reference table;
- analyzing, by the processor, the matching key assessment performance reference table; and
- obtaining, by the processor, a resultant performance capability level for the postal industry key assessment area (KAA).

4. The computer-implemented method of claim 1, further including establishing fleet and equipment management performance assessment criteria.

5. The computer-implemented method of claim 1, further including establishing address management performance assessment criteria.

6. A computer-implemented method for high performance capability assessment of a postal business, comprising:
- defining, by a processor coupled to a machine-readable memory, a multidimensional postal industry performance reference set stored in the memory and comprising multiple key assessment performance reference tables, at least one key assessment performance reference table defining an mail operations platform including:
  - a 'Basic' performance capability level specifying 'Basic' performance assessment criteria;
  - a 'Competitive' performance capability level specifying 'Competitive' performance assessment criteria;
  - a 'Market Leading' performance capability level specifying 'Market Leading' performance assessment criteria;
- further including establishing mail production performance assessment criteria,
  - wherein the 'Basic' performance assessment criteria includes a first criteria: Customer requirements are collected manually;
  - wherein the 'Competitive' performance assessment criteria includes a first criteria: Created based on customer requirement on an ad-hoc basis; and
  - wherein the 'Market Leading' performance assessment criteria includes a first criteria: Historical data is used for forecasting the large mailing in advance;
- receiving, through a communication interface coupled to the processor, an input specifying a postal industry area and a postal industry key assessment area (KAA) with the postal industry area for analysis;
- searching, by the processor, the multidimensional postal industry performance reference set for a matching key assessment performance reference table that matches the postal industry area and the postal industry key assessment area (KAA);
- retrieving, by the processor, the matching key assessment performance reference table;
- analyzing, by the processor, the matching key assessment performance reference table; and
- obtaining, by the processor, a resultant performance capability level for the postal industry key assessment area (KAA).

7. A computer-implemented method for high performance capability assessment of a postal business, comprising:
- defining, by a processor coupled to a machine-readable memory, a multidimensional postal industry performance reference set stored in the memory and comprising multiple key assessment performance reference tables, at least one key assessment performance reference table defining an mail operations platform including:
  - a 'Basic' performance capability level specifying 'Basic' performance assessment criteria;
  - a 'Competitive' performance capability level specifying 'Competitive' performance assessment criteria;
  - a 'Market Leading' performance capability level specifying 'Market Leading' performance assessment criteria;
- establishing mail preparation performance assessment criteria,
  - wherein the 'Basic' performance assessment criteria includes a first criteria: Based on the customer requirement, demographic or geographic type information;
  - wherein the 'Competitive' performance assessment criteria includes a first criteria: Multiple queries can be performed depending on the type of mailing list; and
  - wherein the 'Market Leading' performance assessment criteria includes a first criteria: Personalized customer data can be retrieved from postal database as a value added service provide to large mailer;
- receiving, through a communication interface coupled to the processor, an input specifying a postal industry area and a postal industry key assessment area (KAA) with the postal industry area for analysis;
- searching, by the processor, the multidimensional postal industry performance reference set for a matching key assessment performance reference table that matches the postal industry area and the postal industry key assessment area (KAA);

retrieving, by the processor, the matching key assessment performance reference table;

analyzing, by the processor, the matching key assessment performance reference table; and obtaining, by the processor, a resultant performance capability level for the postal industry key assessment area (KAA).

8. A computer-implemented method for high performance capability assessment of a postal business, comprising:

defining, by a processor coupled to a machine-readable memory, a multidimensional postal industry performance reference set stored in the memory and comprising multiple key assessment performance reference tables, at least one key assessment performance reference table defining an mail operations platform including:

a 'Basic' performance capability level specifying 'Basic' performance assessment criteria;

a 'Competitive' performance capability level specifying 'Competitive' performance assessment criteria;

a 'Market Leading' performance capability level specifying 'Market Leading' performance assessment criteria;

establishing acceptance and induction performance assessment criteria, wherein the 'Basic' performance assessment criteria includes a first criteria: No communication between acceptance units and large mailers until mailings arrive;

wherein the 'Competitive' performance assessment criteria includes a first criteria: Large mailer receiving includes some level of scheduling and pre-advice; and wherein the 'Market Leading' performance assessment criteria includes a first criteria: Large mailer receiving system used to schedule mailers and collect pre-advice data about their mailings;

receiving, through a communication interface coupled to the processor, an input specifying a postal industry area and a postal industry key assessment area (KAA) with the postal industry area for analysis;

searching, by the processor, the multidimensional postal industry performance reference set for a matching key assessment performance reference table that matches the postal industry area and the postal industry key assessment area (KAA);

retrieving, by the processor, the matching key assessment performance reference table;

analyzing, by the processor, the matching key assessment performance reference table; and obtaining, by the processor, a resultant performance capability level for the postal industry key assessment area (KAA).

9. The computer-implemented method of claim 6, further including establishing mail sorting performance assessment criteria.

10. The computer-implemented method of claim 6, further including establishing mail management performance assessment criteria.

11. A computer-implemented method for high performance capability assessment of a postal business, comprising:

defining, by a processor coupled to a machine-readable memory, a multidimensional postal industry performance reference set stored in the memory and comprising multiple key assessment performance reference tables, at least one key assessment performance reference table defining a supplemental services platform including:

a 'Basic' performance capability level specifying 'Basic' performance assessment criteria;

a 'Competitive' performance capability level specifying 'Competitive' performance assessment criteria;

a 'Market Leading' performance capability level specifying 'Market Leading' performance assessment criteria;

establishing customs management performance assessment criteria, wherein the 'Basic' performance assessment criteria includes a first criteria: Customs is managed paper-based at least on one side, resulting in additional data capture effort;

wherein the 'Competitive' performance assessment criteria includes a first criteria: Customs documentation is generated and submitted electronically; and wherein the 'Market Leading' performance assessment criteria includes a first criteria: High level of process and system integration with customs authorities;

receiving an input specifying a postal industry area and a postal industry key assessment area (KAA) with the postal industry area for analysis;

searching, by the processor, the multidimensional postal industry performance reference set for a matching key assessment performance reference table that matches the postal industry area and the postal industry key assessment area (KAA);

retrieving, by the processor, the matching key assessment performance reference table;

analyzing, by the processor, the matching key assessment performance reference table; and obtaining, by the processor, a resultant performance capability level for the postal industry key assessment area (KAA).

12. A computer-implemented method for high performance capability assessment of a postal business, comprising:

defining, by a processor coupled to a machine-readable memory, a multidimensional postal industry performance reference set stored in the memory and comprising multiple key assessment performance reference tables, at least one key assessment performance reference table defining a supplemental services platform including:

a 'Basic' performance capability level specifying 'Basic' performance assessment criteria;

a 'Competitive' performance capability level specifying 'Competitive' performance assessment criteria;

a 'Market Leading' performance capability level specifying 'Market Leading' performance assessment criteria;

establishing yard and handling area management performance assessment criteria, wherein the 'Basic' performance assessment criteria includes a first criteria: Traffic not coordinated;

wherein the 'Competitive' performance assessment criteria includes a first criteria: Movement lanes and vehicle flows are defined; and wherein the 'Market Leading' performance assessment criteria includes a first criteria: Traffic control (traffic lights) and planned slotting on the yard;

receiving an input specifying a postal industry area and a postal industry key assessment area (KAA) with the postal industry area for analysis;

searching, by the processor, the multidimensional postal industry performance reference set for a matching key assessment performance reference table that matches the postal industry area and the postal industry key assessment area (KAA);

retrieving, by the processor, the matching key assessment performance reference table;

analyzing, by the processor, the matching key assessment performance reference table; and obtaining, by the processor, a resultant performance capability level for the postal industry key assessment area (KAA).

13. A computer-implemented method for high performance capability assessment of a postal business, comprising:

defining, by a processor coupled to a machine-readable memory, a multidimensional postal industry performance reference set stored in the memory and comprising multiple key assessment performance reference tables, at least one key assessment performance reference table defining a supplemental services platform including:
- a 'Basic' performance capability level specifying 'Basic' performance assessment criteria;
- a 'Competitive' performance capability level specifying 'Competitive' performance assessment criteria;
- a 'Market Leading' performance capability level specifying 'Market Leading' performance assessment criteria;

establishing track and trace performance assessment criteria, wherein the 'Basic' performance assessment criteria includes a first criteria: Shipment status information is recorded manually or by scanning documents;

wherein the 'Competitive' performance assessment criteria includes a first criteria: Scanning information is recorded in addition to the manual status information; and wherein the 'Market Leading' performance assessment criteria includes a first criteria: Manual or automated (RFID) scanning are recorded additionally to manual status information;

receiving an input specifying a postal industry area and a postal industry key assessment area (KAA) with the postal industry area for analysis;

searching, by the processor, the multidimensional postal industry performance reference set for a matching key assessment performance reference table that matches the postal industry area and the postal industry key assessment area (KAA);

retrieving, by the processor, the matching key assessment performance reference table;

analyzing, by the processor, the matching key assessment performance reference table; and obtaining, by the processor, a resultant performance capability level for the postal industry key assessment area (KAA).

14. The computer-implemented method of claim 11, further including establishing payment handling performance assessment criteria.

15. The computer-implemented method of claim 11, further including establishing special requirements management performance assessment criteria.

* * * * *

UNITED STATES PATENT AND TRADEMARK OFFICE
CERTIFICATE OF CORRECTION

PATENT NO. : 8,078,485 B1
APPLICATION NO. : 12/129080
DATED : December 13, 2011
INVENTOR(S) : Lars Kraehmueller et al.

It is certified that error appears in the above-identified patent and that said Letters Patent is hereby corrected as shown below:

In the Specification

In column 17, line 36, after "are used to" replace "detelmine" with --determine--.

In column 22, Table 16, line 15, after "share real time" replace "informationon" with --information on--.

In column 55, Table 54, line 64, before "end of" replace "andforecast" with --and forecast--.

Signed and Sealed this
Thirty-first Day of July, 2012

David J. Kappos
*Director of the United States Patent and Trademark Office*